US00RE36624E

United States Patent [19]

Maeda et al.

[11] E Patent Number: Re. 36,624

[45] Reissued Date of Patent: Mar. 21, 2000

[54] OPTICAL RECORDING MEDIA AND INFORMATION RECORDING AND REPRODUCING UNITS

[75] Inventors: Yoshihito Maeda, Mito; Isao Ikuta, Iwaki; Hisashi Andoh; Masaichi Nagai, both of Hitachi; Yoshimi Katoh, Takahagi; Yoshio Sato, Hitachi; Nobuyoshi Tsuboi, Ibaraki-ken; Hiroyuki Minemura, Hitachi, all of Japan

[73] Assignee: Hitachi, Ltd., Tokyo, Japan

[21] Appl. No.: 09/008,847

[22] Filed: Jan. 15, 1998

Related U.S. Patent Documents

Reissue of:

[64] Patent No.: 5,484,686
Issued: Jan. 16, 1996
Appl. No.: 08/205,768
Filed: Mar. 4, 1994

U.S. Applications:

[ 63] Continuation of application No. 07/917,664, Jul. 20, 1992, abandoned, which is a continuation of application No. 07/366,873, Jun. 15, 1989, abandoned.

[30] Foreign Application Priority Data

Jun. 24, 1988 [JP] Japan ..... 63-154743

[51] Int. Cl.[7] ..... G03C 1/72

[52] U.S. Cl. ..... 430/270.13; 430/275.1; 430/276.1; 430/925; 430/19; 428/64.5; 428/64.6; 428/912; 428/913; 369/275.5; 369/275.2

[58] Field of Search ..... 430/270.13, 275.1, 430/276.1, 945, 19; 428/912, 913, 64.5, 64.6; 369/275.5, 275.2

[56] References Cited

U.S. PATENT DOCUMENTS 3,716,844 2/1973 Brodsky ..... 430/346
3,971,874 7/1976 Ohta et al. ..... 428/913
4,330,833 5/1982 Ohta et al. ..... 369/275.5
4,460,636 7/1984 Watanabe ..... 428/212

(List continued on next page.)

FOREIGN PATENT DOCUMENTS 1193008 9/1985 Canada .
0186329 7/1976 European Pat. Off. .
2079031 1/1982 European Pat. Off. .
0243976 11/1987 European Pat. Off. .

(List continued on next page.)

OTHER PUBLICATIONS

Proceedings of Spie, vol. 695, 18–22 Aug., 1986; pp. 105–109.
Proceedings of Spie, vol. 529, 1985; pp. 46–50.
Fujitsu, 38, 2; (Mar., 1987), "Phase–Change Type Erasable Optical Disk" Koshino, et al; pp. 143–148.
CRC Handbook, pp. F–97, 1983.
Akahira, et al, SPIE vol. 899, pp. 188–195, 1988 Optical Storage Technology and Applications.
SPIE (Optical Mass Data Storage) vol. 529, 1985, pp. 46–50, Tokyo, JP; M. Terao, et al: "Sn–Te–Se Phase Change Recording Film for Optical Disks".
Patent Abstracts of Japan, vol. 010, No. 274 (P–498), Sep. 18, 1986.

*Primary Examiner*—Martin Angebranndt
*Attorney, Agent, or Firm*—Antonelli, Terry, Stout & Kraus, LLP

[57] ABSTRACT

The present invention provides an optical recording medium using an amorphous-crystalline phase-change for recording and erasing, wherein reflectivity of an optical recording medium-constituting recording film in an amorphous state is larger than that of the optical recording medium-constituting recording film in a crystalline state, or wherein absorptivity of an optical recording medium-constituting recording film in an amorphous state is smaller than that of the optical recording medium-constituting recording film in a crystalline state.

12 Claims, 59 Drawing Sheets

U.S. PATENT DOCUMENTS

| | | | |
|---|---|---|---|
| 4,587,209 | 5/1986 | Ohno et al. | 430/270.13 |
| 4,629,649 | 12/1986 | Osaka et al. | 430/945 |
| 4,645,712 | 2/1987 | Ishigaki et al. | 428/433 |
| 4,651,172 | 3/1987 | Watanabe et al. | 430/945 |
| 4,670,345 | 6/1987 | Morimoto et al. | 430/945 |
| 4,710,899 | 12/1987 | Young et al. | 430/945 |
| 4,787,077 | 11/1988 | Burton et al. | 430/945 |
| 4,816,385 | 3/1989 | Gravesteijn et al. | 430/270.13 |
| 4,937,372 | 6/1990 | Koshino et al. | 430/270.13 |
| 4,969,141 | 11/1990 | Takeoka et al. | 430/270.13 |
| 4,975,355 | 12/1990 | Suzuki | 430/945 |

FOREIGN PATENT DOCUMENTS

| | | | |
|---|---|---|---|
| 0286406 | 1/1988 | European Pat. Off. | 430/945 |
| 0319037 | 6/1989 | European Pat. Off. . | |
| 59-185048 | 10/1984 | Japan . | |
| 60-231928 | 11/1985 | Japan . | |
| 61-96541 | 5/1986 | Japan . | |
| 61-210538 | 9/1986 | Japan . | |
| 61-269247 | 11/1986 | Japan . | |
| 62-86553 | 4/1987 | Japan . | |

LASER BEAM AND TEMPERATURE PROFILE IN 2-SPOT-ERASING METHOD

FIG. 79(a)
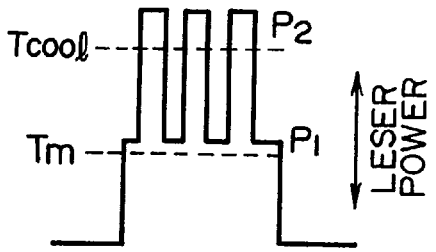
FIG. 79(b)-1
FIG. 79(b)-2
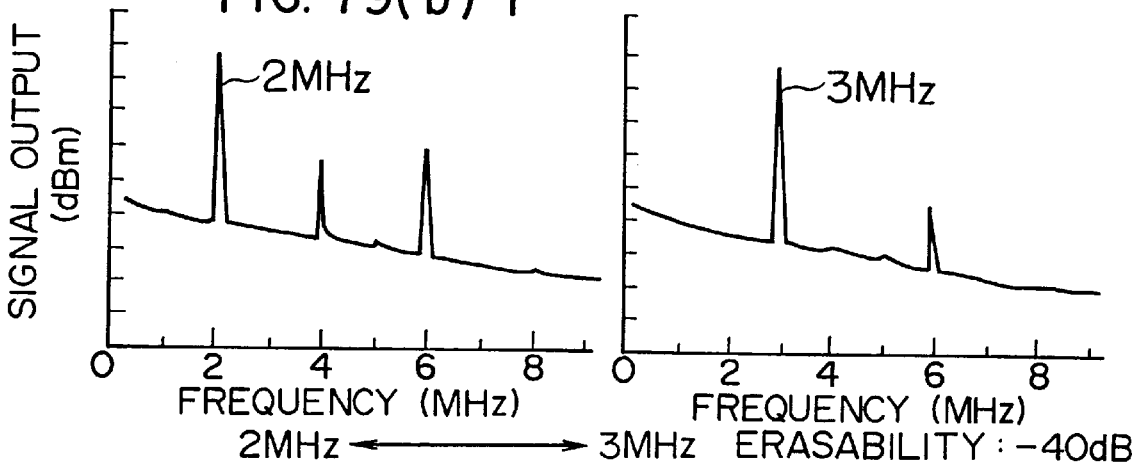
FIG. 80(a)
FIG. 80(b)
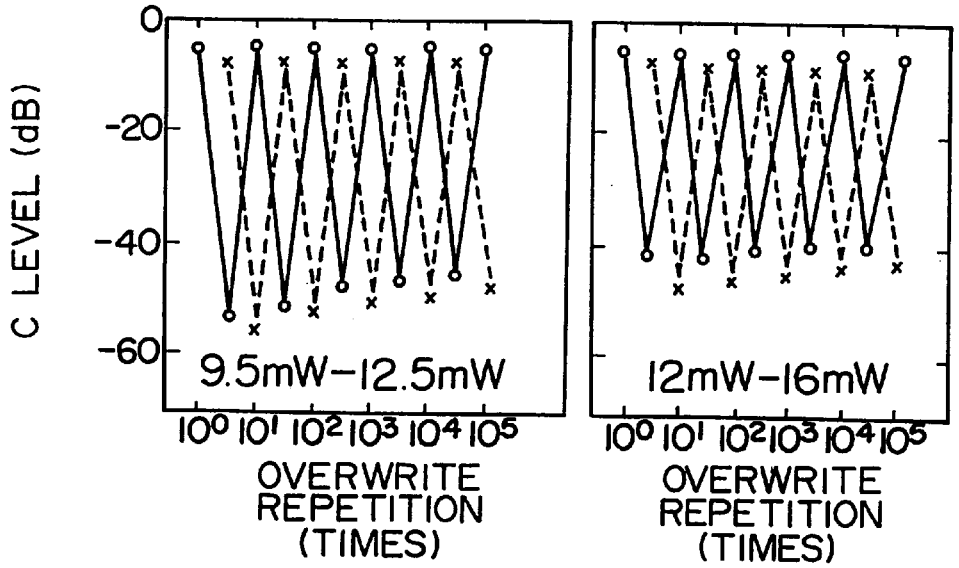

OPTICAL RECORDING MEDIA AND INFORMATION RECORDING AND REPRODUCING UNITS

Matter enclosed in heavy brackets [ ] appears in the original patent but forms no part of this reissue specification; matter printed in italics indicates the additions made by reissue.

This application is a Continuation application of Ser. No. 917,664, filed Jul. 20, 1992, which application is a Continuation application of Ser. No. 366,873, filed Jun. 15, 1989, both now abandoned.

BACKGROUND OF THE INVENTION

This invention relates to rewritable optical recording media in which information can be recorded, reproduced and erased by using light and heat, a method of information recording, reproducing and erasing in said optical recording media and units therefor.

In optical information recording and reproducing units, information is recorded or erased by means of a change of optical characteristic (energy reflectivity: to be referred to as "reflectivity" hereinbelow) according to the phase-change between the amorphous phase and the crystalline phase caused when a laser power is changed for irradiation. Various methods for optical information recording and reproducing have hitherto been proposed. As shown in the following known examples, the reflectivities of conventional optical disks are smaller in the amorphous state corresponding to record than in the crystalline state corresponding to erasion. Known examples: Chemistry and Industry, Vol. 39, No. 3, 1986, P. 174; a disk using a $Te_{87}Ge_8Sn_5$ recording material, described in Applied Physics Letters, Vol. 46 (8), 1985, P. 735; a disk using a TeOx.Ge or TeOX.Sn recording material, described in National Technical Report, Vol. 29, No. 5, P. 731; a disk using an $Sb_2Se$ recording material, described in Appl. Phys. Letters Vol. 48 (19), 1986, P. 1256; a disk using a GeSbTe recording material, described in Proc. International Symposium on Optical Memory, 1987, Japanese Journal of Applied Physics, Vol. 26, 1987, Supple 26-4, P. 64; a disk using a $Te_{44}Ge_{16}Se_{10}Sb_{28}$ recording material, described in Technical Report of Electronic Information Communication Society, Shingaku Giho, Vol. 87, No. 310CPM 87-88, 1987, P. 26; FIGS. 5 and 7 of Technical Report of Electronic Information Communication Society, Shingaku Giho, Vol. 87, No. 310, CPM87-90, 1987, P. 40; a disk using an SeTe-Se recording material, described in Proc. SPIE529, 1985, P. 46; a disk using an InSeTl recording material, described in Appl. Phys. Letter, vol. 50, 1987, P. 668; a disk using a TeGeSn recording material, described in J. Appl. Phys. 60 (12), 1986, P. 4320.

As an exceptional example, FUJITSU. 38, 2, 1987, page 144 describes a disk using an SeInSb recording material as a disk having a higher reflectivity in the recording state than in the erasing state. This disk utilizes crystal I and crystal II, which have different crystalline structures.

The following are known examples of erasing methods for the disks having a smaller reflectivity in the amorphous state than in the crystalline state as mentioned above. In the case of an Sb-Te-Ge recording material described in Extended Abstracts (The 35th Spring Meeting, 1988); The Japan Society of Applied physics and Related Societies, page 839, the erasing is carried out by irradiating a recorded bit with an erasing beam, in which method a coarse crystal adjacent to an amorphous part grows within the bit to recrystallize the amorphous part. That is, the erasing is effected by a method of recrystallizing the recorded bit by heating it to a temperature at which the recorded bit is not melted (to be referred to as "solid phase transformation" hereinbelow). However, it is pointed out that the number of incompletely erased parts is large. In the case of an SbSeTeGe recording material described in Extended Abstracts (The 35th Spring Meeting 1985); the Japan Society of Applied physics and Related Societies 28P-ZQ-12, 1988, page 842, the single beam overwrite method is used. The overwrite method is classified into two erasing ways. One is that the erasing is carried out by crystallizing an amorphous part in the solid phase state. In this erasing way also, the erasability is −25 dB, and incompletely erased parts still remain (solid phase transformation). In the other way of erasing a recorded bit by melting the recorded bit and crystallizing it in a solidification process (to be referred to as "liquid phase transformation"), the erasability is −15 dB as shown in FIG. 2, and the number of incompletely erased parts is larger in this way than in the solid phase transformation. In the case of $Sb_2(Te\text{-}Se)_3$-GeTe described in Technical Report of Electronic Information Communication Society, Shingaku Giho, Vol. 87, No. 310, CPM87-90, 1987, page 41, the erasing method uses the solid phase transformation. However, the erasability with a laser power of 10 mW is about 30 dB as shown in FIG. 3. When the laser power is 15 mW or more, the liquid phase transformation takes place, and the erasability becomes high. It is pointed out, however, that the high erasability is because unrecorded parts (crystal parts) are melted by irradiation with a laser power of 15 mW or more melts to become amorphous but it is not because recorded bits are erased.

In the case of TeGeSeSb described in Technical Report of Electronic Information Communication Society, Shingaku Giho, Vol. 87, No. 310, CPM 87-88, 1987, page 27, a high erasability is obtained, which high erasability is due to its double beam method. That is, a recorded film is melted with one circular beam of the two, and the remaining one is an erasing-use beam. As shown in FIG. 4, the errasing method comprises increasing the laser power once [to not less than Tm (melting point)] to melt a recorded spot, and then, in the course of cooling, irradiating an elliptic laser spot beam in a power of not less than Tx (crystallization temperature) and not more than Tm, and this method gives an erasability of −40 dB.

As discussed above, when the erasing is carried out in disks having a smaller reflectivity in the amorphous state than in the crystalline state, the problem is that the non-erased part remains in the cases of both the solid phase transformation and the liquid phase transformation, and any high erasability cannot be achieved. In addition, the double beam method gives a high erasability, but requires a complicated unit therefor, which requirement is a problem. The optical properties (refractive index n, extinction coefficient k) of known recording films are as follows (see TABLE 1).

TABLE 1

| Recording film | | Optical properties n | Optical properties k |
|---|---|---|---|
| $Te_{80}Se_{10}Sb_{10}$ | Amorphous | 4.0 | 1.3 |
| | Crystalline | 4.6 | 2.3 |
| $GeSb_2Te_4$ | Amorphous | 4.7 | 1.3 |
| | Crystalline | 6.9 | 2.6 |
| | Amorphous | 3.8 | 0.8 |
| | Crystalline | 5.6 | 1.2 |

TABLE 1-continued

| Recording film | | Optical properties n | Optical properties k |
|---|---|---|---|
| GeTe | Amorphous | 4.4 | 1.1 |
| | Crystalline | 5.4 | 1.7 |
| $Sb_2Te_3$ | Amorphous | 5.0 | 2.7 |
| | Crystalline | 5.3 | 5.8 |

In $Te_{80}Se_{10}Sb_{10}$ described in J. Appl. Phys. 59. (6), 1986, page 1819 (n and k in the amorphous state are abbreviated as n amo and k amo, respectively, and n and k in the crystalline state are abbreviated as n cry and k cry, representatively), n amo=4.0, k amo=1.3, n cry=4.6 and k cry=2.3. In $GeSb_2Te_4$ described in Proc. Int. Symp. on Optical Memory, 1987, page 62, n amo=4.7, k amo=1.3, n cry=6.9 and k cry=2.6. In TeOx described in Proc. Int. Symp. on Optical Memory, 1987, J. JAP. , Vol. 26, 1987, Supple. 26-4, page 57, n amo=3.8, k amo=0.8, n cry=5.6 and k cry=1.2, and in GeTe described therein, n amo=4.4, k amo=1.1, n cry=5.4, k cry=1.7. In $Sb_2Te_3$ described in Cellection of Manuscripts for No. 35 Applied Physics Associated Joint Lectures, 1988, 28P-ZQ-5, page 840, n amo=5.0, k amo=2.7, n cry=5.3 and k cry=5.8.

As is clear from the above, the refractive indices and extinction coefficients of the known examples are all in the relationships of n amo <n cry and k amo <k cry, and in particular, the refractive indices in the amorphous state are characteristically smaller than those in the crystalline state.

As stated hereinabove, in the existing rewritable optical recording media in which information is recorded and erased by using the phase-change between amorphous and crystalline phases, incompletely erased signals remain to a large extent, and the reduction of the incomplete erasion to a practical-use level is now the greatest issue in development. Further, if a single laser beam can be used to overwrite new signals while erasing recorded signals, the data transmission speed is 2 to 3 times as fast as the speed of conventional media, and the optical pick-up therefor can be considerably simplified as compared with one using a plurality of laser beams. Then, great effects are thus achieved on the practical use of optical recording media.

SUMMARY OF THE INVENTION

It is an object of this invention to provide optical recording media in which an incomplete erasion, at an erasing time, of the recording media of amorphous-crystalline phase change type is reduced to a practical-use level, and a process and units for information recording and reproduction.

The above object is to carry out the incomplete erasion-reduced erasion by acquiring larger reflectivity in the recorded state of an optical recording medium or in an amorphous state of a recording film constituting the optical recording medium than in the erased state of the optical recording medium or in a crystalline state of the recording film constituting the optical recording medium, or by acquiring a smaller energy absorptivity (to be referred to as "absorptivity" hereinbelow) in the recorded state of the optical recording medium or in an amorphous state of the recording film constituting the optical recording medium than in the erased state of the optical recording medium or in a crystalline state of the recording film constituting the optical recording medium, and by melting both the amorphous recorded part of the recording film and the inevitably copresent unrecorded part (crystal). The recording media of this invention are specified. In addition, the term "recorded state" used in this invention refers to a complete amorphous state, but also may indicate a state in which the crystalline phase is copresent with the amorphous phase [the amount of the amorphous phase in the recording film is 50 vol. % or more]. The amorphous phase can be defined as the structure having random network chemical bonding of Te and the other elements, and also defined as non diffraction peaks using an X-ray diffractometry. And the "erased state" in this invention refers to a complete crystalline state, but also may represent a state in which the amorphous state is included in the crystalline phase [the amount of the crystalline phase in the recording film is 50 vol. % or more]. It is sufficient if the conditions specified hereinafter are met with regard to the recorded state and erased state.

BRIEF DESCRIPTION OF THE DRAWINGS

FIG. 79(a) and FIG. 79(b) are characteristic diagrams of spectral at an overwriting time.

FIG. 80(a) and FIG. 80(b) are characteristic diagrams of the results of overwrite repetition.

DETAILED DESCRIPTION OF THE INVENTION

Figure 1:
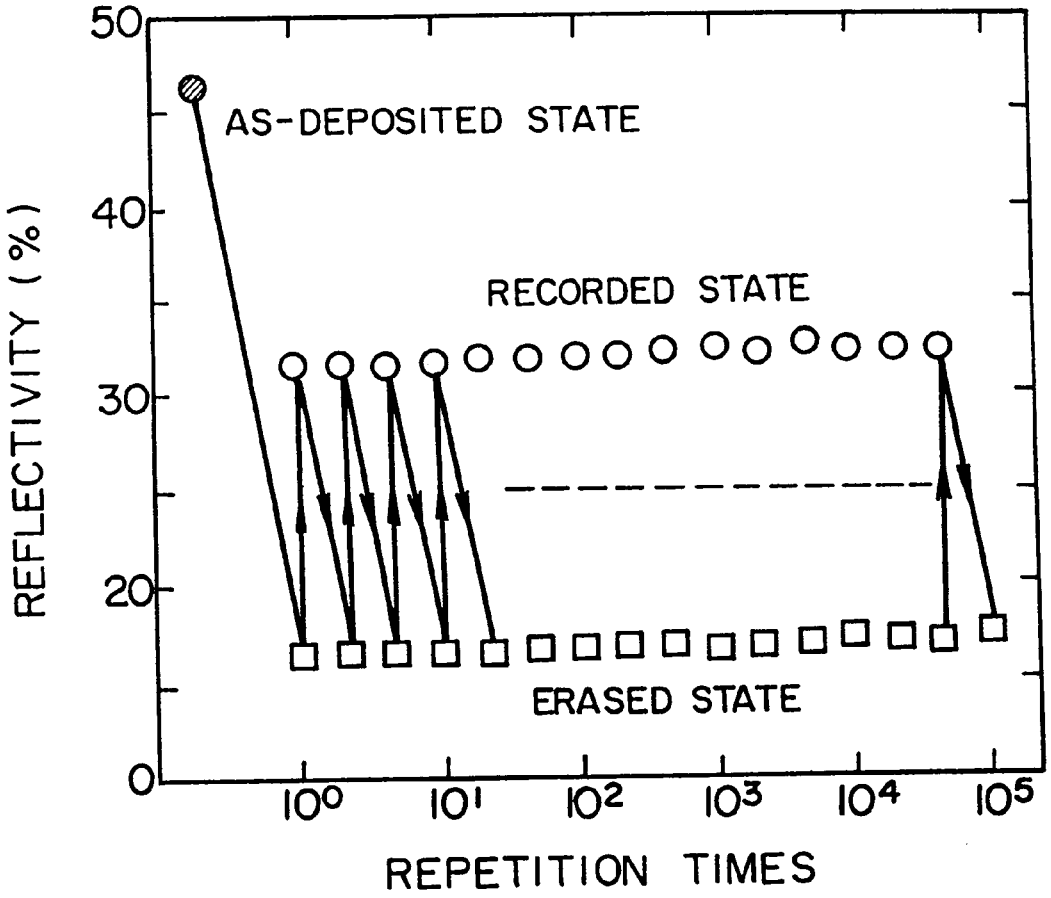
FIG. 1 is a characteristic diagram of a change of the reflectivity in recording and erasing.
Figure 2:
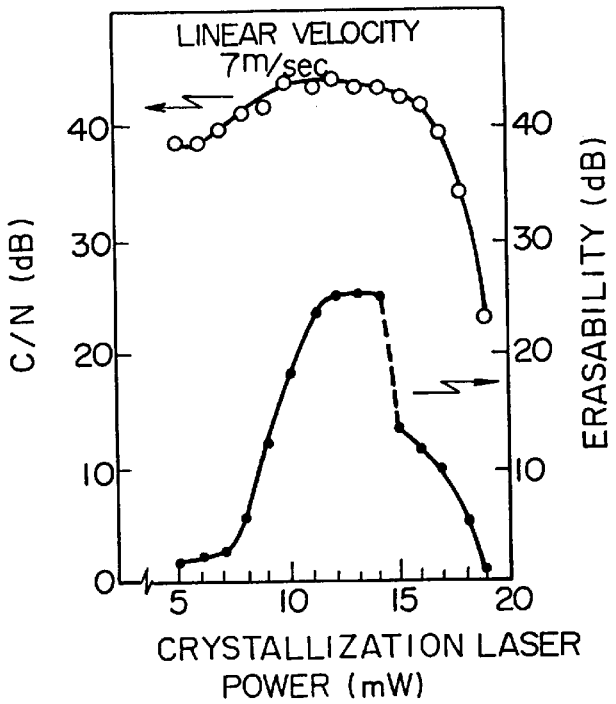
FIG. 2 is a characteristic diagram of a conventional overwrite example.
Figure 3:
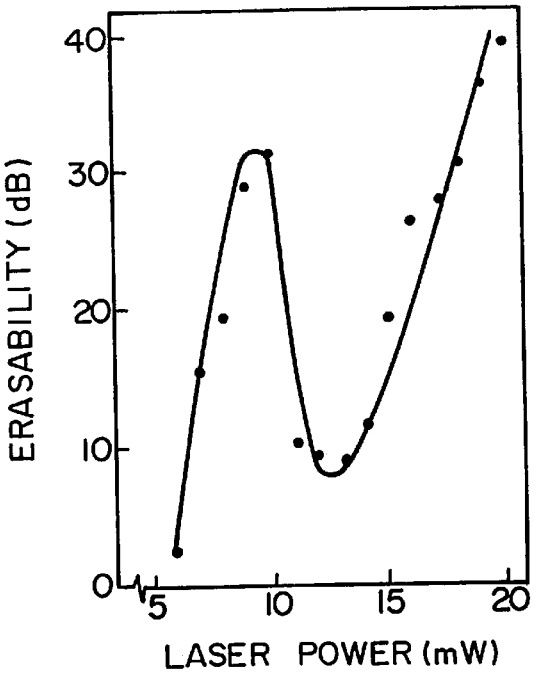
FIG. 3 is a characteristic diagram of erasion in the solid phase and liquid phase.
Figure 4:
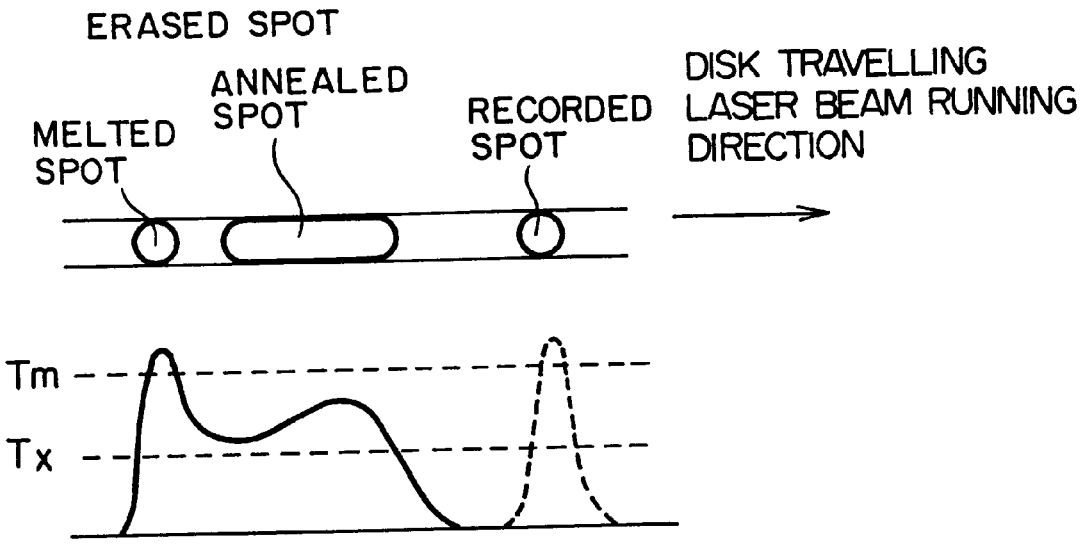
FIG. 4 is an illustrative diagram of a conventional double beam example.

When a film under measurement is in air, the following relationships are existent with regard to perpendicular energy reflectivity R, energy transmissivity T, n and k.

$$R = \frac{(n-1)^2 + k^2}{(n+1)^2 + k^2} \times 100$$

$$T = e^{-\alpha x} \times 100$$

-continued $$\text{wherein } \alpha = \frac{4\pi}{\lambda}k$$

in which λ=wavelength and x=film thickness.

The energy absorptivity A (%) is calculated by the following equation based on R, T and the law of energy conservation.

$$A=100—R—T$$

A, R and T have characteristics that their values can be controlled on the basis of the constitution of objective media. The refractive index and extinction coefficient are property values inherent to the objective media and uncontrollable on the basis of the constitution of the objective media.

The following explanation is concerning the mechanism of how the above solving means improve the erasion performance by acting on the process for erasing records present on an optical recording medium. In some prior art, the erasion has been already carried out by melting. At present, a recording and erasing method, which uses a plurality of beams consisting of an elliptic laser spot beam to anneal a melted recording film and a round laser spot beam to record, have achieved high erasion performance. However, the control system for the plurality of laser beams is complicated, and is an obstacle to practical use. It is a characteristic of this invention that high erasion performance is achieved by the melt-erasion using one single laser beam at recording and erasing times.

It is known that, when a recording film is melted, the rate of cooling the recording film at a temperature of not higher than its melting point kinetically determines whether the resultant phase is amorphous or crystalline both at a recording time and erasing time. Since the recording is to bring local parts of the recording film into the amorphous phase by melting, it is necessary, in recording, to prevent the formation of the crystalline phase by increasing the cooling rate at temperatures of not higher than the melting point. On the other hand, since the erasing is to bring the amorphous phase of the recorded local part back to the crystalline phase by melting, it is necessary, in erasing, to accelerate the formation of the crystalline phase by decreasing the cooling rate at temperatures of not higher than the melting point after heating once. It is therefore considered that the rate of cooling the recording film in the recording and erasing processes is a factor to control the formation of the amorphous phase or crystalline phase. Thus, if a single laser beam can sufficiently control the cooling rate, it is possible to achieve the high sensitivity recording by the amorphous phase formation and the high erasability erasion by the crystalline phase formation. According to kinetics on the amorphous phase formation, the lowest cooling rate necessary for the amorphous phase formation, a so-called critical cooling rate, depends upon the crystallization rate of substances. The crystallization process of the amorphous phase is a process of nucleation and growth. Therefore, since the crystallization speed is determined depending upon a competition between the growth rate accelerated with an temperature elevation and the nucleation rate decelerated with the temperature elevation, the curve which indicates the crystallization time at each degree of temperatures there is a temperature $T_n$ at which the crystallization time forms a C leter-shaped curve (So called C-cure). Then, is the shortest or the crystallization rate is the largest.

Figure 5:
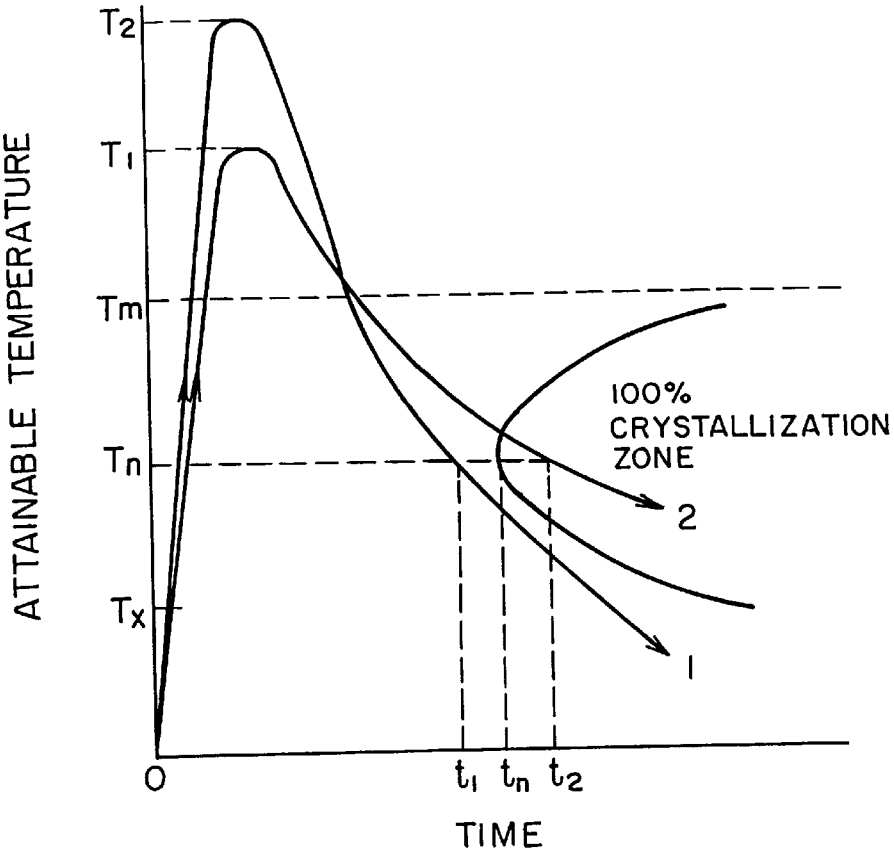
FIG. 5 is a diagram of a cooling curve and a crystallization curve.
Figure 6:
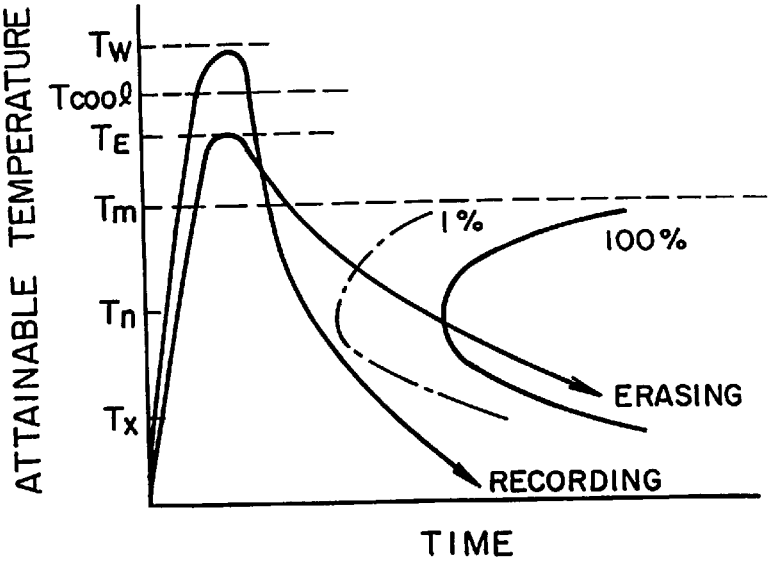
FIG. 6 is a curve diagram of the recording and erasing principle.

FIG. 5 is a typical diagram showing the temporal change of temperature (cooling curve) of a recording film when the recording film is irradiated with a laser together with the C curve. It is to be supposed here that the crystallization time at $T_n$ is $t_n$. In respect of the case that the maximum attainable temperature of the recording film with laser irradiation is high and the case that said maximum attainable temperature is low, if it is further to be supposed here concerning cooling curves ① and ② that the times during which the temperatures of the recording films reach $T_n$ (times after an input of laser irradiation) are $t_1$ and $t_2$, then $t_2$ is larger than $t_n$ ($t_2>t_n$). It is therefore understood that the crystallization proceeds during the cooling at a temperature of not higher than the melting point. Further, in the case of $t_1<t_n$, since the cooling rate is larger, then film is cooled before the crystallization is sufficiently started, whereby the amorphous phase is obtained. On the basis of the foregoing, the critical cooling rate is defines to be a cooling rate at which the time during which the temperature of the recording film reaches $T_n$ is $t_n$. In actual laser irradiation-applied recording and erasion, the rate of cooling the recording film is not directly controlled, but the cooling rate depends upon the stacking structure, thermal conductivities and optical properties of components and the energy density to input. In the case of a medium structure in which the recording film is placed between dielectric films having good thermal conductivity or the recording film has a thickness of as thin as 500 Å or less, the conduction of heat generated at the recording film in the film surface direction is small, and the thermal conduction in the film thickness direction, in which direction heat resistance is small, is dominant. Under these situations, the higher the temperature of the recording film is, the larger the temperature gradient-based outflow amount of heat per a unit time is, and the cooling rate of the recording film therefore becomes large. For this reason, as the attainable temperature (determined by heat, physical property, optical absorptivity and extinction coefficient of the recording medium, constitution of the medium, input of laser power, time, etc.) of the recording film becomes high to the ability of thermal conduction in the film thickness direction, the cooling rate is large due to so-called Newton cooling. In the interest of discussion hereinbelow, a characteristic temperature, $T_{cool}$, i.e., a temperature higher than the melting point, is introduced here.When the attainable temperature of a recording film with laser irradiation is $T_{cool}$, the critical cooling rate for the amorphous phase formation (99% of an amorphous state and 1% of crystalline state) is obtained. Then, as shown in FIG. 6, when the recording film reaches a temperature of not less than $T_{cool}$ after melted, the amorphous phase is obtained or the recorded state is obtained. If the temperature of the cooling film is lower than $T_{cool}$, the crytalline phase or erased state is obtained. In FIG. 6, $T_w$ indicates an attainable temperature at a time of recording and $T_c$ indicates one at a time of erasing. The foregoing is the recording and erasing principle of this invention. The slopes of the curves show temperature elevation and cooling rates. The attainable temperature of the recording film can be controlled depending upon the sizes of laser power input and the amplitudes of laser pulse. Hence, it is fully possible to control and switch the recording and erasing on the basis of the above melting of recording films.

General optical recording media have a track portion on which to record information signals. The track in the unrecorded state is in the crystalline phase, and the signals are recorded along the track by heating the local parts on the track to a temperature of not lower than $T_{cool}$ and cooling them rapidly to form amorphous parts. The characteristic of the optical recording media of this invention is that, when some recorded signals are already existent on the track, the reflectivity of the recorded parts is larger than that of the track in the unrecorded or erased state, or the absorptivity of the recorded parts is smaller than that of the track in the unrecorded or erased state. The attainable temperatures of these parts after the parts are melted depend upon differences among these parts in the reflectivity and absorptivity. The following will explain how these differences in the optical characteristics act on the erasion of the recorded part. In the case that an optical medium is without transmissivity, an inputted laser energy other than a reflected portion is all absorbed in the medium, and the energy coefficiency is therefore the largest and a good optical recording sensitivity is obtained. Thus, this case is an optical condition most suitable for the practical use, and the following explanation will use this case as a reference.

Figure 7:
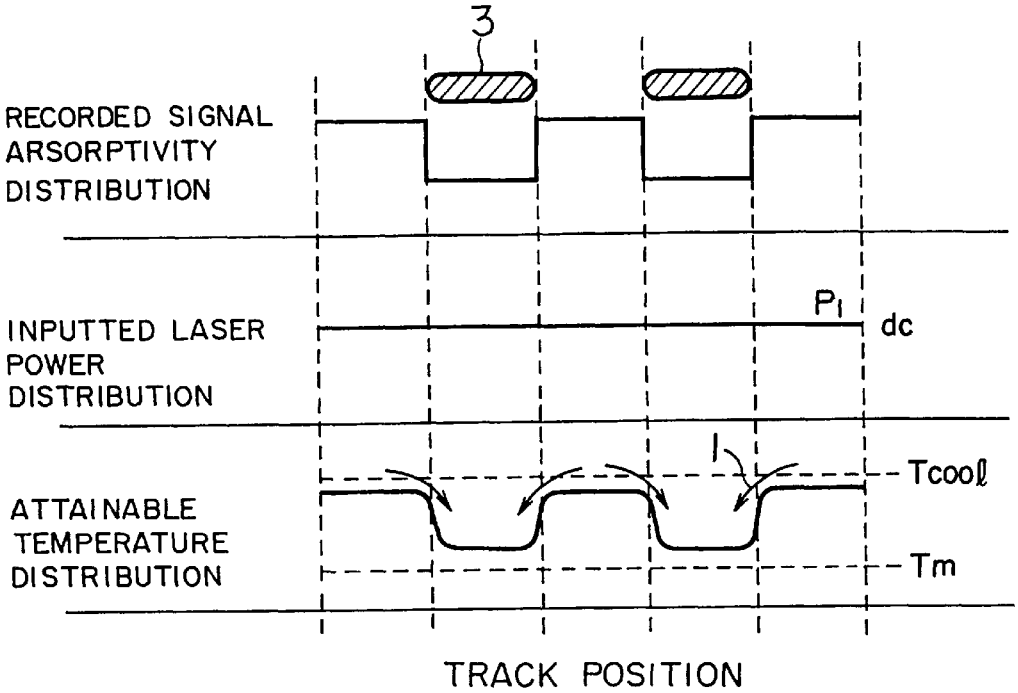
FIGS. 7 and 8 are explanatory diagrams of a direct current erasing principle.
Figure 8:
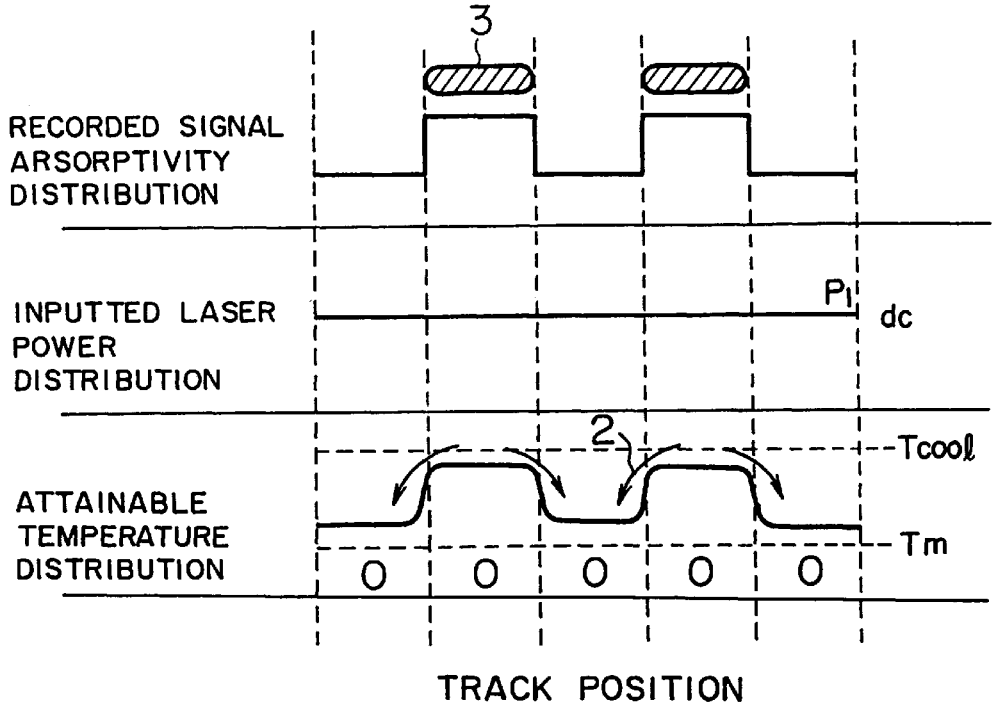

FIG. 7 shows absorptivity when amorphous-phase recorded parts are already existent on the track of the optical recording medium of this invention and a temperature distribution of the track when the track is irradiated with a dc erasing laser having a constant power $P_1$. In FIG. 7, numeral 1 indicates a heat inflow, 2 indicates a heat outflow and 3 indicates a recorded bit. The erasing power $P_1$ is a power to achieve an attainable temperature, in all the parts, of not lower than $T_m$ and not higher than $T_{cool}$. FIG. 8 shows an absorptivity when amorphous-phase recorded parts are existent on the track of an optical recording medium having the conventional optical properties and a temperature distribution of the track when the track is irradiated with a dc erasing laser having a constant power $P_1$. The erasing power $P_1$ here is a power to achieve an attainable temperature, in all the parts, of not lower than $T_m$ and not higher than $T_{cool}$. In the temperature distribution of the optical recording media of this invention, since the existing recorded parts to be erased have a smaller absorptivity, a distribution in which the attainable temperature of the recorded parts is lower than the attainable temperature of the unrecorded parts is obtained at temperatures of not lower than the melting point. In contrast thereto, in the conventional optical media, since the absorptivity of the existing recorded parts is larger, a distribution in which the attainable temperature of the recorded parts is higher than that of the unrecorded track is obtained.

In this invention, therefore, the heat flow formed on the track due to thermal conduction concentrates on the recorded part, which is to be erased, from the peripheral areas. That is, there is an effect to be heated by the heat flow from the unrecorded area in which the attainable temperature is higher than in the recorded area. Since the recorded part is gradually cooled even at a temperature of not higher than the melting point due to the higher attainable temperature area-rederived heat, crystalline nuclei occur inside the existing recorded part, and their number is large. The nuclei grow into crystals having fine particle sizes after solidification, and the existing recorded part is therefore crystallized, i.e., erased. Meanwhile, in the conventional optical recording media, the heat flow in an erasing medium is dispersed from the recorded part to be erased to unrecorded parts, and there is therefore no effect of the above gradual cooling. There is rather a tendency to cool the recorded part rapidly, and the nuclei formation at a temperature around the melting point hardly takes place. Even if the nuclei formation takes place, the nuclei occur in the unrecorded parts having a lower temperature, the number of nuclei occuring inside the existing recorded part is therefore very small, and the medium is cooled to room temperature before the crystalline growth, which occurs about the nucleus, preceeds sufficiently. It is therefore considered that the crystallized fraction of the existing recorded part is too small to achieve complete erasion, and incompletely erased portions remain to a large extent. The functional characteristic of this invention is existent in the optical properties of the media that the medium, per se, forms that temperature distribution on the track which produces the higher attainable temperature area-rederived heat effect.

The following explanation is concerned with the function and erasability improvement of this invention in the single beam overwrite method in which the erasion is presently the most difficult. The single beam overwrite stands for a recording and erasing method in which existing recorded signals on the track are erased and new signals are also recorded on the same track by the use of one round laser spot beam. The principal difference of this method from the above-specified erasion using a direct current light is found only in the case where a new signal is overwritten on the existing recorded part or a subpart thereof, and the erasing process, per se, is essentially identical between the single beam overwrite method and the direct current-applied erasing method.

Figure 9A:
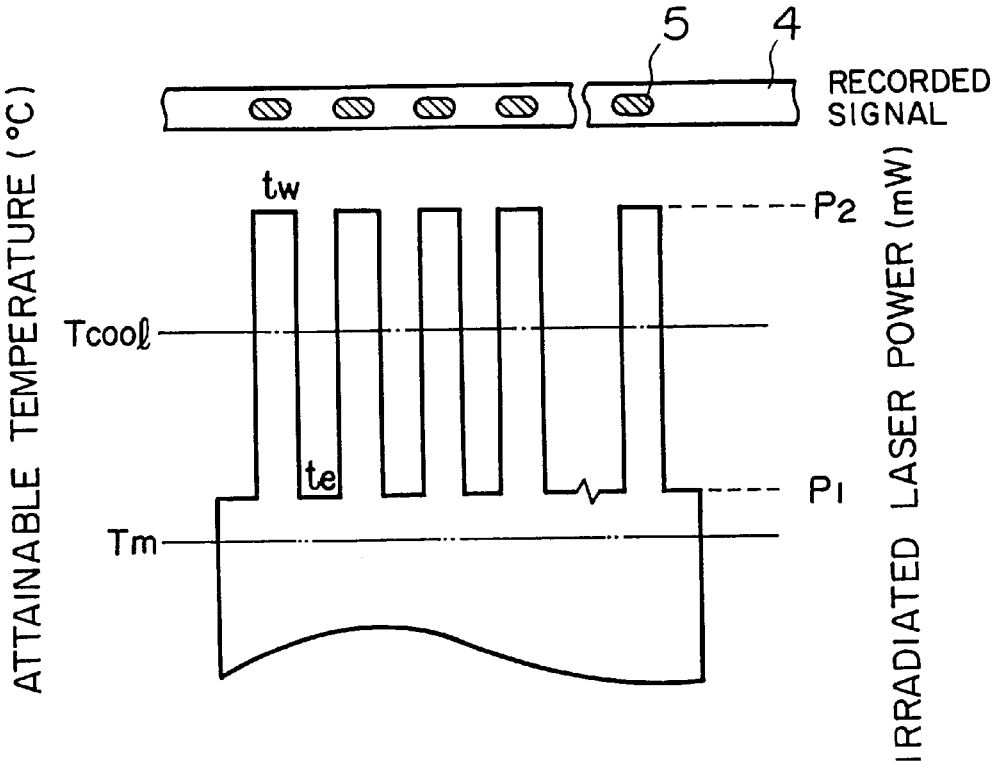
FIG. 9(a) and FIG. 9(b) are principle diagrams of single beam overwrite.
Figure 9B:
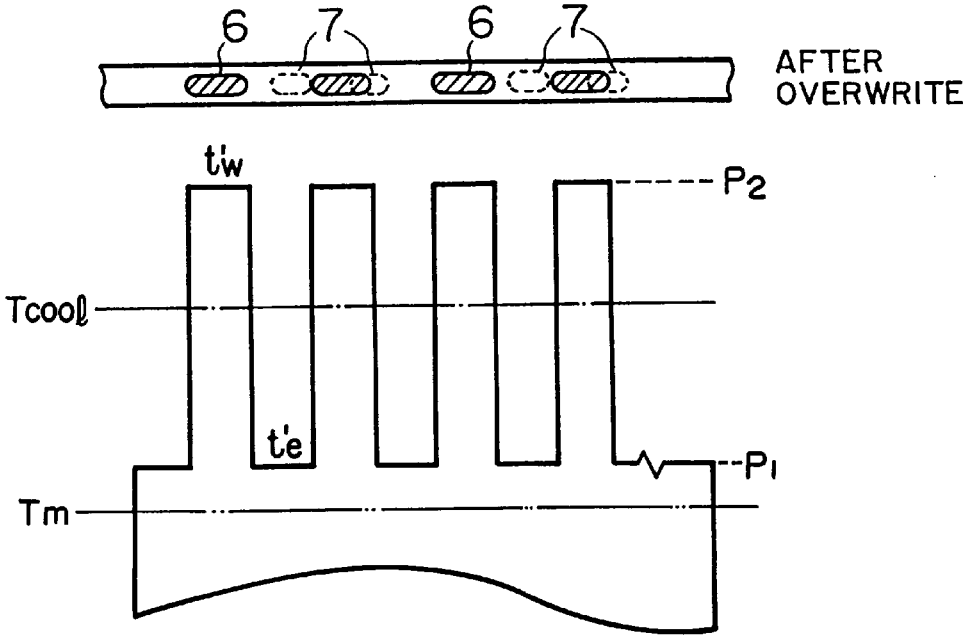
Figure 10:
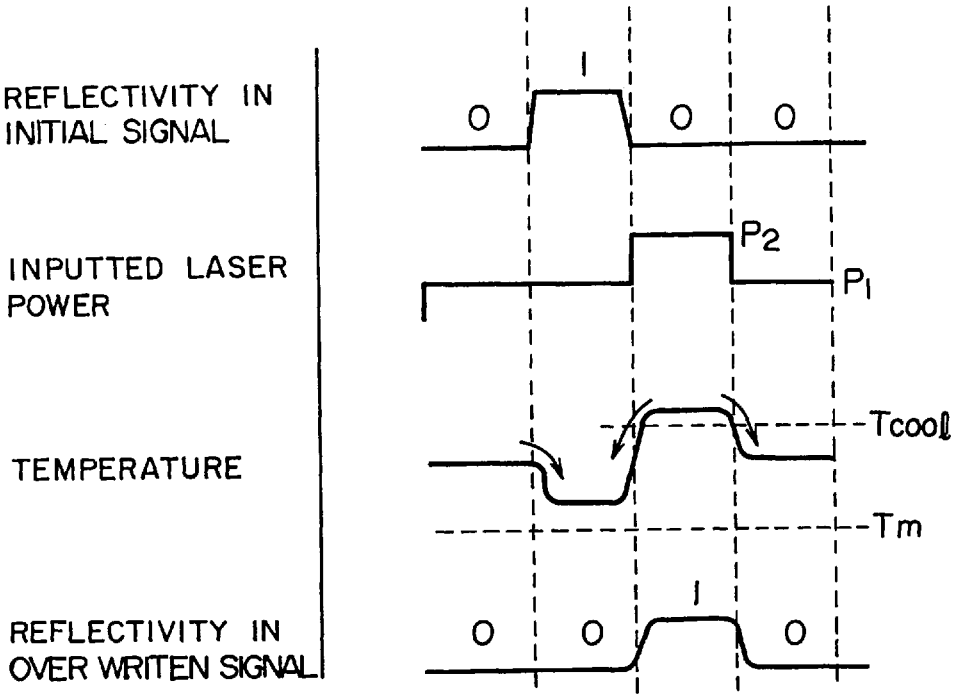
FIGS. 10 to 14 are principle diagrams of single overwrite erasing.
Figure 11:
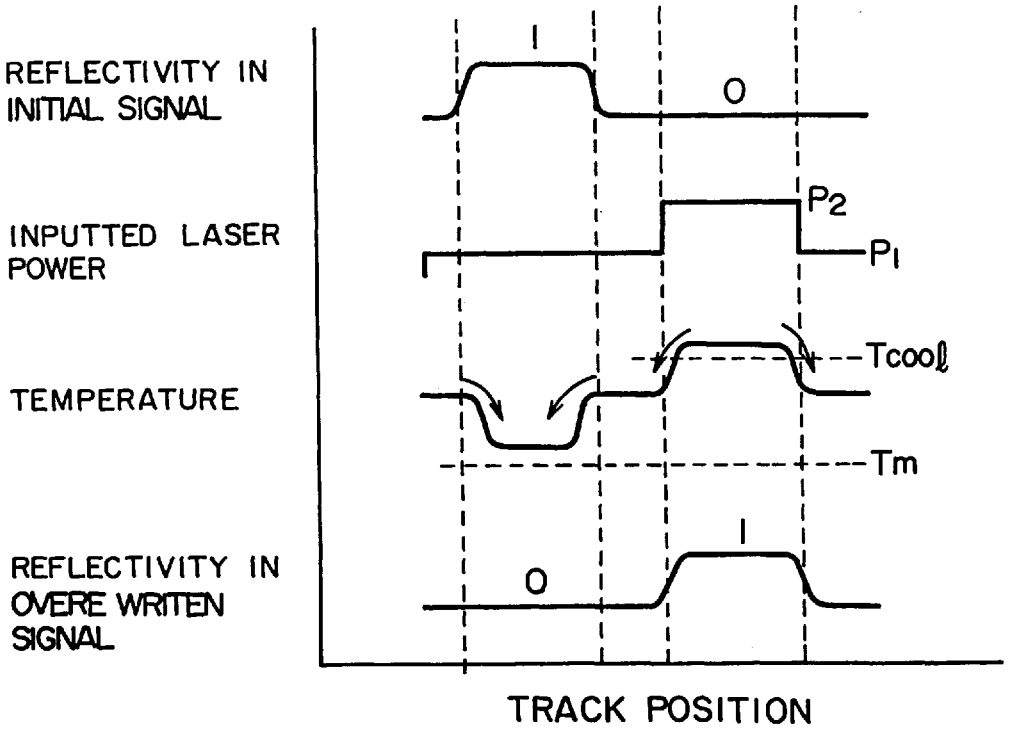
Figure 12:
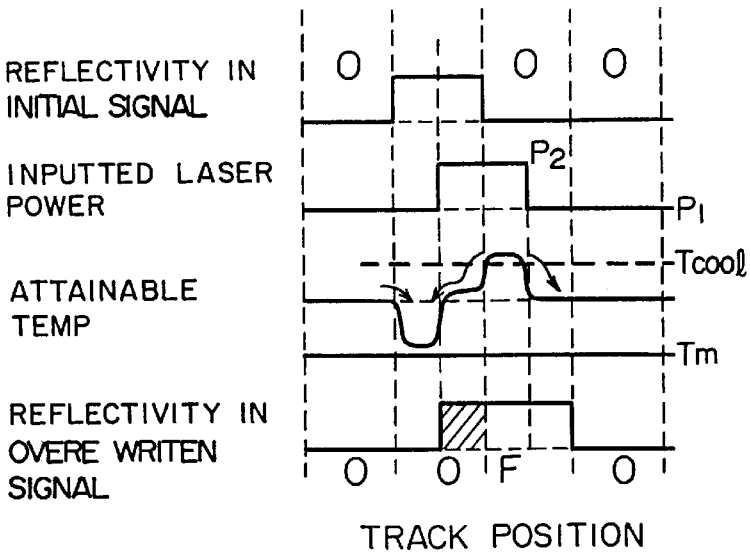
Figure 13:
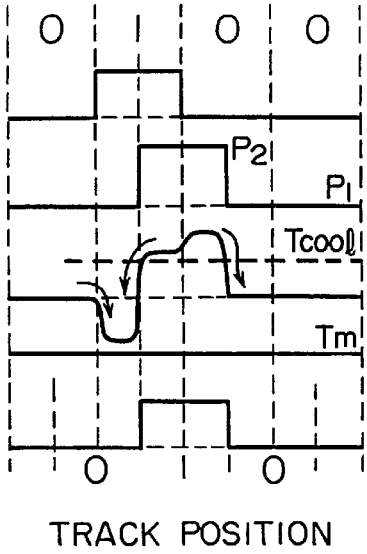
Figure 14:
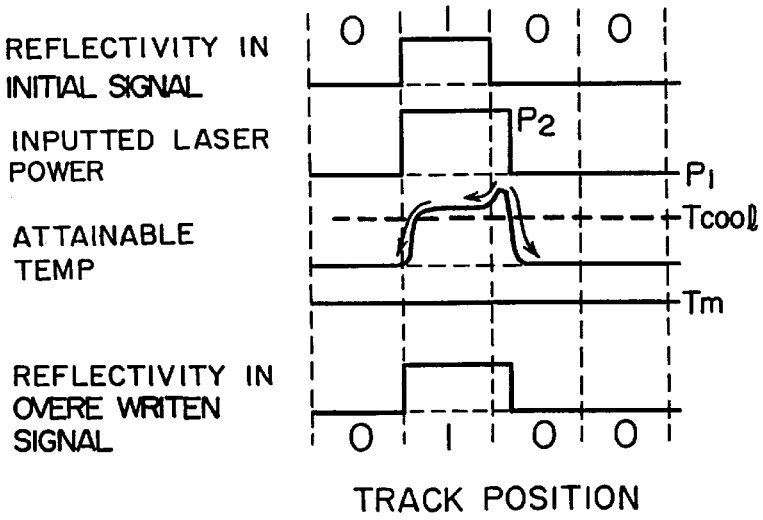

FIG. 9(a) and FIG. 9(b) show typical diagrams of overwrite-use laser power modulation, in which a recording power $P_2$ heats the recording film to a temperature of not lower than $T_{cool}$, and at an overwriting time, overlaps a direct current bias power $P_1$. The bias power has a power to melt an unrecorded part sufficiently. As shown in FIGS. 9(a) and 9(b), signals are overwritten by changing the pulse width tw and te. With regard to the positional relations between the existing recorded part on the overwrite track and the recording part on which to overwrite, there are four cases of recording and erasing pattern. This invention achieves high erasability at an overwriting time. Numeral 5 indicates a recorded bit, 4 indidates a crystalline phase track, 6 indicates an overwrite-recorded bit, and 7 indicates an erased bit. With regard to these four patterns, the function of this invention will be explained hereinbelow. FIG. 10 shows an attainable temperature distribution on the track at an overwriting time where the existing recorded part to be erased (to be referred to as "old record" hereinbelow) and a new recording part (to be referred to as "new recording part" hereinbelow) are adjacent to each other. FIG. 11 shows said distribution where the old record and new recording part are completely apart from each other. FIGS. 12 and 13 show said distribution where the old record and new recording part are partially overlap each other. FIG. 14 shows said distribution where the old record and new recording part completely overlap each other. As shown by arrows in FIGS. 10 to 14, it is seen in all the cases that heat flows into the old record part from the unrecorded track part and new recording part which have higher attainable temperatures and that there is therefore a higher attainable temperature area-rederived heat effect. In the case shown in FIG. 12, the overlapped part has a smaller absorptivity and partially remains nonamorphous if the laser power $P_2$ is small. Since, however, $P_2$ has a degree of freedom in selection as shown in FIG. 13, it is possible to select a suitable power and overwrite without writing failure. As discussed above, in the single beam overwrite, this invention makes it possible to achieve high erasability owing to the higher attainable temperature area-rederived heat effect. In fact, as will be demonstrated in Examples of this invention, this invention has been able to show conventionally unknown high erasing performance not only at the time of a direct current irradiation and but also at the time of single beam overwriting. In addition, it is also found that this invention has like effects even when the transmissivity of optical recording media is not zero.

The following is a detailed explanation of the optical property of the optical recording media of this invention in which the reflectivity in the recorded state is rendered larger than that in the erased state or the absorptivity in the recorded state is rendered smaller than that in the erased state. The above optical property can be designed on the basis of the optical properties of a recording film, a dielectric film, a metal reflection film, etc., the thickness of each film, and the like. The constitutions of various media will be shown in Examples. An explanation here will be given with regard to the condition of the refractive index required to accomplish this invention. FIG. 1 shows a change of reflectivity, at $10^5$ times repetition of the static recording and erasing of an optical recording medium having a recording film (see Examples for its detailed component material) being different from conventional recording materials, having a transmissivity of nearly zero % and having a larger refractive index in the amorphous state than in the crystalline state. These data show a change of reflectivity of the optical recording media in the actual recorded state and erased state, and shows a relationship completely reverse to that in the change of reflectivity hitherto published. Therefore, any recording film having at least a larger refractive index in the amorphous state than in the crystalline state produces the effects of this invention. The condition specified herein with regard to the refractive index of recording films is defined by considering the limitation of optical recording media in practical use. The limitation of optical recording media in practical use is the limitation of the practical power of a laser source to be used for recording, reproducing and erasing. In recording and erasing under this invention, the recording film is melted. Hence, it is preferable that the recording film is sufficiently melted with a power in the range of practical-use laser power, i.e., not more than 15 mW on the surface of the film. This purpose is achieved either by using a recording film having a low melting point or by decreasing the film thickness so as to reduce the heat capacity of the recording film. The former procedure renders the recording film thermally unstable, and the crystallization temperature of the amorphous recorded part lowers together with the reduction of the melting point. Undesirably, therefore, there is a risk that the record maintaining life is considerably shortened. The latter procedure is applicable to any recording film in the range up to the thickness of the depositable film, and is therefore preferable. In this invention, the relationship between the refractive index and extinction coefficient of recording films, the properties of a laser power to be inputted and recording films (constant values determinable on the basis of absorptivity and melting point) and the wavelength of a laser under the conditions that the relationships of the refractive index and absorptivity of this invention can be satisfied in the range of the thicknesses of the recording films in which the recording films can be melted sufficiently at a high speed within the above limitations in practical use.

When the wavelength of a laser to be used is taken as $\lambda$, the refractive index and extinction coefficient of a recording film as n and k, and the thickness of the recording film as d, the interference of a vertically incident beam is represented by the following equation.

$$2\pi Nd/\lambda=m$$

wherein $N=(n^2+k^2)$, m is an integer of 1, 2, 3, . . . . When N is 4 and $\lambda$ is in the vicinity of 800 nm, d is about 80 nm or less at a first interference of m=1. Hence, in this invention, the conditions of the refractive index and extinction coefficient of recording films are defined such that the reflectivity in the recorded state is larger than the reflectivity in the erased state at the first interference in not more than 80 nm at which the recording film can be sufficiently melted even in the range of practical laser powers. Even under conditions other than those of the refractive index and extinction coefficient of the recording films defined in this invention, however, some cases satisfy the relationship each of the reflectivity and absorptivity of the disk of this invention at a second interference. Since, however, the thickness of a recording film corresponding to the second interference, in a refractive index of ordinary substances (n<5), is as large as 160 nm, any existing practical-use laser power is not sufficient to melt such a recording film fully. When a practical-use larger laser power is available in the future, it will be possible to obtain the effects based on the mechanism of this invention even in the larger film thickness.

DESCRIPTION OF THE PREFERRED EMBODIMENTS

Examples of the present invention will shown hereinbelow.

The reflectivity, transmissivity, absorptivity, refractive index and extinction coefficient were measured as follows.

1. Reflectivity, transmissivity and absorptivity

The reflectivity R (%) and transmissivity T (%) were measured by using a spectrophotometer. Samples were prepared by forming measurement-use materials having a predetermined thickness on a substrate sheet or substrate material having supporting property such as glass, or media having various structures were used as the sample. The energy reflectivity was measured by a method in which, by directing lights having a wavelength of 830 nm, obtained through a spectroscope, into a sample at an incident angle of 5°, reflected lights were integrated by means of an integrating sphere, and directed to a light detector. The energy transmissivity was measured by a method in which, by directing into a sample vertically from the sample surface side, lights transmitting the sample were integrated by means of an integrating sphere and directed to a light detector. The energy absorptivity A (%) can be calculated by the following equation based on the above R and T and the law of energy conservation.

$$A=100-R-T$$

2. Refractive index and extinction coefficient

The refractive index and extinction coefficient were calculated on the basis of a measured energy reflectivity and transmissivity by using a computer simulation based on matrix calculation of multilayer system taking into account a multiple reflection in the interface (see A. Bell, et al., IEEE, J. Quntum Electron, page 487, 1987).

In order to ascertain the function of the recording media of this invention, 5.25 inch optical disks were prepared by the sputtering method. As a substrate, 1.2 mm in thickness quartz glass, had glass, polycarbonate (PC) resin disks and polymethylmethacryl (PMMA) resin disks were used. For a dielectric film, SiN, AlN, $SiO_2$, $ZrO_2$, ZnS, $Ta_2O_5$, TiN, $Cr_2O_3$, GeN, $TiO_2$, SiC, etc., were used (In this Example, the dielectric films are expressed by way of chemical formula having a chemical stoichiometric composition. However, the composition changes in actual use and it is difficult to obtain an exact composition). For a metal reflection film, chromium, Ni-20% Cr alloy and aluminum were used. Films were formed by the RF sputtering method. The sputtering conditions were that the initial degree of vacuum was $8.5\times10^{-5}$ Pa; an RF output of 400 W and an Ar gas partial pressure of 1 mToor for dielectric films; an RF output of 200 W and an Ar gas partial pressure of 1 mToor for recording films; and a DC output of 200 W and an Ar gas partial pressure of 20 mTorr for metal reflection films. There is $In_{22}Te_{37}Sb_{41}$ (at %) as a recording material. By using this recording material, a film having the constitution of the optical recording medium was prepared, and the optical properties of the film were examined. In addition, this recording film composition has a refractive index n of 4.952 and an extinction coefficient k of 0.857 in the amorphous state, and a refractive index n of 4.678 and an extinction coefficient k of 1.743 in the crystalline state. That is, it is a characteristic of this invention that the refractive index is larger in the amorphous state than in the crystalline state. Table 1 summarizes the refractive indices n and extinction coefficients k of the compositions discussed in the section of prior art in the present specification. In any of the compositions, the refractive index is smaller in the amorphous state than in the crystalline state, which relationship is reverse to that of this invention.

Figure 15:
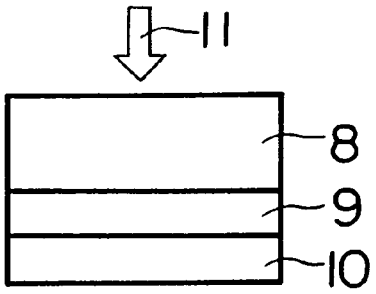
FIGS. 15 to 77 are explanatory diagrams of the constitutions of optical recording media and changes of reflectivity and absorptivity depending upon the thickness of the films.

FIG. 15 shows an optical recording medium having a film constitution of substrate/recording film/dielectric, in which a recording film 9 was deposited up to a maximum thickness of 200 nm on a 1.2 mm glass substrate 8, and $SiO_2$ for a dielectric film 10 was deposited in the film thickness of 70 nm. A laser beam 11 was directed from the substrate side.

Figure 16A:
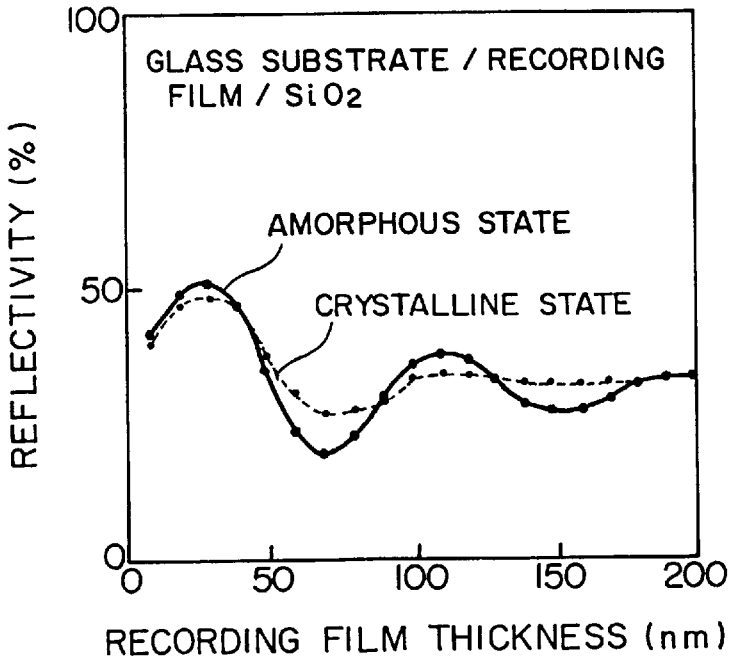

FIG. 16(a) shows the optical properties of the above optical recording medium, in which its reflectivities in the recorded state (amorphous) and in the erased state (crystalline) are shown.

Figure 16B:
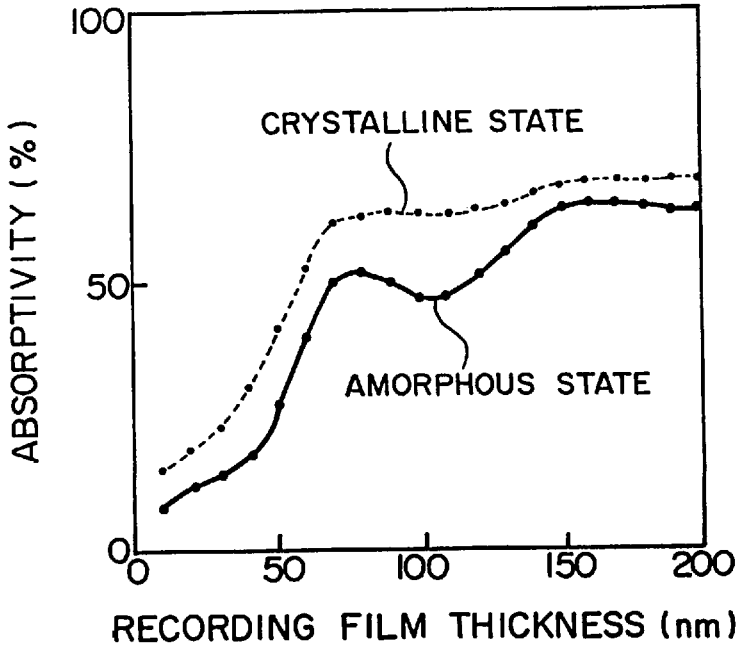

FIG. 16(b) shows the absorptivities. The thicknesses of the recording film in which the reflectivity difference can be substantially detected are up to about 40 nm and between 90 nm and 130 nm, and the reflectivity is higher in the amorphous state than in the crystalline state. And the absorptivities in all the range of thickness up to 200 nm are higher in the crystalline state than in the amorphous state as shown in FIG. 16(b). Therefore, the thickness of the recording film can be selected from the above-specified range. However, if the film thickness increases, the heat capacity increases, the recording and erasing sensitivities with laser irradiation become poor, and a high-input laser is therefore necessary.

Figure 17:
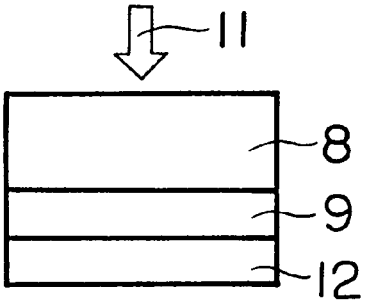
Figure 18A:
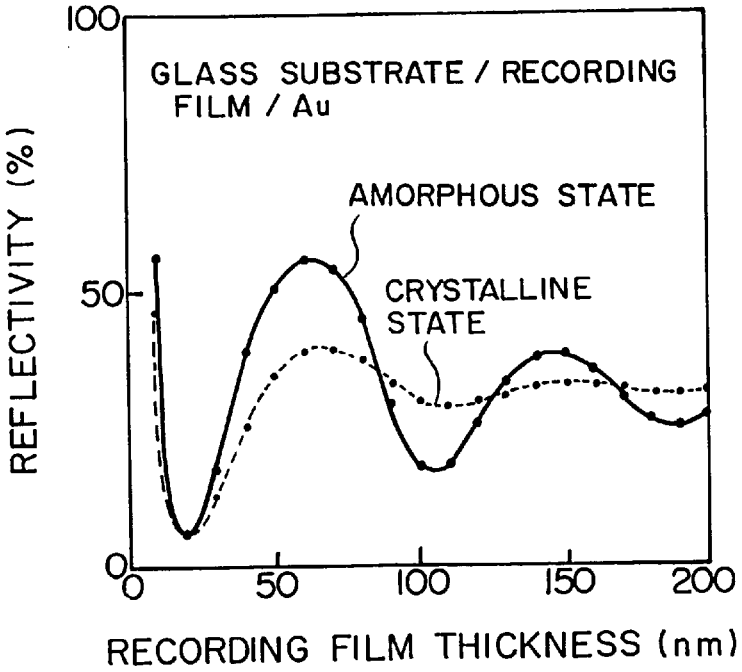
Figure 18B:
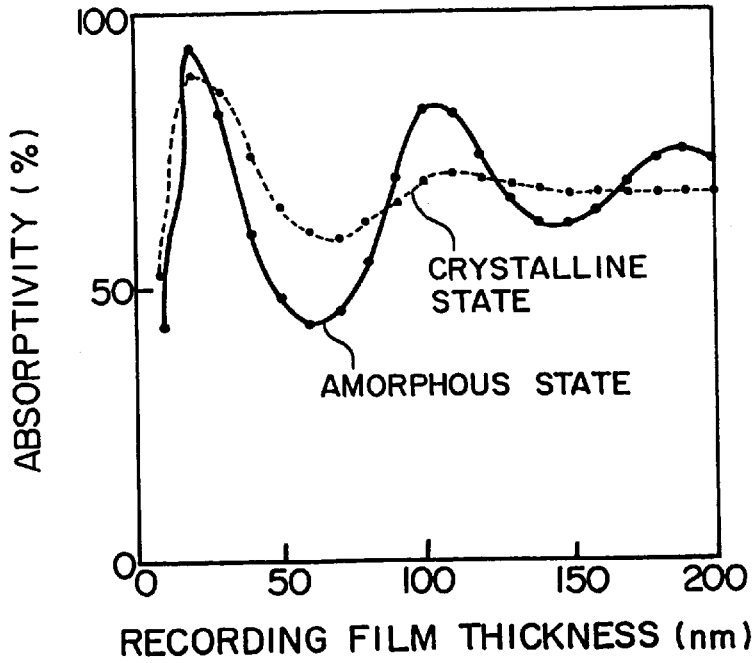
Figure 19A:
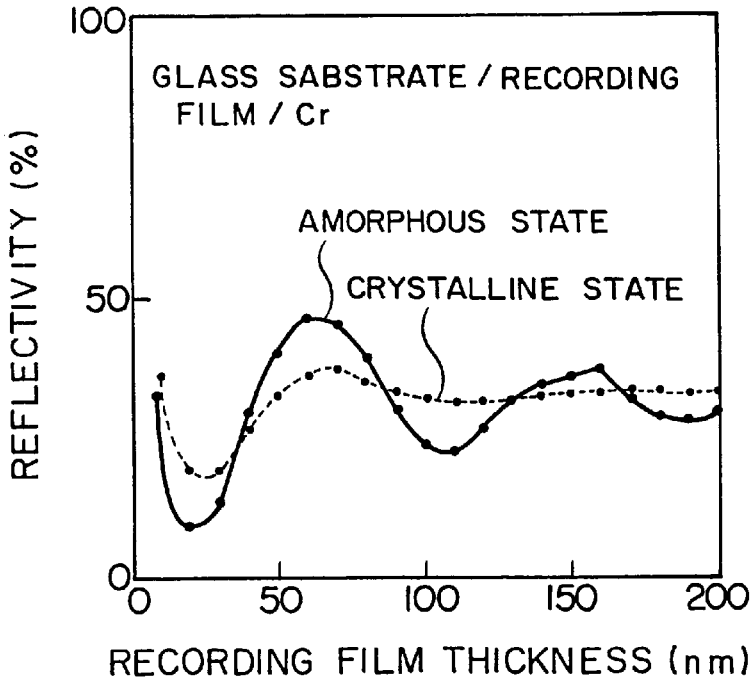
Figure 19B:
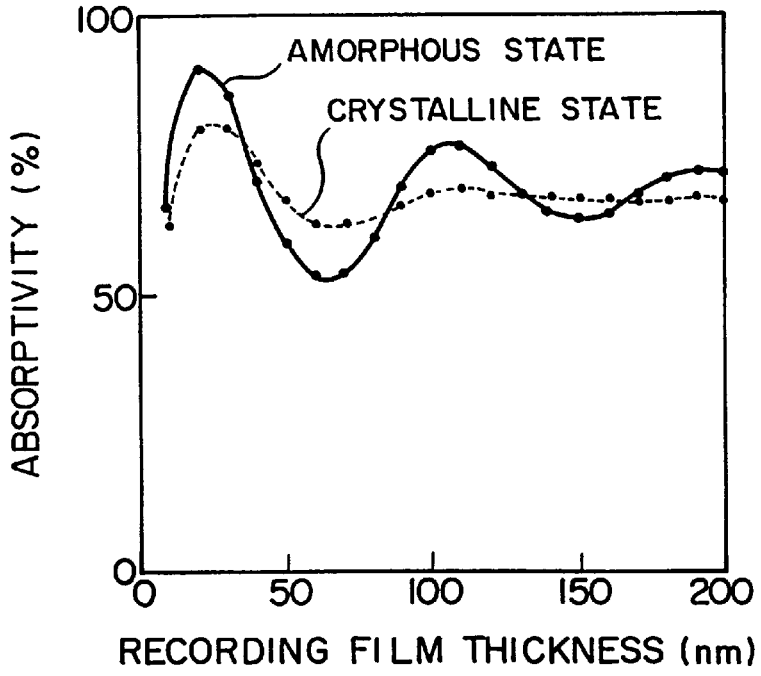
Figure 20A:
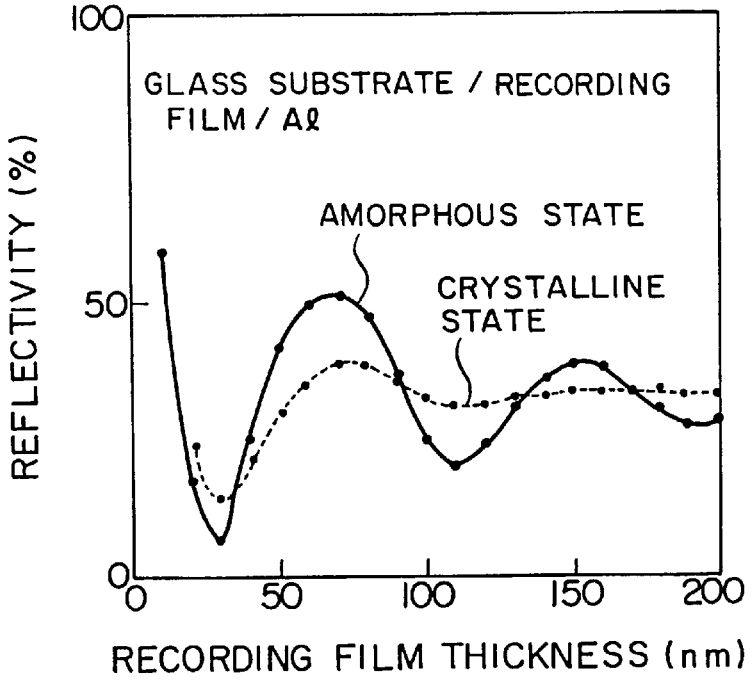
Figure 20B:
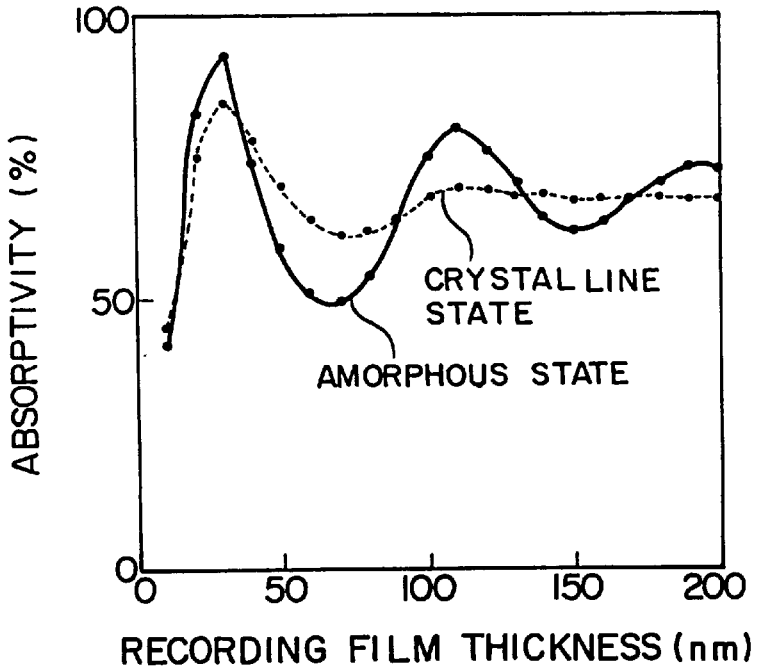
Figure 21A:
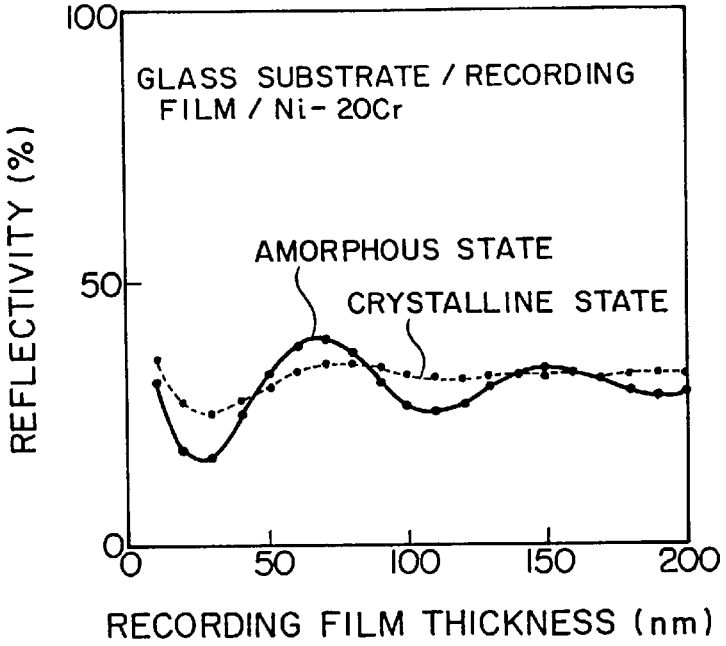
Figure 21B:
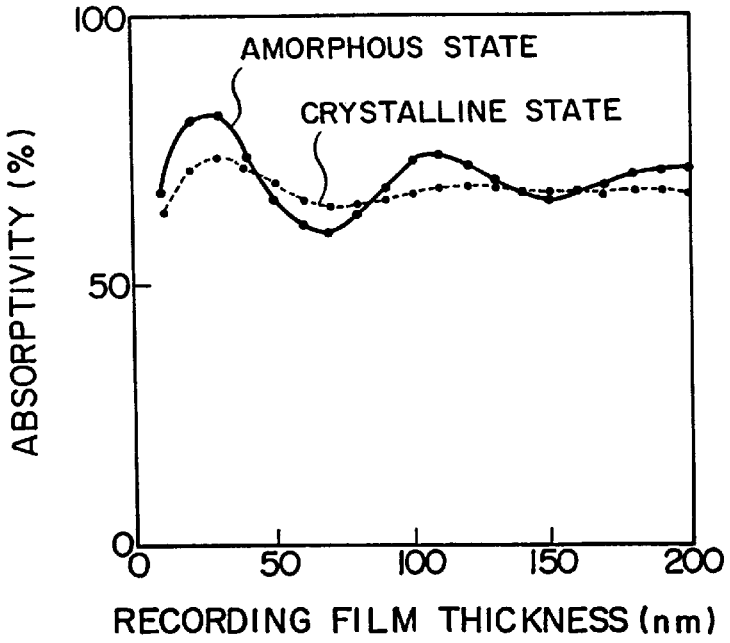

FIG. 17 shows a film constitution of glass substrate/recording film/metal reflection film, in which the thickness of the metal reflection film 12 was constant or 100 nm, and the thickness of the recording film 9 was changed up to the maximum of 200 nm. FIG. 18(a) shows a case where gold was used for the metal reflection film 12, and the resultant medium with regard to the change of reflectivity in the amorphous state and crystalline state. The thickness of the recording film in which the reflectivity difference can be substantially detected is in the range of between 30 nm and 90 nm and between 130 nm and 170 nm. As shown in FIG. 18(b), the absorptivity difference can be substantially detected when the thickness of the recording film is between about 30 nm and 80 nm and between about 130 nm and 160 nm. FIG. 19(a) and FIG. 19(b) show cases where chromium was used for the metal reflection film 12. Concerning the reflectivities, the reflectivity difference can be substantially detected when the film thickness is in the range of between about 40 nm and 80 nm and between 140 nm and 155 nm. Concerning the absorptivities, as shown in FIG. 19, the absorptivity difference can be substantially detected when the thickness of the recording film 9 is between about 40 nm and 80 nm, and about 150 nm. FIG. 20(a) and FIG. 20(b) show cases where aluminum was used for the metal reflection film 12. Concerning the reflectivities, the reflectivity difference can be substantially detected when the thickness of the recording film 9 is between about 40 nm and 90 nm and between about 130 nm and 160 nm. As shown in FIG. 20(b), the absorptivity difference can be substantially detected when the thickness of the recording film is between about 40 nm and 80 nm, and about 154 nm. FIG. 21(a) and FIG. 21(b) show cases where Ni-20$C_R$ (wt. %) was used for the metal reflection film 12. Concerning the reflectivities, the reflectivity difference can be substantially detected when the thickness of the recording film 9 is between about 50 nm and 80 nm. As shown in FIG. 21(b), the absorptivity difference can be substantially detected in the range of between about 50 nm and 80 nm.

Figure 22:
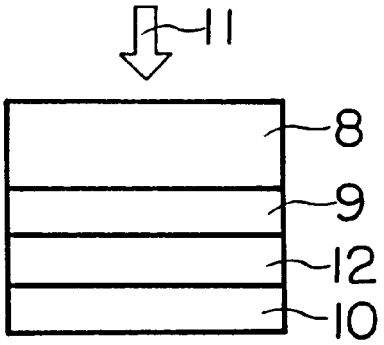

FIG. 22 shows a film constitution of PC substrate/recording film/metal reflection film/dielectric film, in which gold having a thickness of 100 nm was used for the metal reflection film 12, SiN having a thickness of 80 nm was used for the dielectric film 10, and the thickness of the recording film 9 was changed up to the maximum of 200 nm.

Figure 23A:
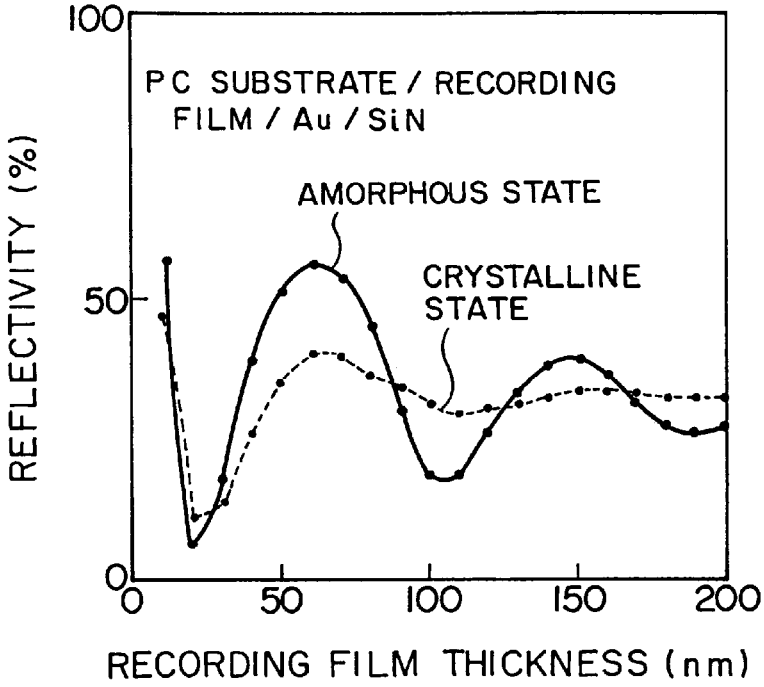
Figure 23B:
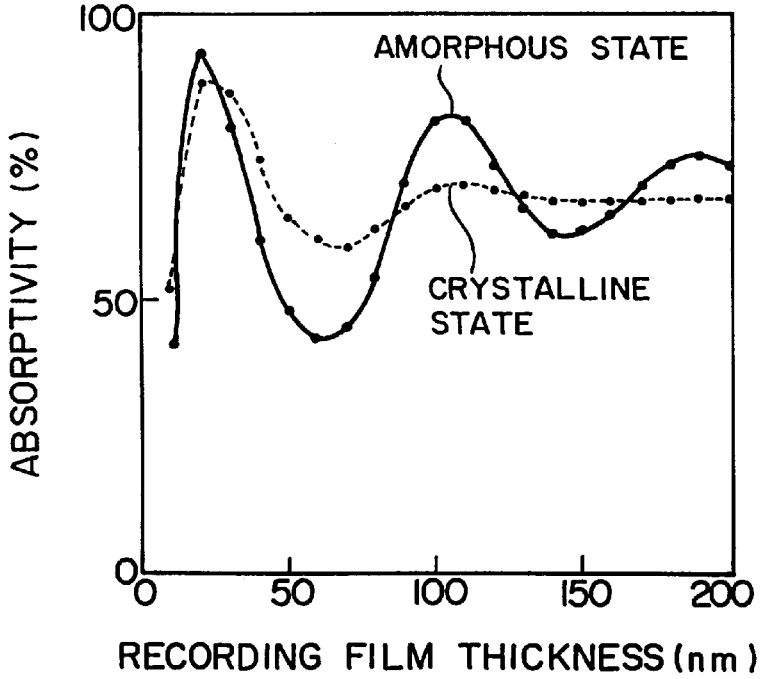

FIG. 23(a) shows changes of the reflectivities in the amorphous state and the crystalline state. The thickness of the recording film is between about 30 nm and 90 nm and between about 30 nm and 160 nm, in which ranges the reflection difference can be substantially detected. As shown in FIG. 23(b), the absorptivity difference can be substantially detected when the thickness of the recording film is between about 30 nm and 80 nm and between 130 nm and 160 nm.

Figure 24A:
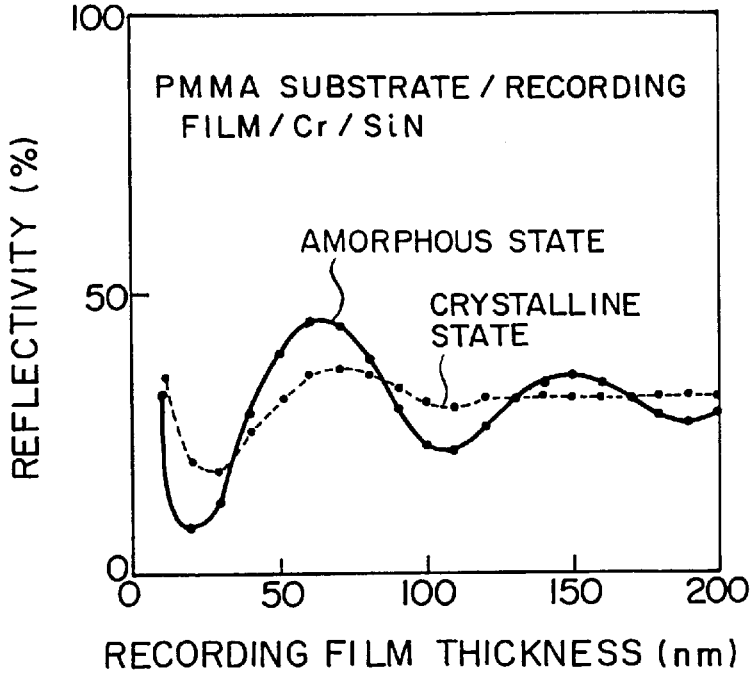
Figure 24B:
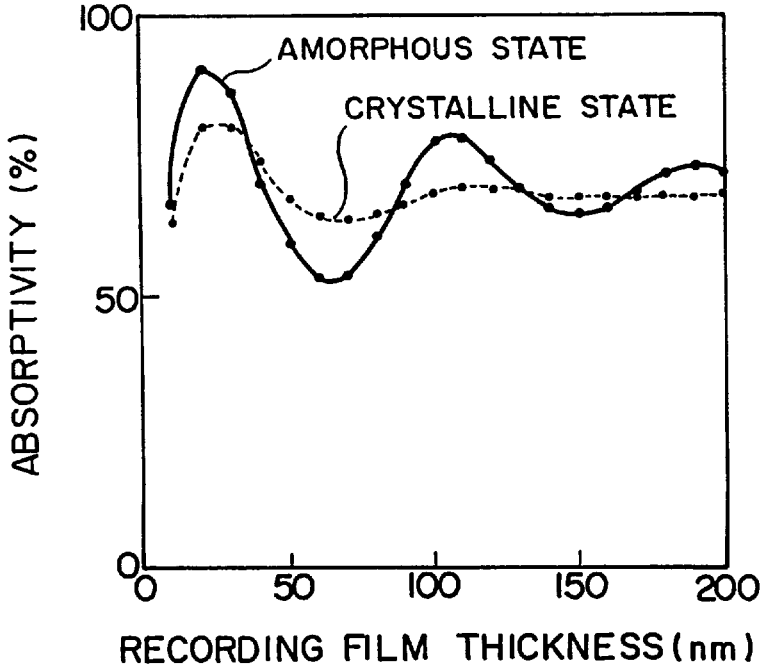

FIG. 24(a) and FIG. 24(b) show a case of a film constitution of PMMA substrate/recording film/metal reflection film/dielectric film, in which chromium having a thickness of 100 nm was used for the metal reflection film 12, SiN having a thickness of 80 nm was used for the dielectric film 10, and the thickness of the recording film 9 was changed up to the maximum of 200 nm.

FIG. 24(a) shows changes of the reflectivities in the amorphous state and crystalline state. The thickness of the recording film 9 is between about 40 nm and 80 nm and between about 130 nm and 170 nm. In these thicknesses, the reflection difference can be substantially detected. Concerning the absorptivity, as shown in FIG. 24(b), the absorptivity difference can be substantially detected when the thickness of the recording film 9 is between about 40 nm and 80 nm and in the vicinity of about 150 nm.

Figure 25A:
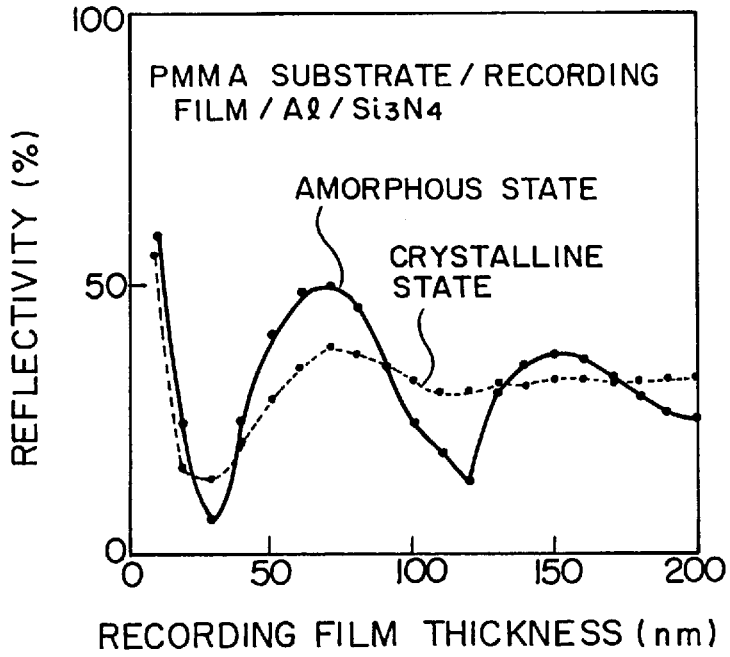
Figure 25B:
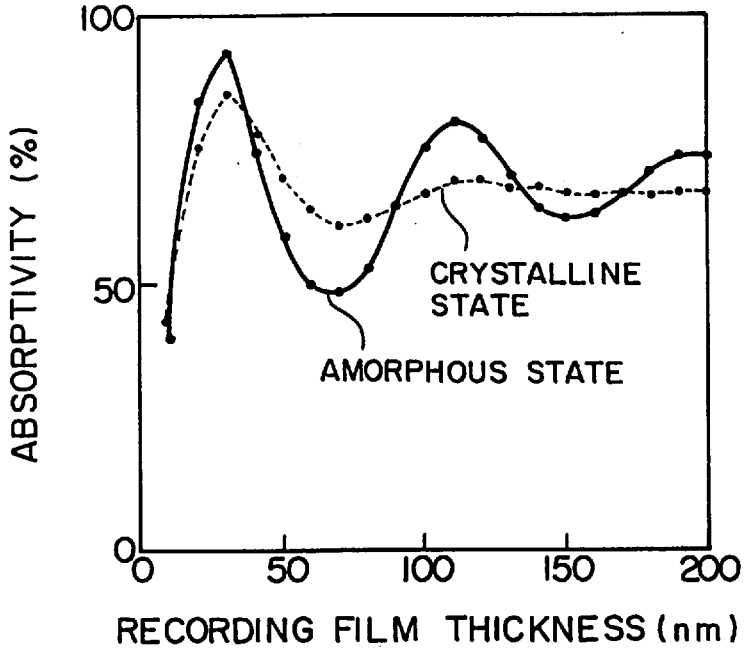

FIG. 25(a) and FIG. 25(b) show a case of a film constitution of PMMA substrate/recording film/metal reflection film/dielectric film, in which aluminum having a thickness of 100 nm was used for the metal reflection film 12, SiN having a thickness of 80 nm was used for the dielectric film 10, and the thickness of the recording film 9 was changed up to the maximum of 200 nm.

FIG. 25(a) shows changes of the reflectivities in the amorphous state and crystalline state. The thickness of the recording film 9 is between about 40 nm and 90 nm and in the vicinity of about 150 nm. In these thicknesses, the reflection difference can be substantially detected. Concerning the absorptivity, as shown in FIG. 25(b), the absorptivity difference can be substantially detected when the thickness of the recording film 9 is between about 40 nm and 90 nm and in the vicinity of about 150 nm.

Figure 26:
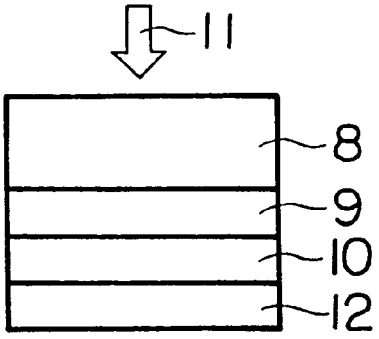

FIG. 26 shows a film constitution of glass substrate/recording film/dielectric film/metal reflection film, in which gold having a thickness of 60 nm was used for the metal reflection film 12, AlN having a thickness of 70 nm was used for the dielectric film 10, and the thickness of the recording film 9 was changed up to the maximum of 200 nm.

Figure 27A:
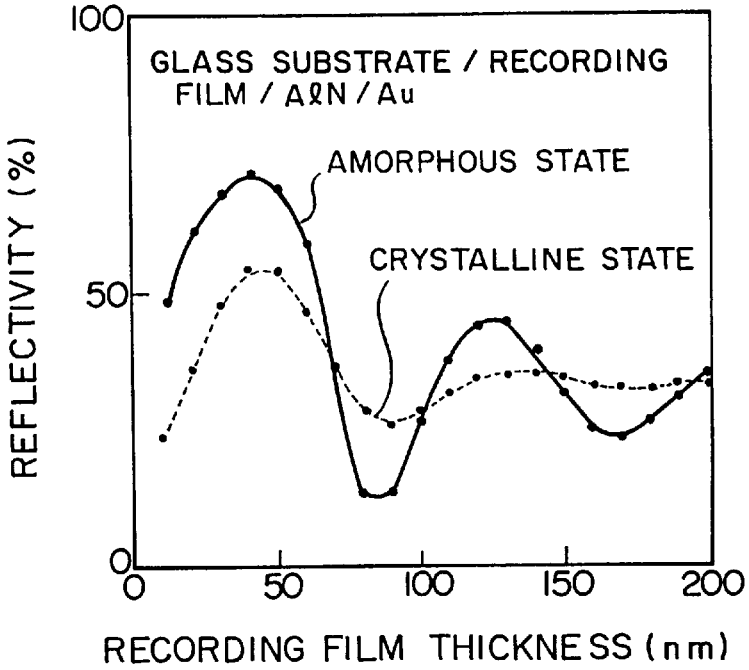
Figure 27B:
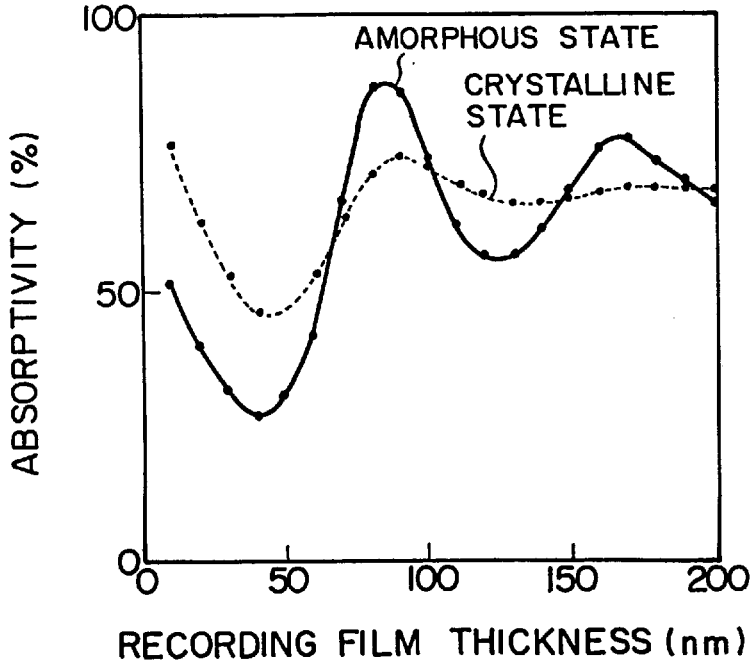

FIG. 27(a) shows changes of the reflectivities in the amorphous state and crystalline state. The thickness of the recording film 9 is between about 10 nm and 65 nm and between about 105 and 140 nm. In these thickness, the reflection difference can be substantially detected. Concerning the absorptivity, as shown in FIG. 27(b), the absorptivity difference can be substantially detected when the thickness of the recording film 9 is between about 10 nm and 60 nm and between about 100 nm and 140 nm.

Figure 28:
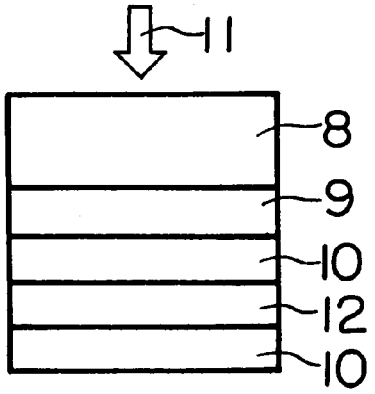

FIG. 28 shows a film constitution of glass substrate/recording film/dielectric film/metal reflection film/dielectric film, in which gold having a thickness of 60 nm was used for the metal reflection film 12, AlN having a thickness of 70 nm was used for the dielectric film 10, and the thickness of the recording film 9 was changed up to the maximum of 200 nm.

Figure 29A:
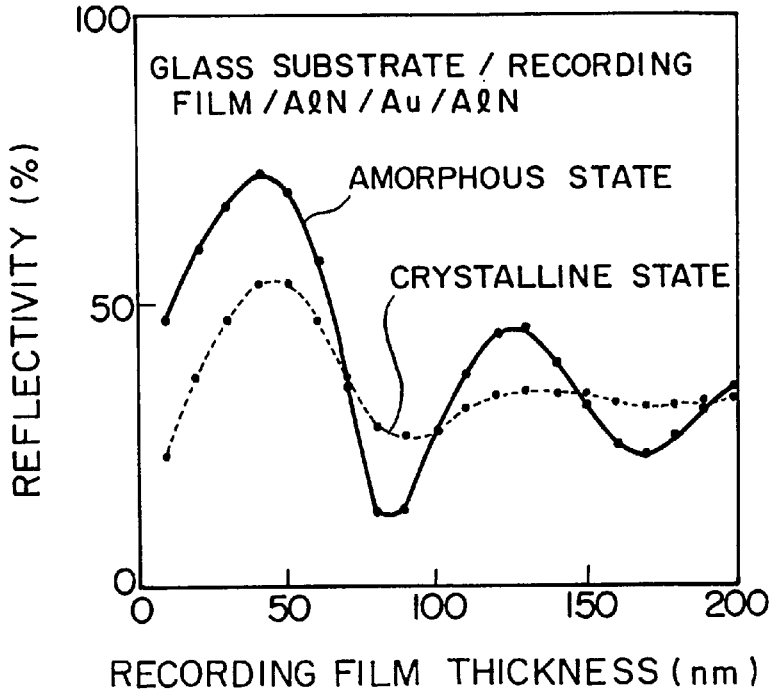
Figure 29B:
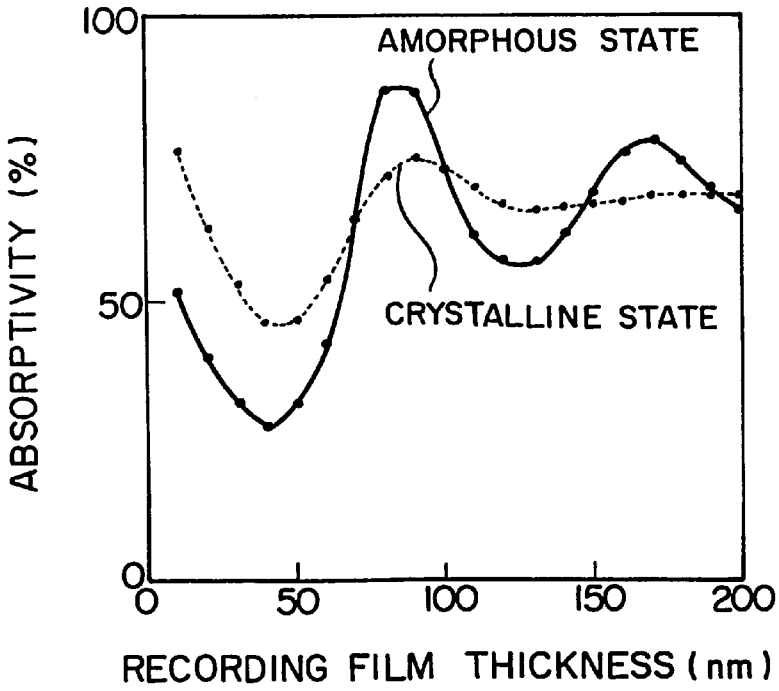

FIG. 29(a) shows changes of the reflectivities in the amorphous state and crystalline state. The thickness of the recording film 9 is between about 10 nm and 60 nm and between about 100 and 140 nm. In these thicknesses, the reflection difference can be substantially detected. Concerning the absorptivity, as shown in FIG. 29(b), the absorptivity difference can be substantially detected when the thickness of the recording film 9 is between about 10 nm and 70 nm and between about 100 nm and 140 nm.

Figure 30:
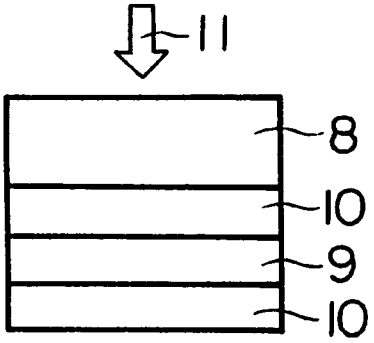

FIG. 30 shows a film constitution of PC substrate/dielectric film/recording film/dielectric film, in which AlN having a thickness of 70 nm was used for the dielectric film 10, and the thickness of the recording film 9 was changed up to the maximum of 200 nm.

Figure 31A:
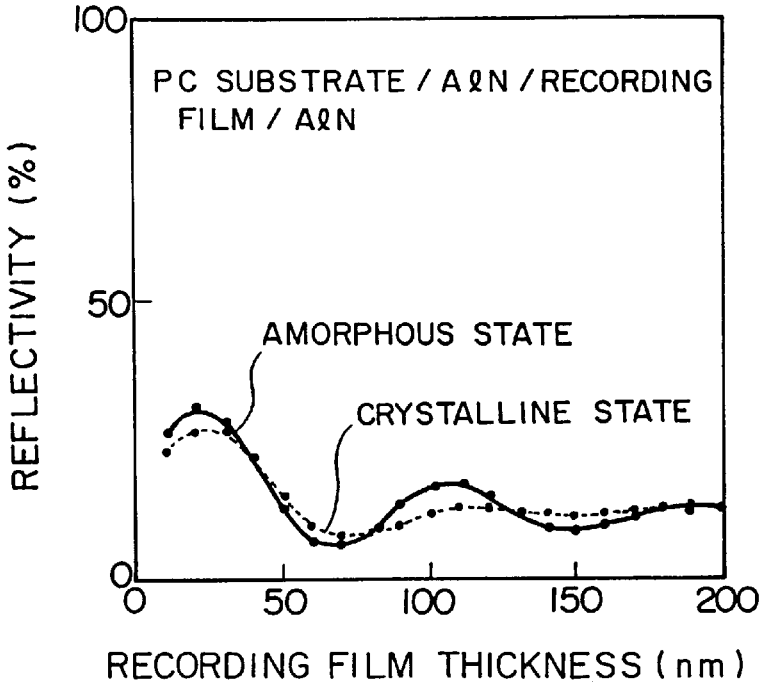
Figure 31B:
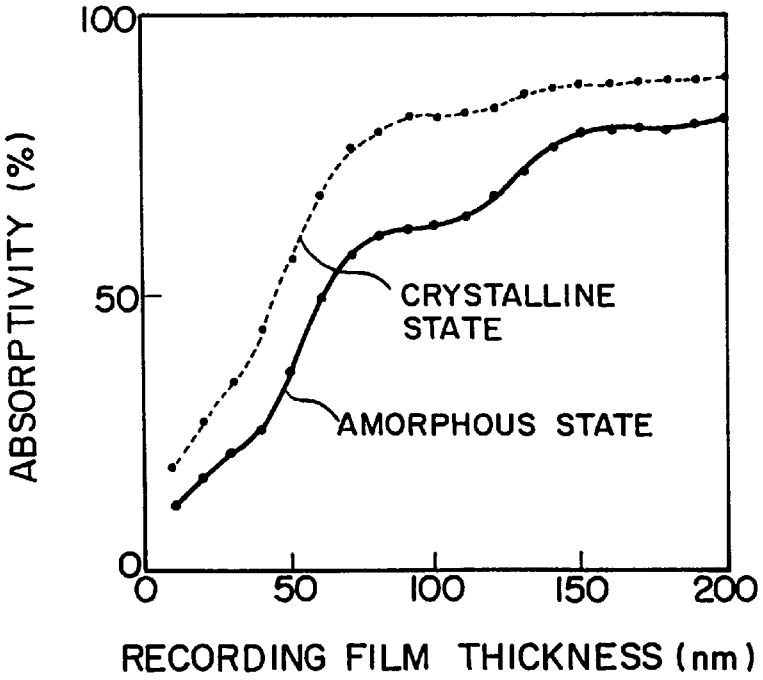

FIG. 31(a) shows changes of the reflectivities in the amorphous state and crystalline state. The thickness of the recording film 9 is between about 10 nm and 30 nm and between about 100 and 120 nm. In these thicknesses, the reflection difference can be substantially detected. Concerning the absorptivity, as shown in FIG. 31(b), the absorptivity difference can be substantially detected in all the range of thickness of the recording film 9.

Figure 32:
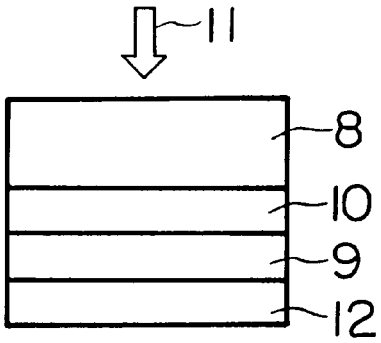

FIG. 32 shows a film constitution of PMMA substrate/dielectric film/recording film/metal reflection film, in which aluminum having a thickness of 100 nm was used for the metal reflection film 12, AlN having a thickness of 70 nm was used for the dielectric film 10, and the thickness of the recording film 9 was changed up to the maximum of 200 nm.

Figure 33A:
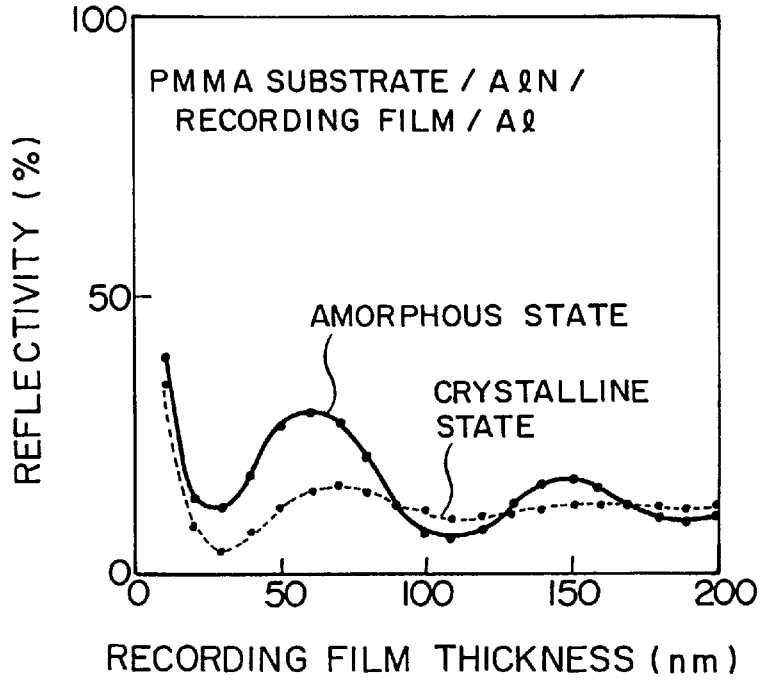
Figure 33B:
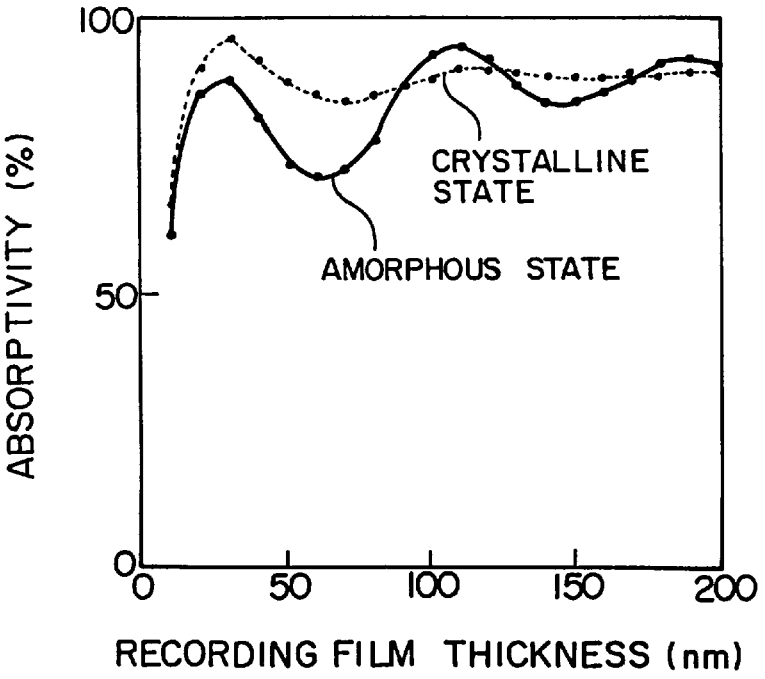

FIG. 33(a) shows changes of the reflectivities in the amorphous state and crystalline state. The thickness of the recording film 9 is between about 20 nm and 80 nm and between about 130 and 160 nm. In these thicknesses, the reflection difference can be substantially detected. Concerning the absorptivity, as shown in FIG. 33(b), the absorptivity difference can be substantially detected when the thickness of the recording film 9 is between about 20 nm and 80 nm and between about 130 nm and 160 nm.

Figure 34A:
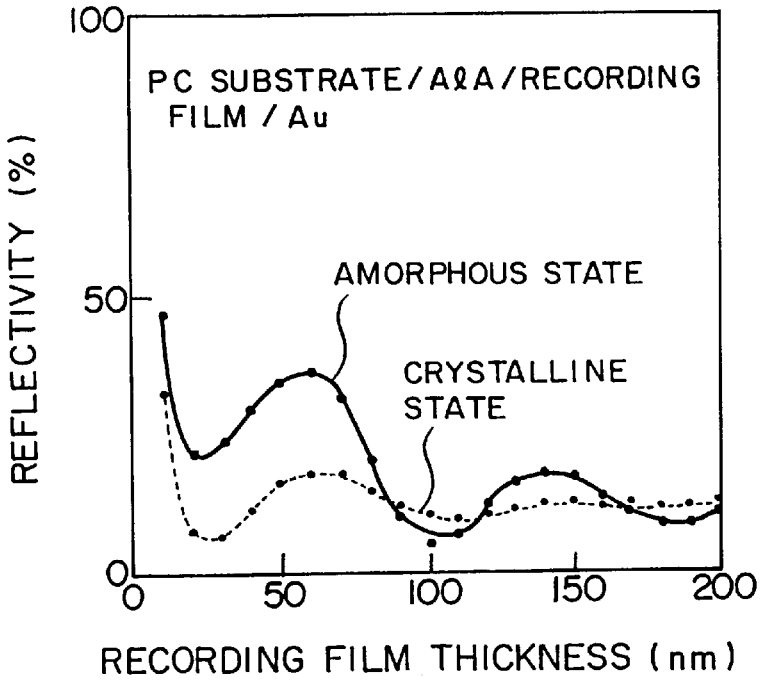
Figure 34B:
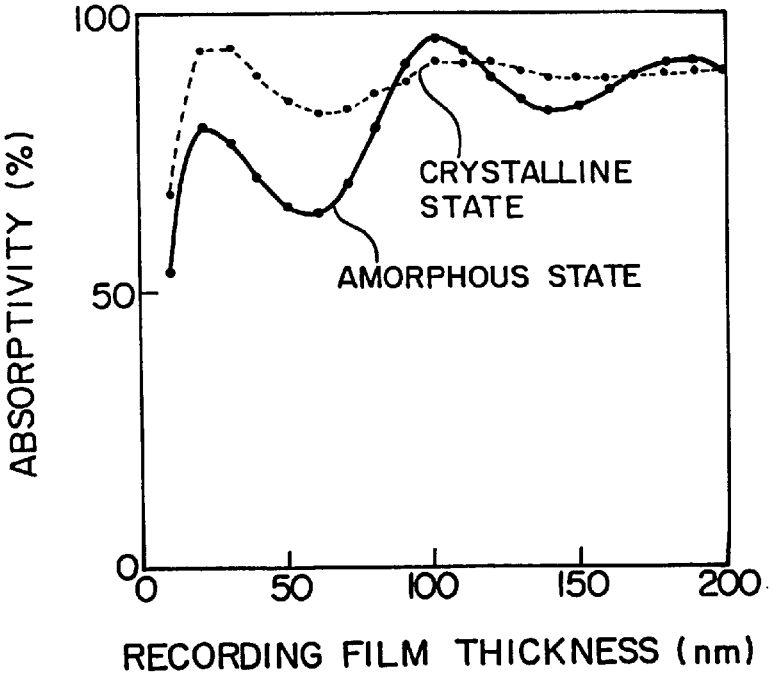

FIG. 34(a) and FIG. 34(b) show a case of a film constitution of PC substrate/dielectric film/recording film/metal reflection film, in which gold having a thickness of 100 nm was used for the metal reflection film 12, AlN having a thickness of 70 nm was used for the dielectric film 10, and the thickness of the recording film 9 was changed up to the maximum of 200 nm.

FIG. 34(a) shows changes of the reflectivities in the amorphous state and crystalline state. The thickness of the recording film 9 is between about 10 nm and 80 nm and between about 120 nm and 160 nm. In these thicknesses, the reflection difference can be substantially detected. Concerning the absorptivity, as shown in FIG. 34(b), the absorptivity difference can be substantially detected when the thickness of the recording film 9 is between about 10 nm and 80 nm and between about 120 nm and 160 nm.

Figure 35:
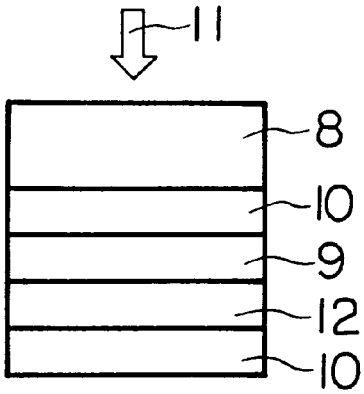

FIG. 35 shows a film constitution of glass substrate/dielectric film/recording film/metal reflection film/dielectric film, in which gold having a thickness of 100 nm was used for the metal reflection film 12, AlN having a thickness of 70 nm was used for the dielectric film 10, and the thickness of the recording film 9 was changed up to the maximum of 200 nm.

Figure 36A:
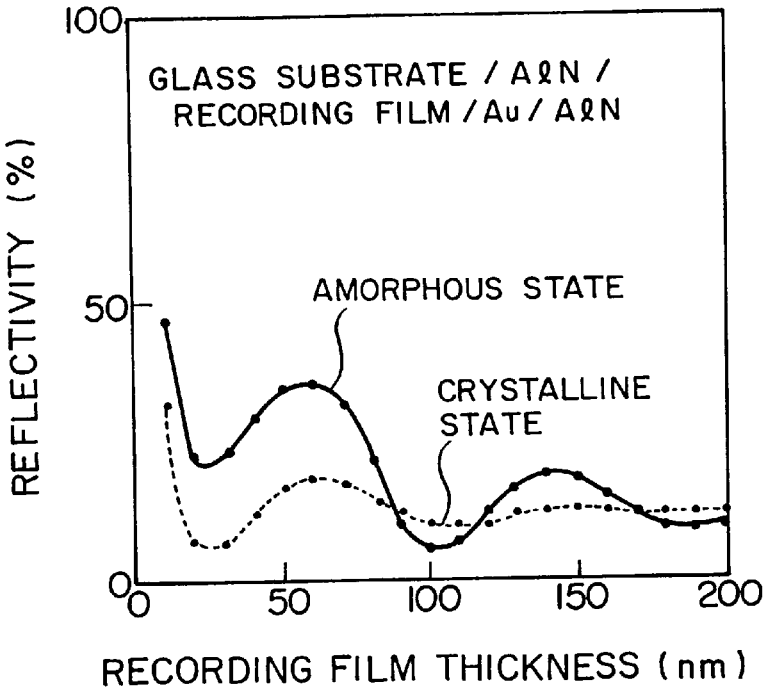
Figure 36B:
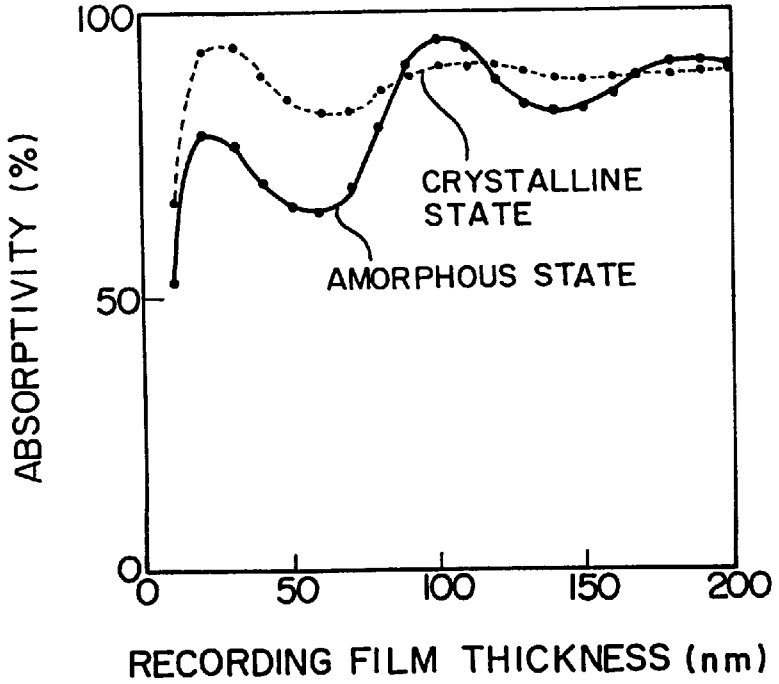

FIG. 36(a) shows changes of the reflectivities in the amorphous state and crystalline state. The thickness of the recording film 9 is between about 10 nm and 80 nm and between about 120 and 160 nm. In these thicknesses, the reflection difference can be substantially detected. Concerning the absorptivity, as shown in FIG. 36(b), the absorptivity difference can be substantially detected when the thickness of the recording film 9 is between about 10 nm and 80 nm and between about 120 nm and 160 nm.

Figure 37A:
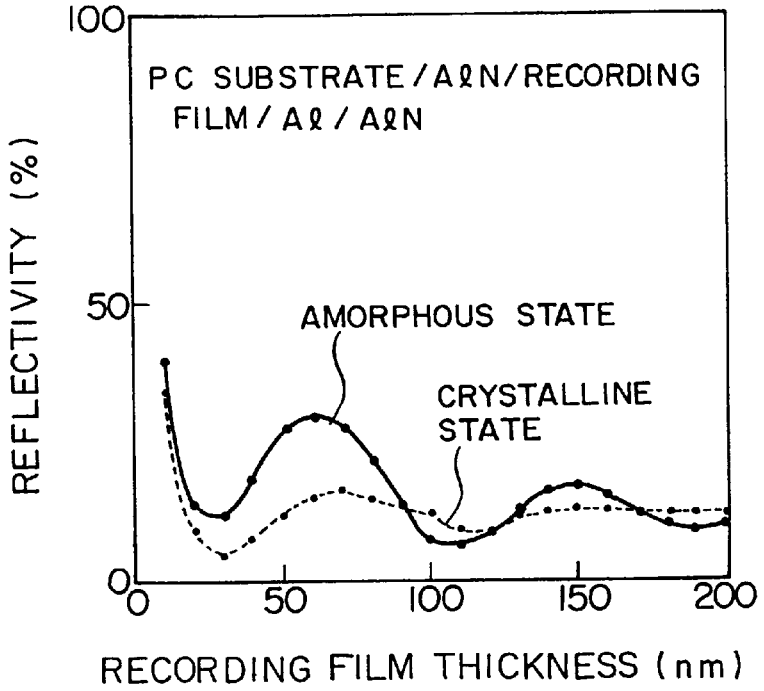
Figure 37B:
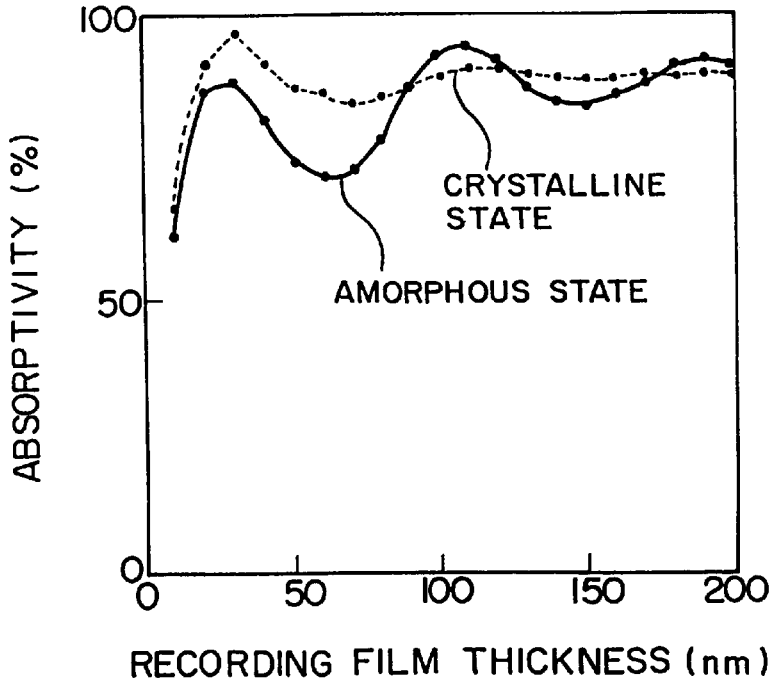

FIG. 37(a) and FIG. 37(b) show a case of a film constitution of PC substrate/dielectric film/recording film/metal reflection film/dielectric film, in which aluminum having a thickness of 100 nm was used for the metal reflection film 12, AlN having a thickness of 70 nm was used for the dielectric film 10, and the thickness of the recording film 9 was changed up to the maximum of 200 nm.

FIG. 37(a) shows changes of the reflectivities in the amorphous state and crystalline state. The thickness of the recording film 9 is between about 20 nm and 80 nm and between about 130 and 160 nm. In these thicknesses, the reflection difference can be substantially detected. Concerning the absorptivity, as shown in FIG. 37(b), the absorptivity difference can be substantially detected when the thickness of the recording film 9 is between about 20 nm and 85 nm and between about 130 nm and 160 nm.

Figure 38:
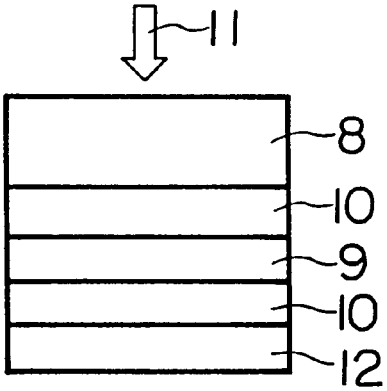

FIG. 38 shows a film constitution of PC substrate/dielectric film/recording film/dielectric film/metal reflection film, in which gold having a thickness of 100 nm was used for the metal reflection film 12, AlN having a thickness of 70 nm was used for the dielectric film 10, and the thickness of the recording film 9 was changed up to the maximum of 200 nm.

Figure 39A:
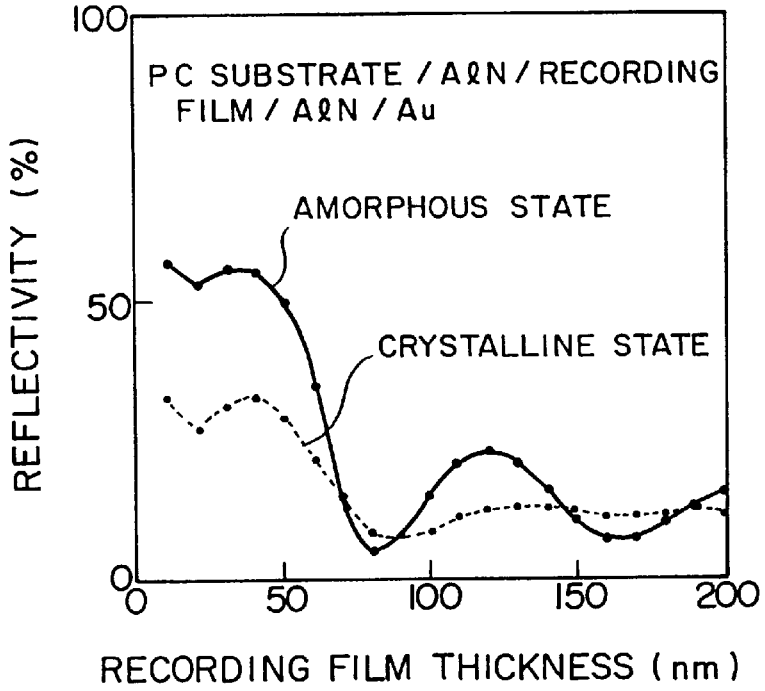
Figure 39B:
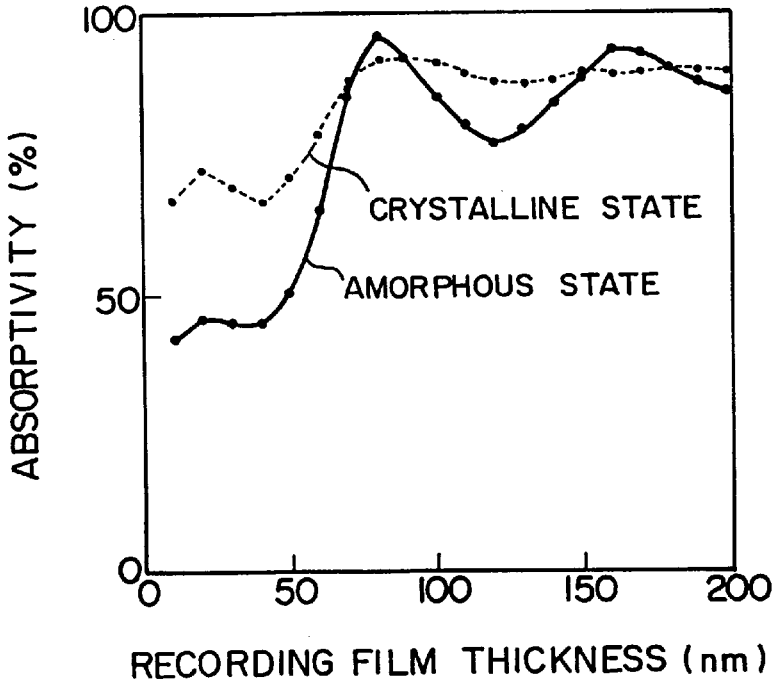

FIG. 39(a) shows changes of the reflectivities in the amorphous state and crystalline state. The thickness of the recording film 9 is between about 10 nm and 70 nm and between about 90 and 150 nm. In these thicknesses, the reflection difference can be substantially detected. Concerning the absorptivity, as shown in FIG. 39(b), the absorptivity difference can be substantially detected when the thickness of the recording film 9 is between about 10 nm and 70 nm and between about 90 nm and 150 nm.

Figure 40A:
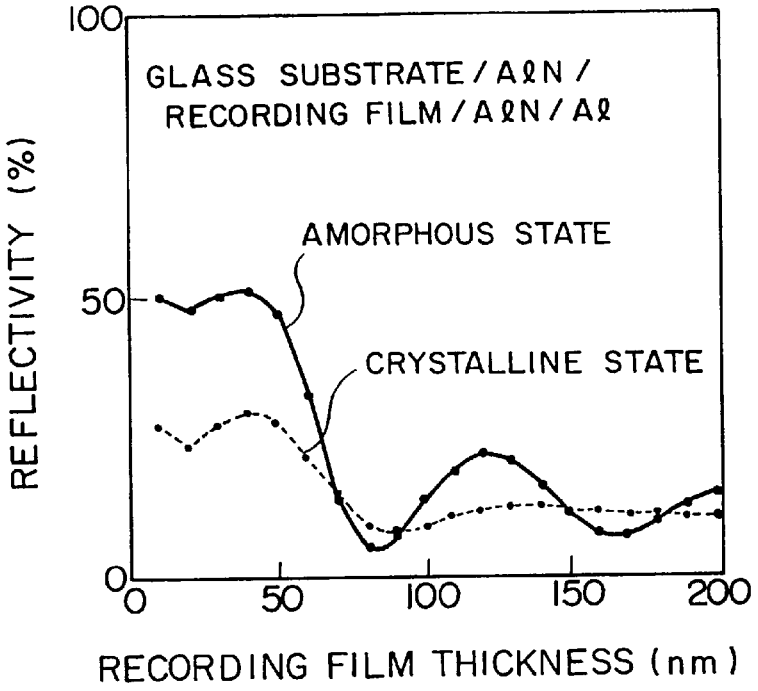
Figure 40B:
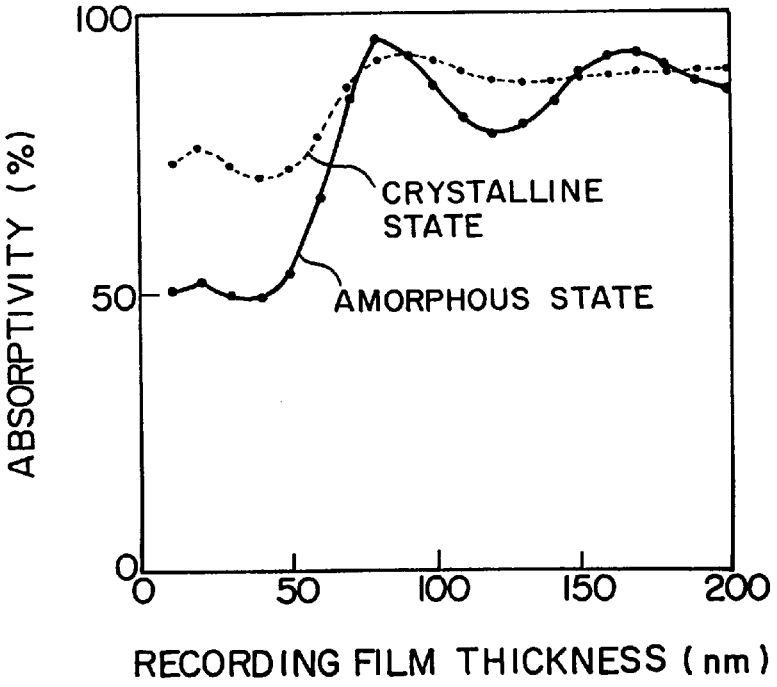

FIG. 40(a) and FIG. 40(b) show a case of a film constitution of glass substrate/dielectric film/recording film/dielectric film/metal reflection film, in which aluminum having a thickness of 100 nm was used for the metal reflection film 12, AlN having a thickness of 70 nm was used for the dielectric film 10, and the thickness of the recording film 9 was changed up to the maximum of 200 nm.

FIG. 40(a) shows changes of the reflectivities in the amorphous state and crystalline state. The thickness of the recording film 9 is between about 10 nm and 70 nm and between about 90 and 150 nm. In these thicknesses, the reflection difference can be substantially detected. Concerning the absorptivity, as shown in FIG. 40(b), the absorptivity difference can be substantially detected when the thickness of the recording film 9 is between about 10 nm and 70 nm and between about 70 nm and 150 nm.

Figure 41:
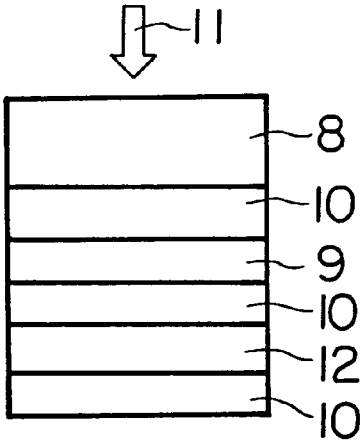

FIG. 41 shows a film constitution of PC substrate/dielectric film/recording film/dielectric film/metal reflection film/dielectric film, in which gold having a thickness of 100 nm was used for the metal reflection film 12, AlN having a thickness of 70 nm was used for the dielectric film 10, and the thickness of the recording film 9 was changed up to the maximum of 200 nm.

Figure 42A:
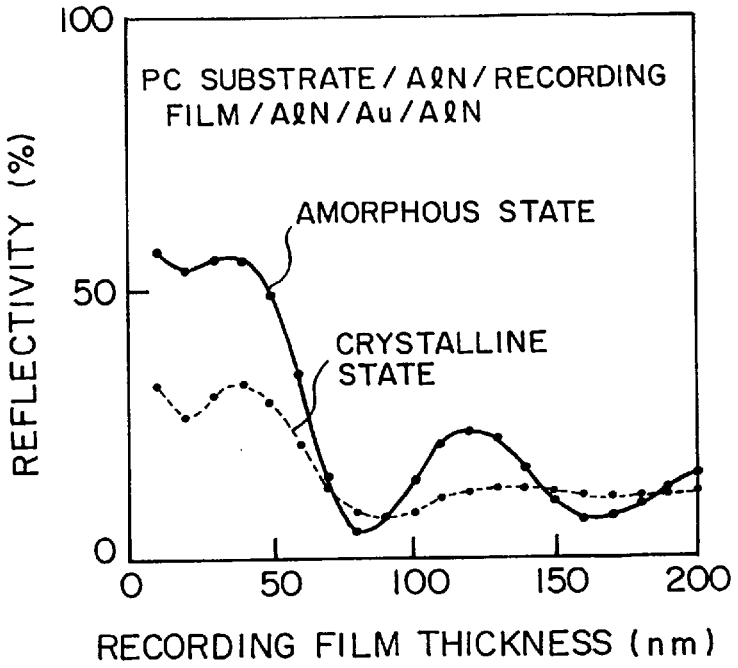
Figure 42B:
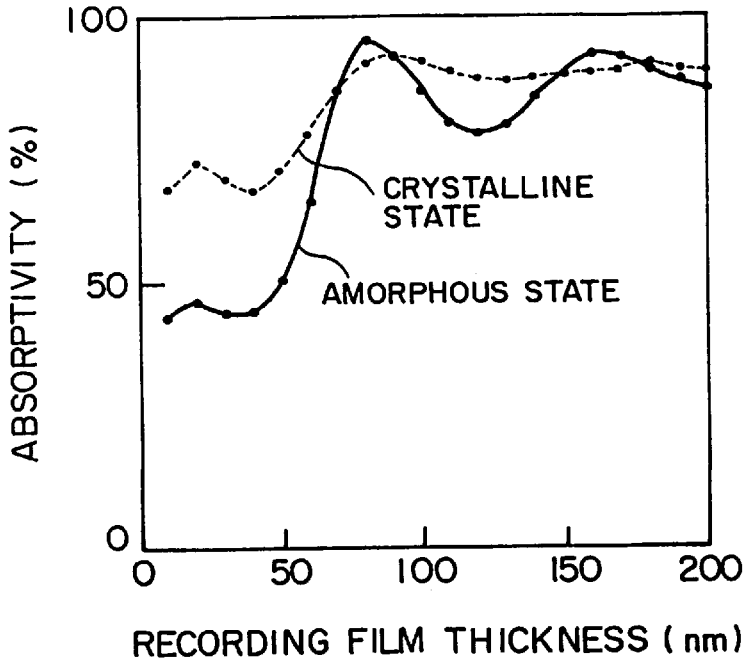

FIG. 42(a) shows changes of the reflectivities in the amorphous state and crystalline state. The thickness of the recording film 9 is between about 10 nm and 70 nm and between about 90 and 150 nm. In these thicknesses, the reflection difference can be substantially detected. Concerning the absorptivity, as shown in FIG. 42(b), the absorptivity difference can be substantially detected when the thickness of the recording film 9 is between about 10 nm and 70 nm and between about 90 nm and 150 nm.

Figure 43A:
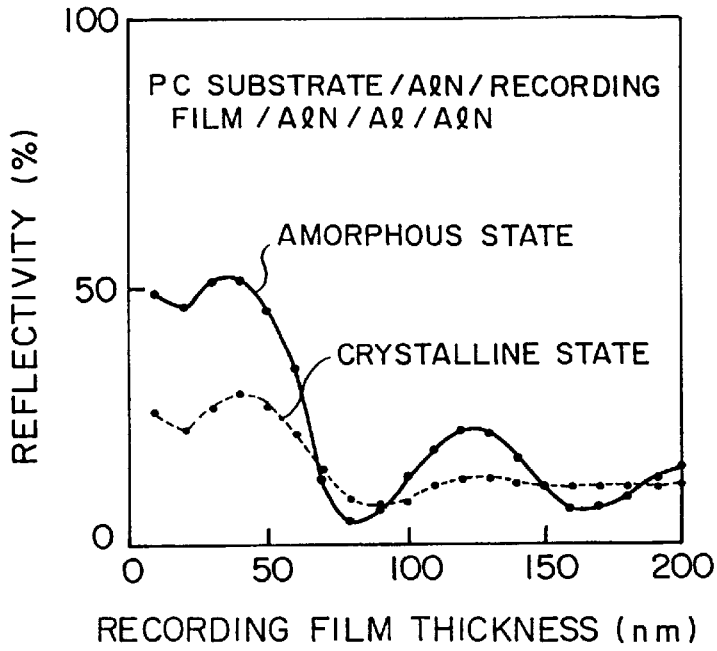
Figure 43B:
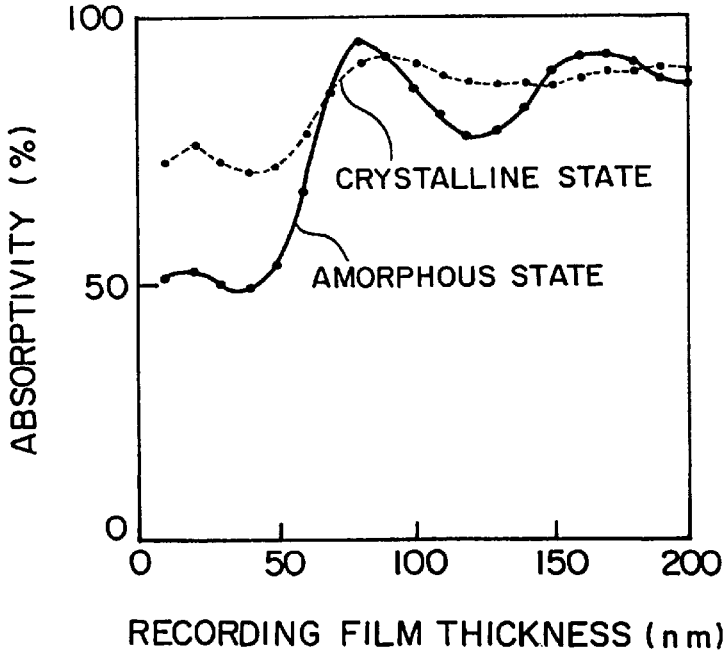

FIG. 43(a) and FIG. 43(b) show a case of a film constitution of PC substrate/dielectric film/recording film/dielectric film/metal reflection film/dielectric film, in which aluminum having a thickness of 70 nm was used for the metal reflection film 12, AlN having a thickness of 70 nm was used for the dielectric film 10, and the thickness of the recording film 9 was changed up to the maximum of 200 nm.

FIG. 43(a) shows changes of the reflectivities in the amorphous state and crystalline state. The thickness of the recording film 9 is between about 10 nm and 70 nm and between about 90 and 150 nm. In these thicknesses, the reflection difference can be substantially detected. Concerning the absorptivity, as shown in FIG. 43(b), the absorptivity difference can be substantially detected when the thickness of the recording film 9 is between about 10 nm and 70 nm and between about 70 nm and 150 nm.

Figure 44:
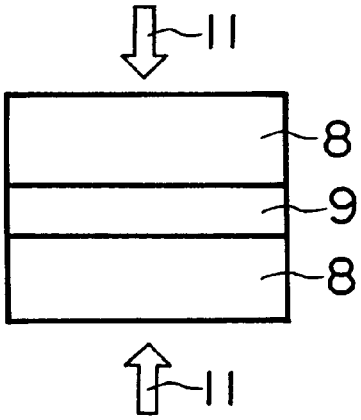

FIG. 44 shows a film constitution of glass substrate/recording film/glass substrate, in which the thickness of the recording film 9 was changed up to the maximum of 200 nm.

Figure 45:
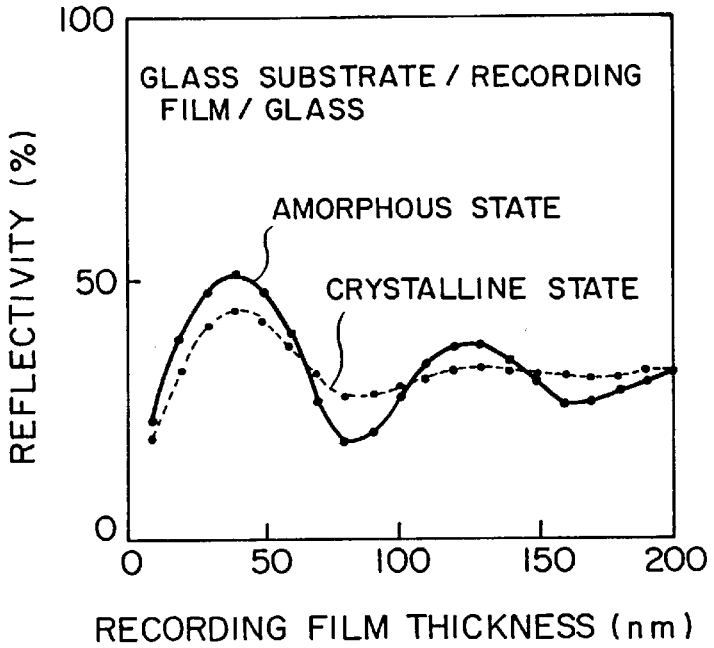
Figure 45B:
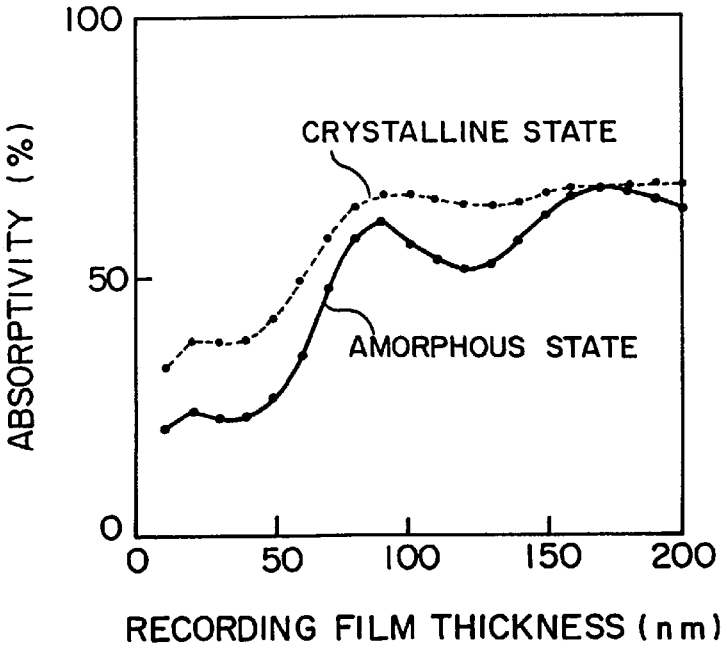

FIG. 45(a) shows changes of the reflectivities in the amorphous state and crystalline state. The thickness of the recording film 9 is between about 10 nm and 60 nm and between about 100 and 150 nm. In these thicknesses, the reflection difference can be substantially detected. Concerning the absorptivity, as shown in FIG. 45(b), the absorptivity difference can be substantially detected when the thickness of the recording film 9 is between about 10 nm and 170 nm and between about 180 nm and 200 nm.

Figure 46:
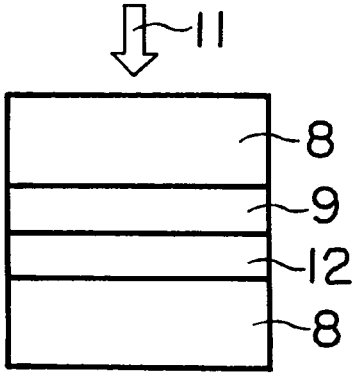

FIG. 46 shows a film constitution of glass substrate/recording film/metal reflection film/glass substrate, in which gold having a thickness of 100 nm was used for the metal reflection film 12 and the thickness of the recording film 9 was changed up to the maximum of 200 nm.

Figure 47A:
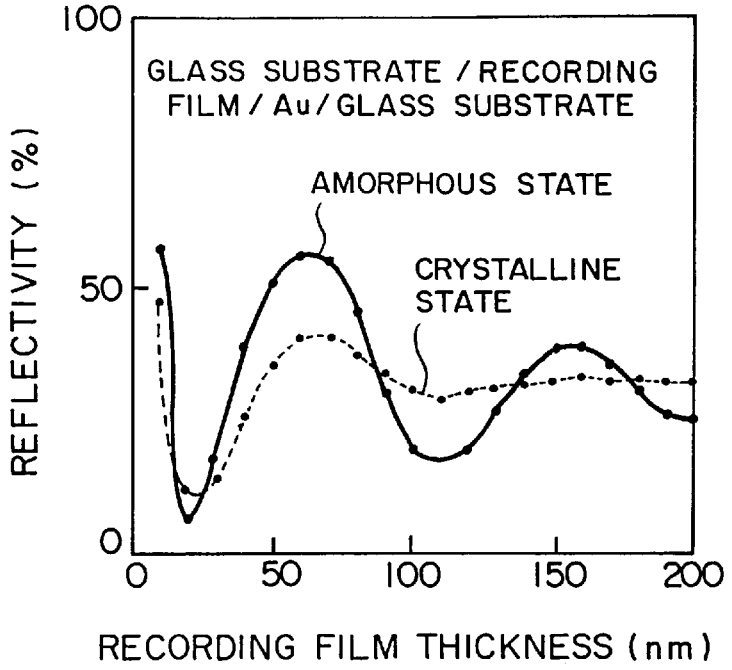
Figure 47B:
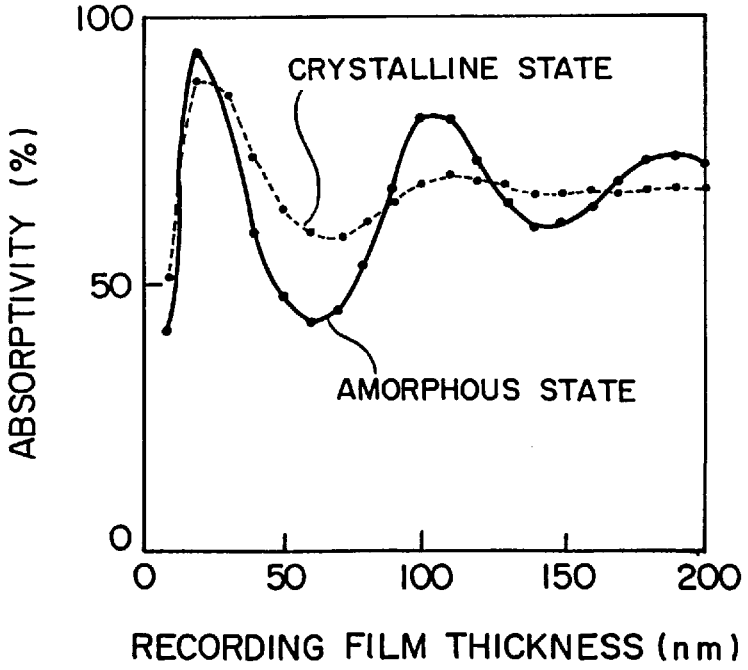

FIG. 47(a) shows changes of the reflectivities in the amorphous state and crystalline state. The thickness of the recording film 9 is between about 30 nm and 90 nm and between about 140 and 170 nm. In these thicknesses, the reflection difference can be substantially detected. Concerning the absorptivity, as shown in FIG. 47(b), the absorptivity difference can be substantially detected when the thickness of the recording film 9 is between about 30 nm and 90 nm and between about 130 nm and 160 nm.

Figure 48:
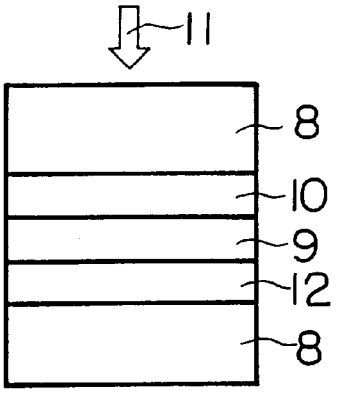

FIG. 48 shows a film constitution of PC substrate/SiN/recording film/Au/PC substrate, in which a gold having a thickness of 100 nm was used for the metal reflection film 12, SiN having a thickness of 70 nm was used for the dielectric film 10, and the thickness of the recording film 9 was changed up to the maximum of 200 nm.

Figure 49A:
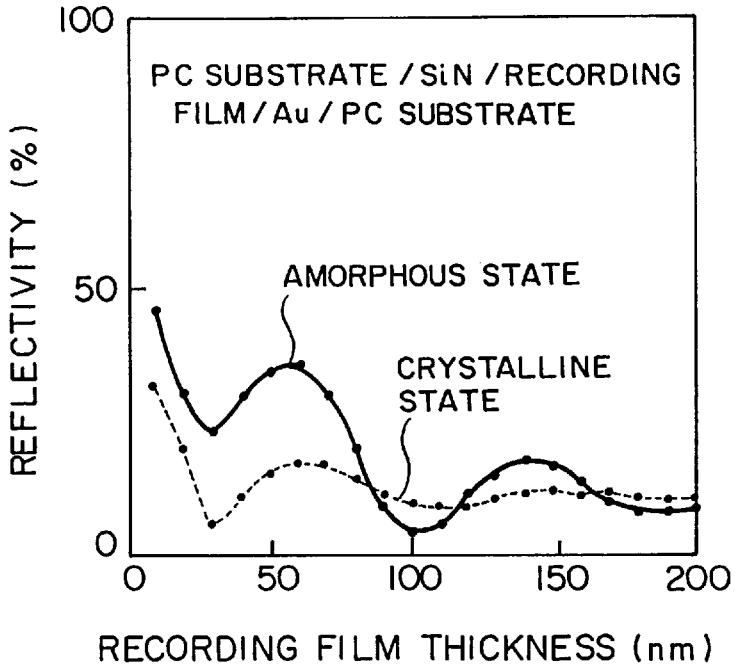
Figure 49B:
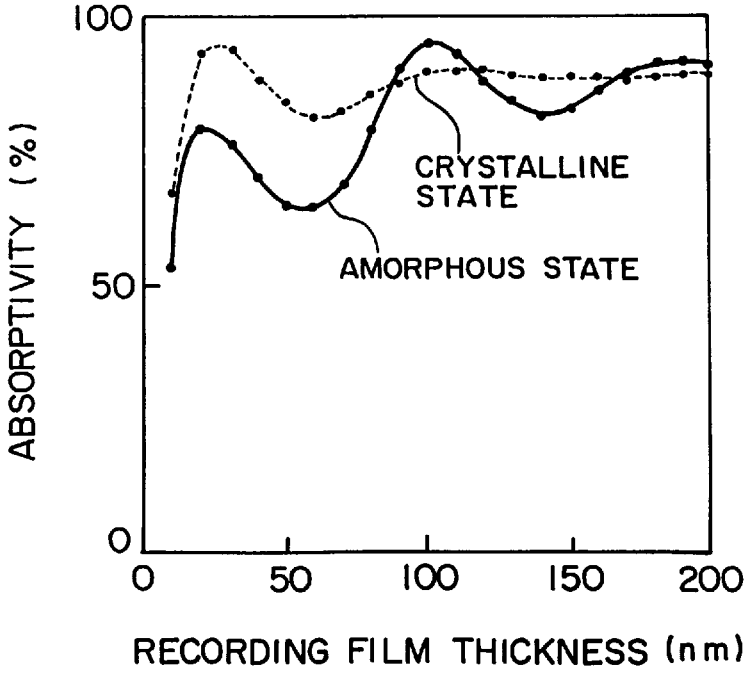

FIG. 49(a) shows changes of the reflectivities in the amorphous state and crystalline state. The thickness of the recording film 9 is between about 10 nm and 80 nm and between about 120 and 160 nm. In these thicknesses, the reflection difference can be substantially detected. Concerning the absorptivity, as shown in FIG. 49(b), the absorptivity difference can be substantially detected when the thickness of the recording film 9 is between about 10 nm and 80 nm and between about 120 nm and 160 nm.

Figure 50:
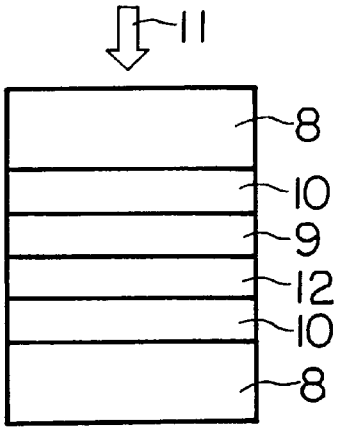

FIG. 50 shows a film constitution of PC substrate/SiN/recording film/Au/SiN/PC substrate, in which gold having a thickness of 100 nm was used for the metal reflection film 12, SiN having a thickness of 70 nm was used for the dielectric film 10, and the thickness of the recording film 9 was changed up to the maximum of 200 nm.

Figure 51A:
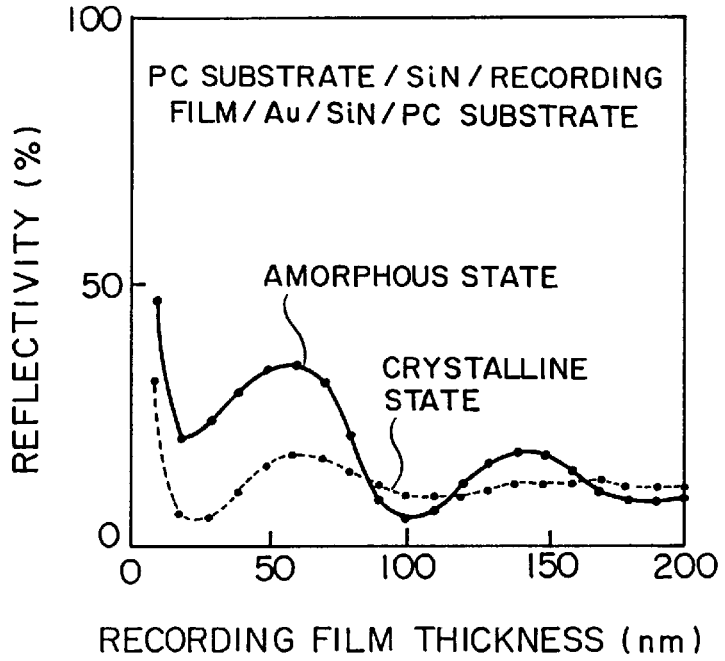
Figure 51B:
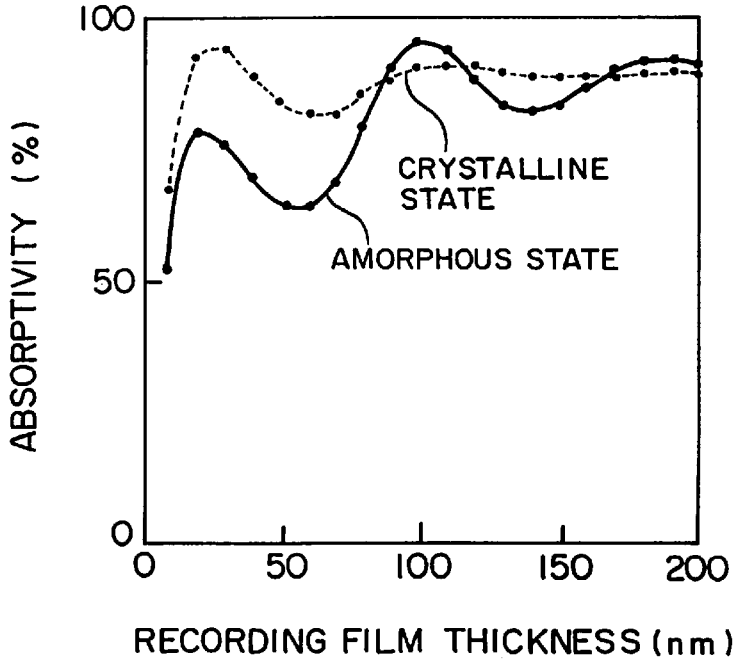

FIG. 51(a) shows changes of the reflectivities in the amorphous state and crystalline state. The thickness of the recording film 9 is between about 10 nm and 80 nm and between about 120 and 160 nm. In these thicknesses, the reflection difference can be substantially detected. Concerning the absorptivity, as shown in FIG. 51(b), the absorptivity difference can be substantially detected when the thickness of the recording film 9 is between about 10 nm and 80 nm and between about 120 nm and 160 nm.

Figure 52:
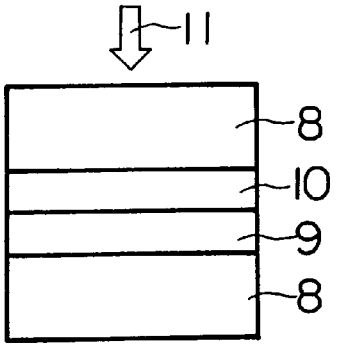

FIG. 52 shows a film constitution of glass substrate/SiN/recording film/glass substrate, in which, SiN having a thickness of 70 nm was used for the dielectric film 10, and the thickness of the recording film 9 was changed up to the maximum of 200 nm.

Figure 53A:
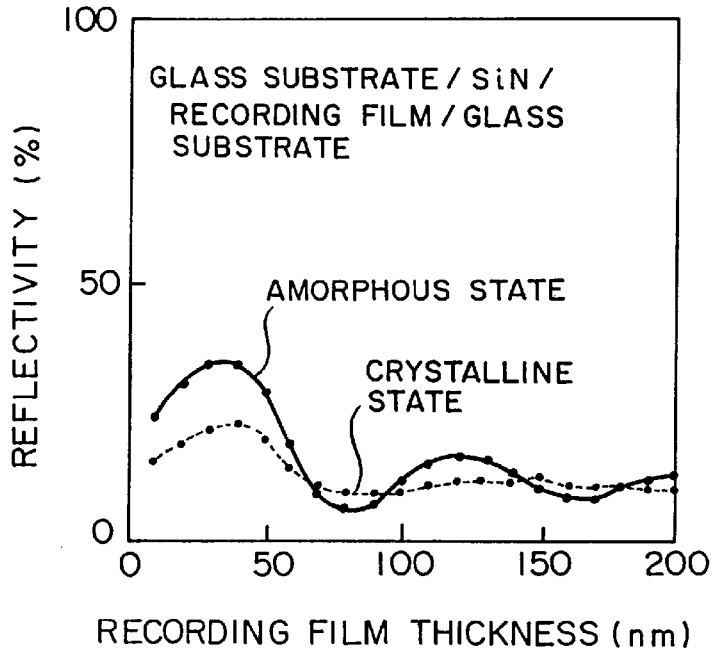
Figure 53B:
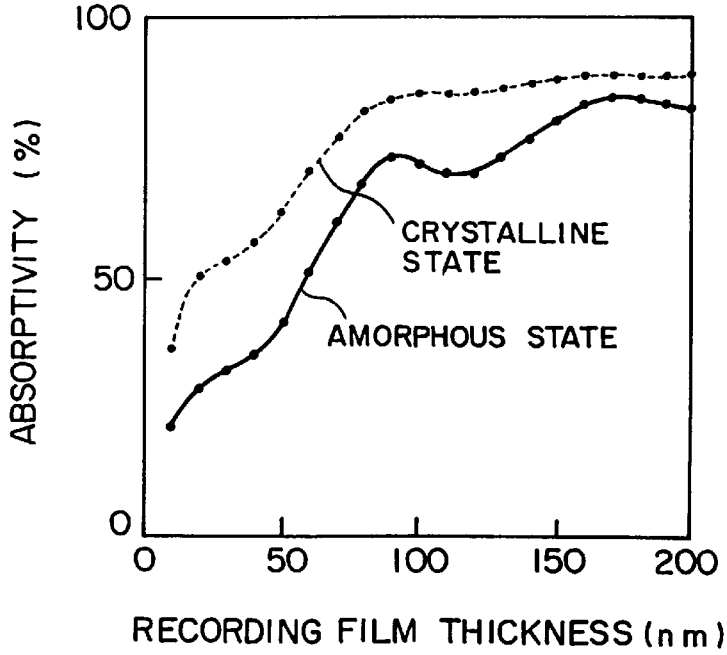

FIG. 53(a) shows changes of the reflectivities in the amorphous state and crystalline state. The thickness of the recording film 9 is between about 10 nm and 60 nm and between about 100 and 140 nm. In these thicknesses, the reflection difference can be substantially detected. Concerning the absorptivity, as shown in FIG. 53(b), the absorptivity difference can be substantially detected when the thickness of the recording film 9 is between about 10 nm and 200 nm.

Figure 54:
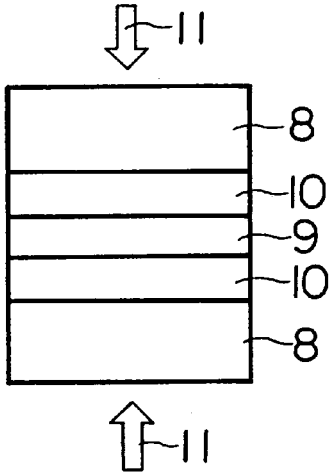

FIG. 54 shows a film constitution of PC substrate/SiN/recording film/SiN/PC substrate, in which SiN having a thickness of 70 nm was used for the dielectric film 10, and the thickness of the recording film 9 was changed up the maximum of 200 nm.

Figure 55A:
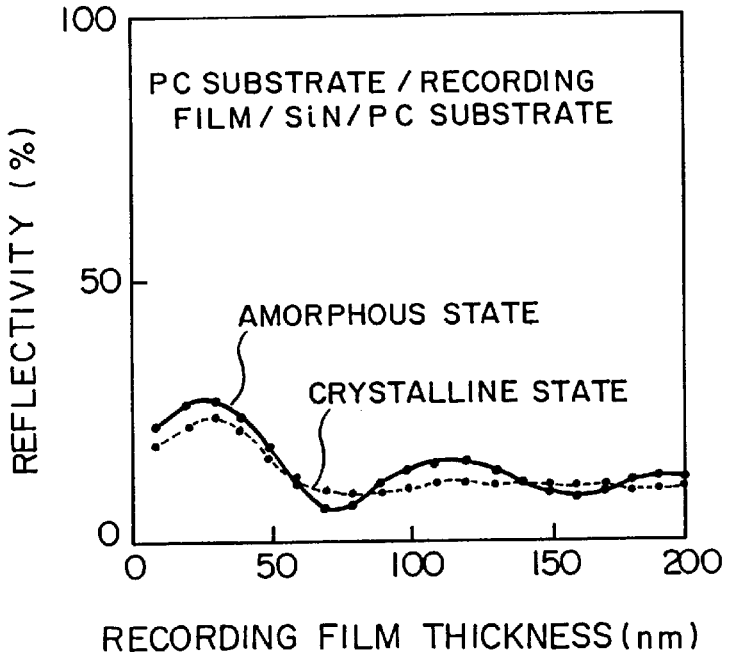
Figure 55B:
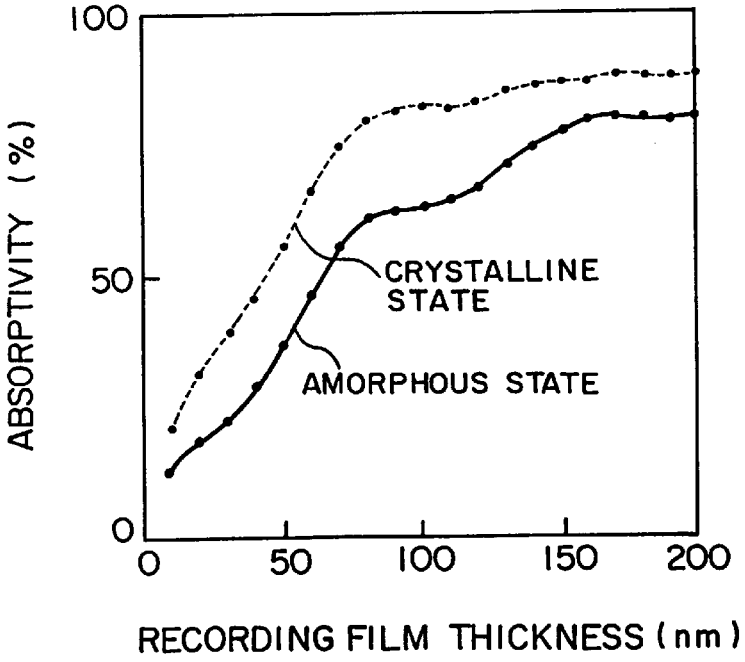

FIG. 55(a) shows changes of the reflectivities in the amorphous state and crystalline state. The thickness of the recording film 9 is between about 10 nm and 50 nm and between about 80 and 140 nm. In these thicknesses, the reflection difference can be substantially detected. Concerning the absorptivity, as shown in FIG. 55(b), the absorptivity difference can be substantially detected when the thickness of the recording film 9 is between about 10 nm and 200 nm.

Figure 56:
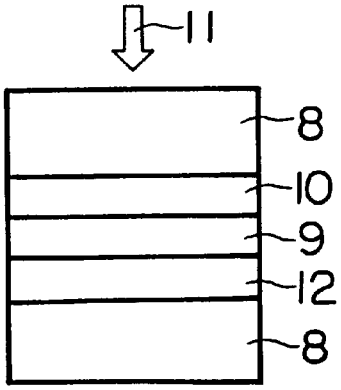

FIG. 56 shows a film constitution of glass substrate/SiN/recording film/Au/glass substrate, in which gold having a thickness of 100 nm was used for the metal reflection film 12, SiN having a thickness of 70 nm was used for the dielectric film 10, and the thickness of the recording film 9 was changed up to the maximum of 200 nm.

Figure 57A:
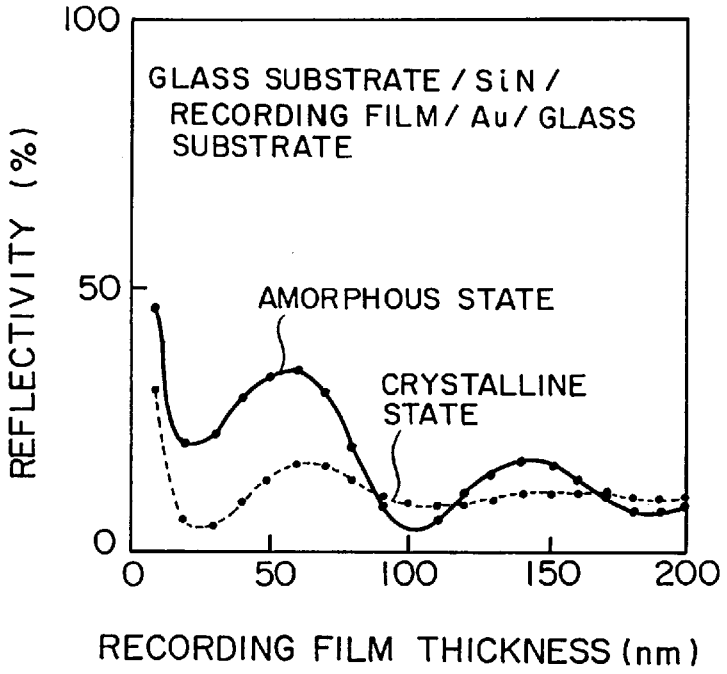
Figure 57B:
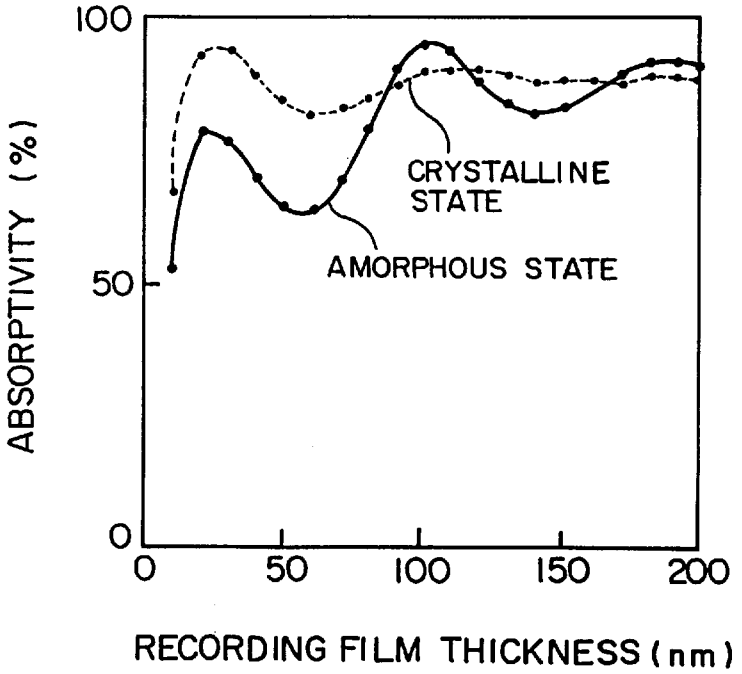

FIG. 57(a) shows changes of the reflectivities in the amorphous state and crystalline state. The thickness of the recording film 9 is between about 10 nm and 80 nm and between about 120 and 160 nm. In these thicknesses, the reflection difference can be substantially detected. Concerning the absorptivity, as shown in FIG. 57(b), the absorptivity difference can be substantially detected when the thickness of the recording film 9 is between about 10 nm and 80 nm and between about 120 nm and 160 nm.

Figure 58:
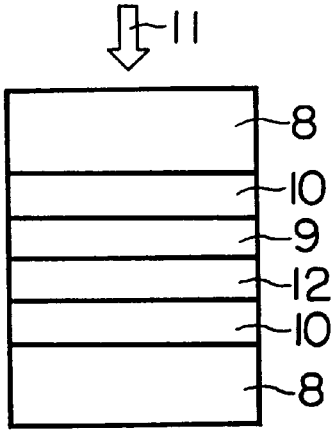

FIG. 58 shows a film constitution of PMMA substrate/SiN/recording film/Au/SiN/PMMA substrate, in which gold having a thickness of 100 nm was used for the metal reflection film 12, SiN having a thickness of 70 nm was used for the dielectric film 10, and the thickness of the recording film 9 was changed up to the maximum of 200 nm.

Figure 59A:
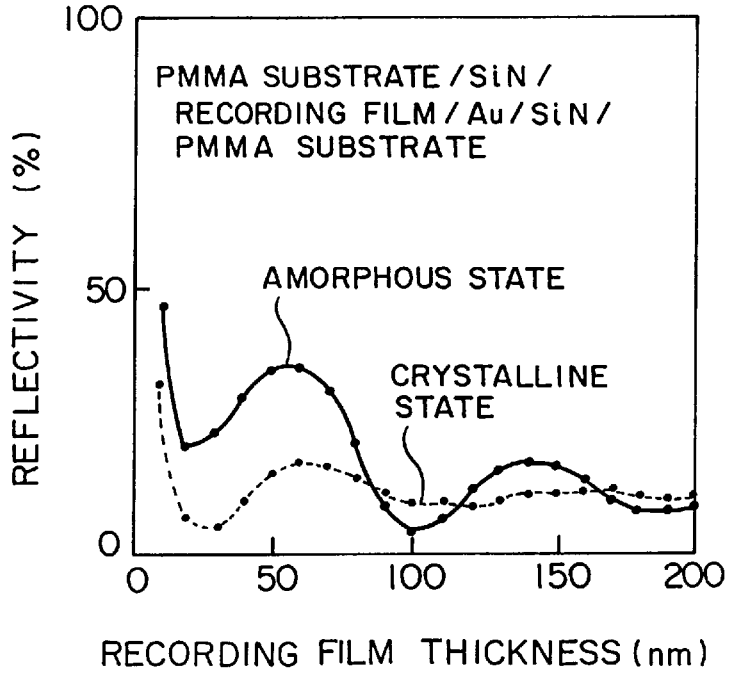
Figure 59B:
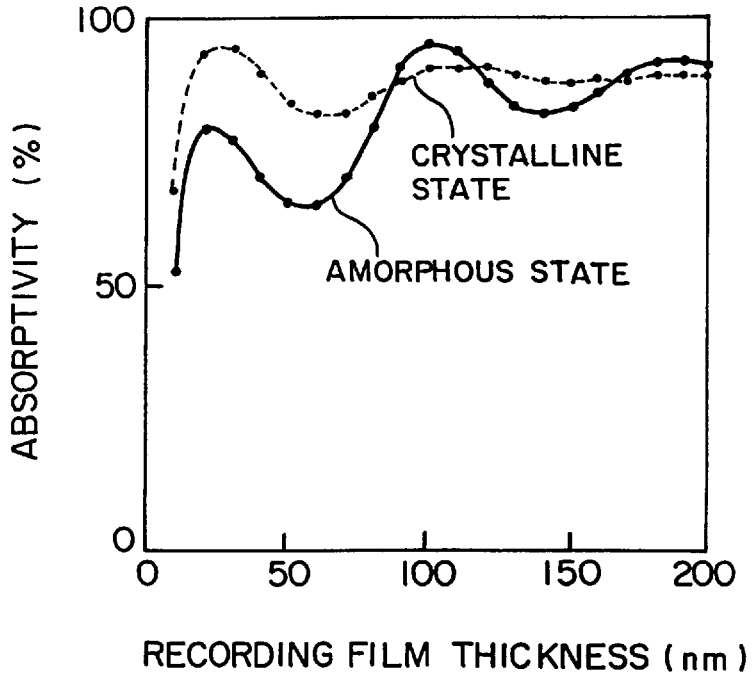

FIG. 59(a) shows changes of the reflectivities in the amorphous state and crystalline state. The thickness of the recording film 9 is between about 10 nm and 90 nm and between about 120 and 160 nm. In these thicknesses, the reflection difference can be substantially detected. Concerning the absorptivity, as shown in FIG. 59(b), the absorptivity difference can be substantially detected when the thickness of the recording film 9 is between about 10 nm and 80 nm and between about 120 nm and 160 nm.

Figure 60:
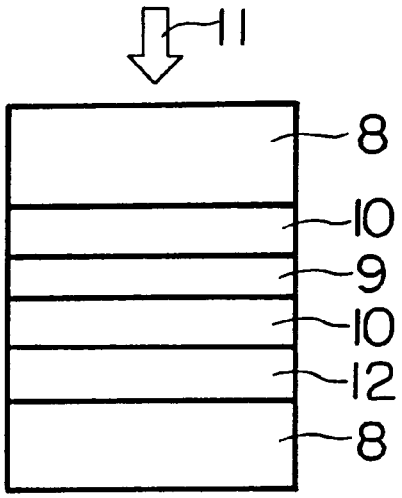

FIG. 60 shows a film constitution of PC substrate/AlN/recording film/AlN/Au/PC substrate, in which gold having a thickness of 100 nm was used for the metal reflection film 12, AlN having a thickness of 70 nm was used for the dielectric film 10, and the thickness of the recording film 9 was changed up to the maximum of 200 nm.

Figure 61A:
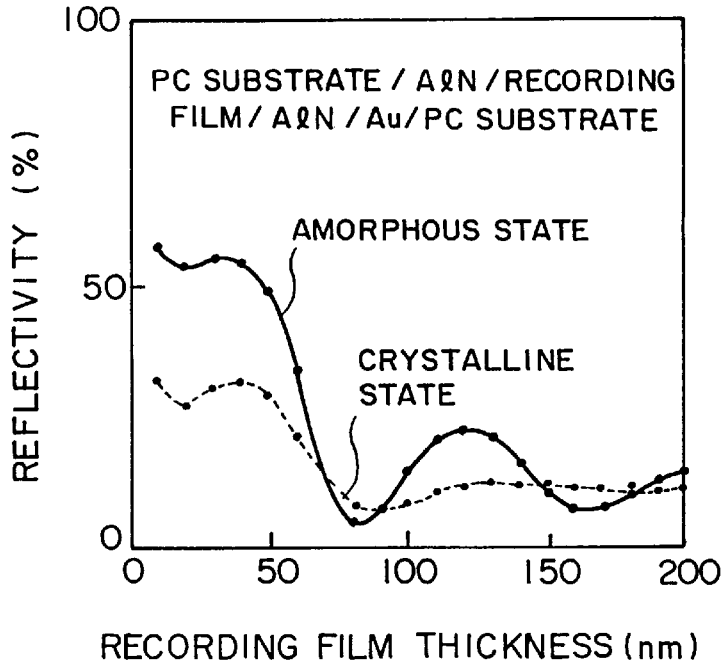
Figure 61B:
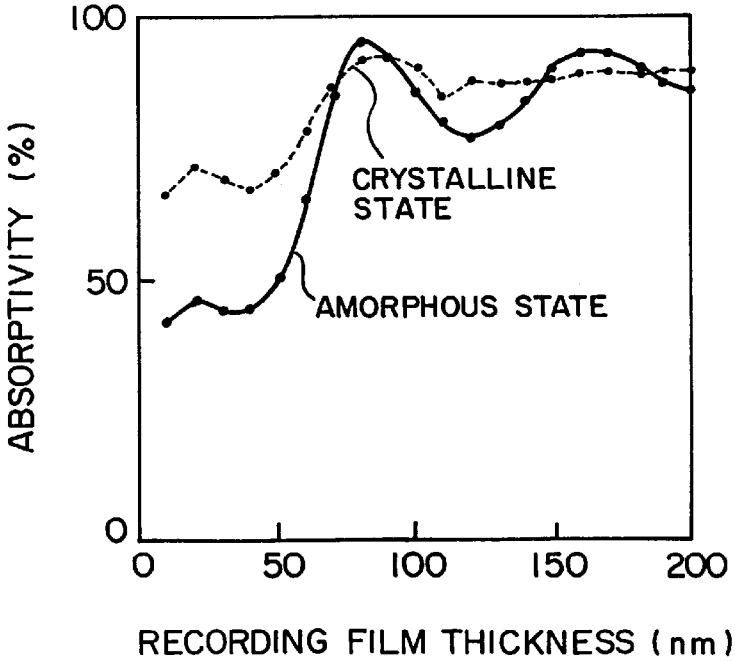

FIG. 61(a) shows changes of the reflectivities in the amorphous state and the crystalline state. The thickness of the recording film is between about 10 nm and 70 nm and between about 90 nm and 140 nm, in which ranges the reflection difference can be substantially detected. As shown in FIG. 61(b), the absorptivity difference can be substantially detected when the thickness of the recording film 9 is between about 10 nm and 70 nm and between about 90 nm and 150 nm.

Figure 62A:
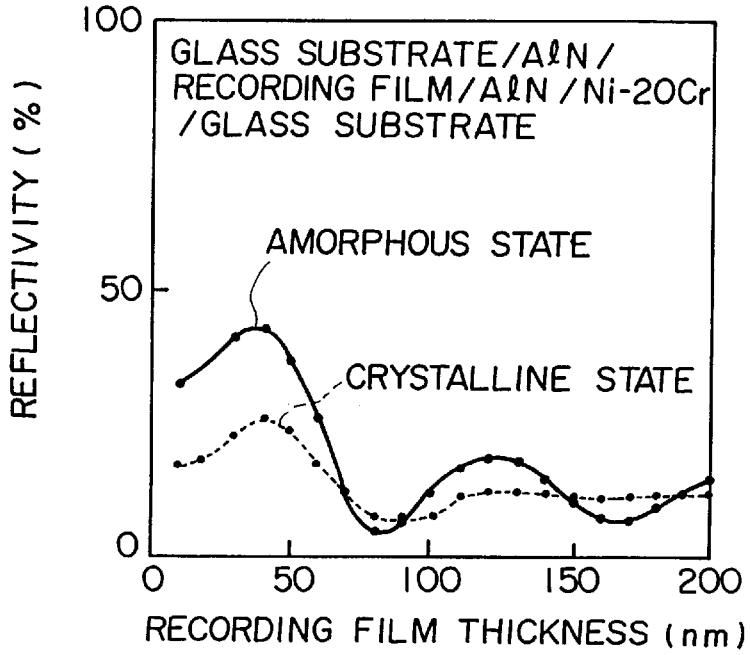
Figure 62B:
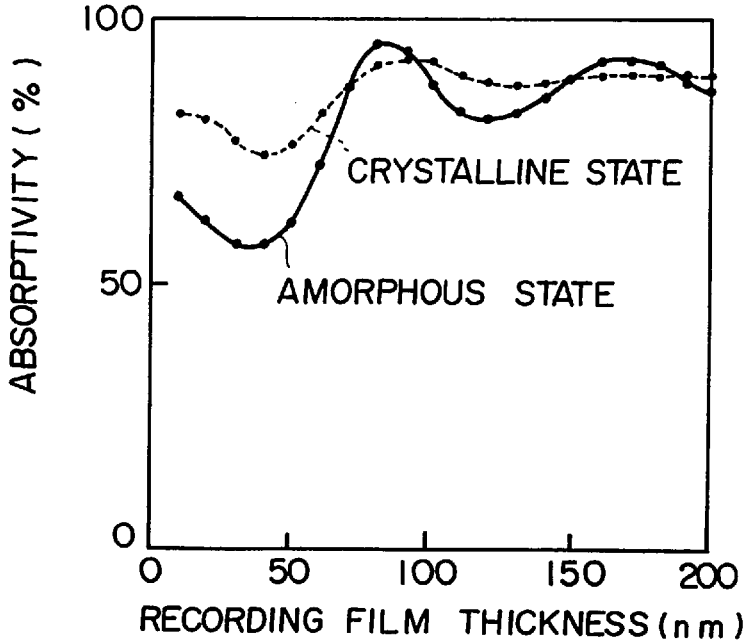

FIG. 62(a) and FIG. 62(b) show a case of a film constitution of glass substrate/AlN/recording film/AlN/Ni-20 Cr/glass substrate, in which gold having a thickness of 100 nm was used for the metal reflection film 12, AlN having a thickness of 70 nm was used for the dielectric film 10, and the thickness of the recording film 9 was changed up to the maximum of 200 nm.

FIG. 62(a) shows changes of the reflectivities in the amorphous state and crystalline state. The thickness of the recording film 9 is between about 10 nm and 70 nm and between about 90 nm and 150 nm. In these thicknesses, the reflection difference can be substantially detected. Concerning the absorptivity, as shown in FIG. 62(b), the absorptivity difference can be substantially detected when the thickness of the recording film 9 is between about 10 nm and 70 nm and between about 90 nm and 150 nm.

Figure 63A:
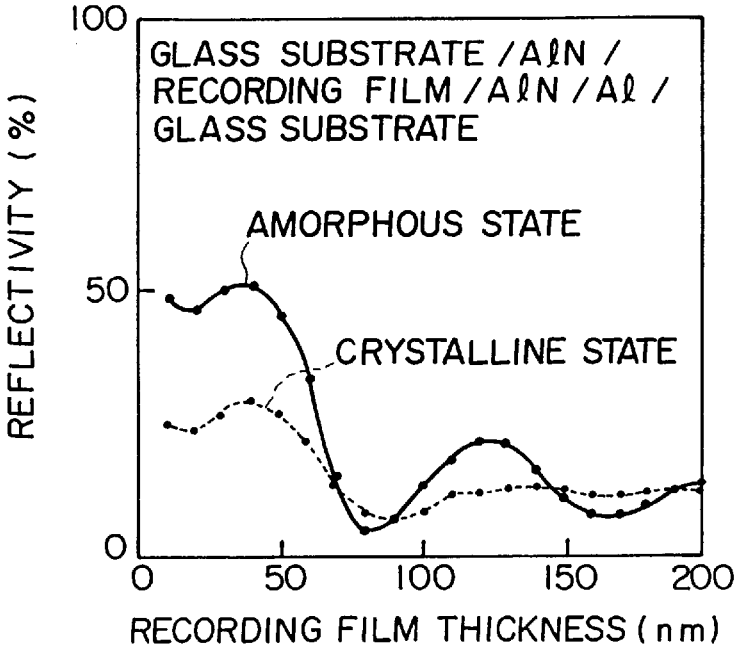
Figure 63B:
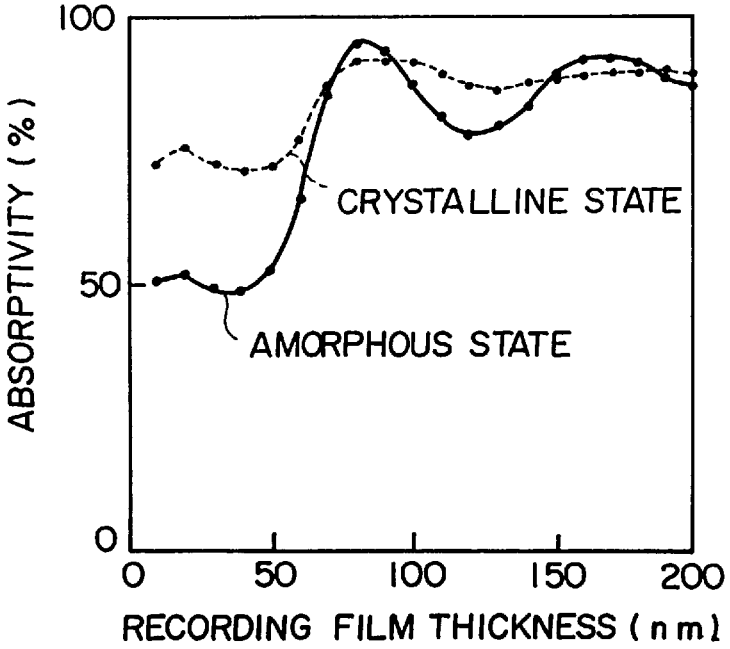

FIG. 63(a) and FIG. 63(b) show a case of a film constitution of glass substrate/AlN/recording film/Al/glass substrate, in which Al having a thickness of 100 nm was used for the metal reflection film 12, AlN having a thickness of 70 nm was used for the dielectric film 10, and the thickness of the recording film 9 was changed up to the maximum of 200 nm.

FIG. 63(a) shows changes of the reflectivities in the amorphous state and crystalline state. The thickness of the recording film 9 is between about 10 nm and 70 nm and between about 90 nm and 140 nm. In these thicknesses, the reflection difference can be substantially detected. Concerning the absorptivity, as shown in FIG. 63(b), the absorptivity difference can be substantially detected when the thickness of the recording film 9 is between about 10 nm and 70 nm and between about 90 nm and 150 nm.

Figure 64:
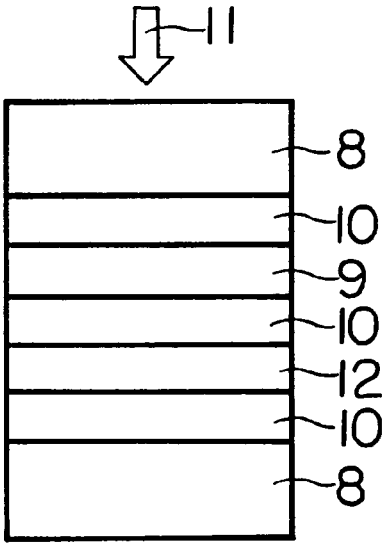

FIG. 64 shows a film constitution of PC substrate/AlN/recording film/AlN/Au/AlN/PC substrate, in which Au having a thickness of 100 nm was used for the metal reflection film 12, AlN having a thickness of 70 nm was used for the dielectric film 10, and the thickness of the recording film 9 was changed up to the maximum of 200 nm.

Figure 65A:
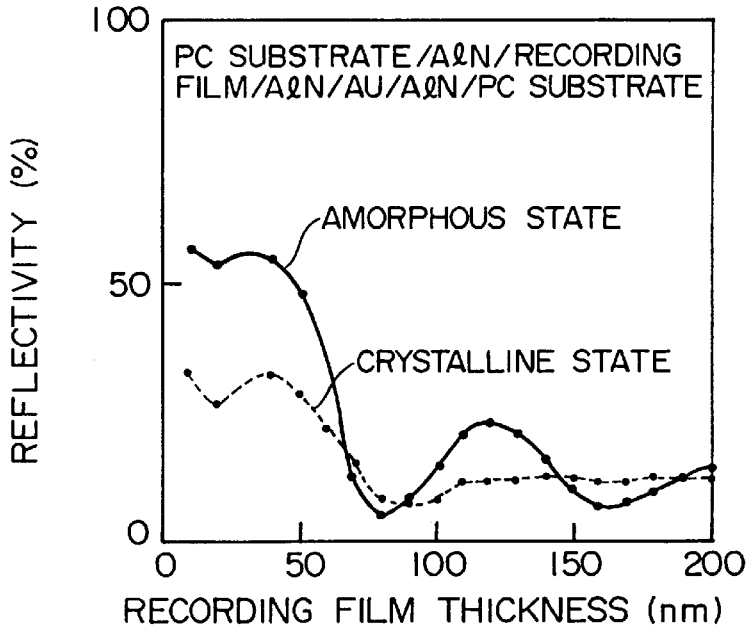
Figure 65B:
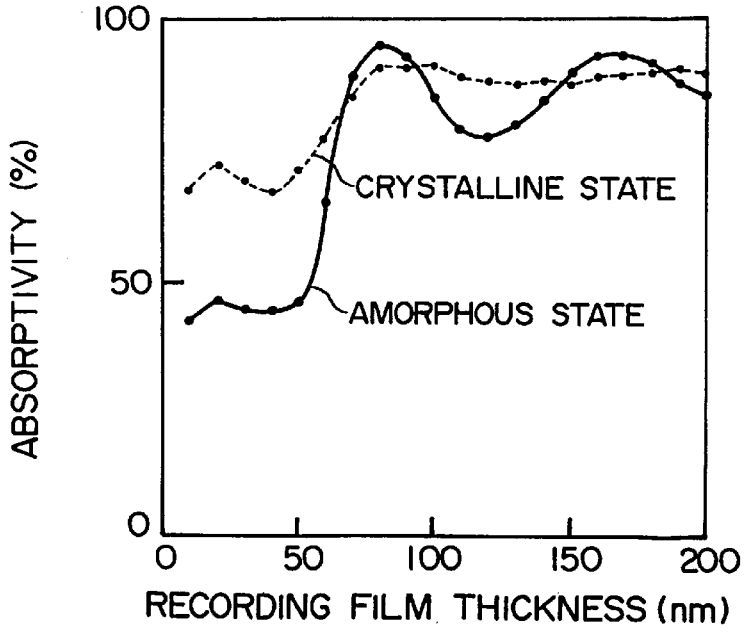

FIG. 65(a) shows changes of the reflectivities in the amorphous state and crystalline state. The thickness of the recording film 9 is between about 10 nm and 60 nm and between about 90 nm and 140 nm. In these thicknesses, the reflection difference can be substantially detected. Concerning the absorptivity, as shown in FIG. 65(b), the absorptivity difference can be substantially detected when the thickness of the recording film 9 is between about 10 nm and 70 nm and between about 100 nm and 140 nm.

Figure 66A:
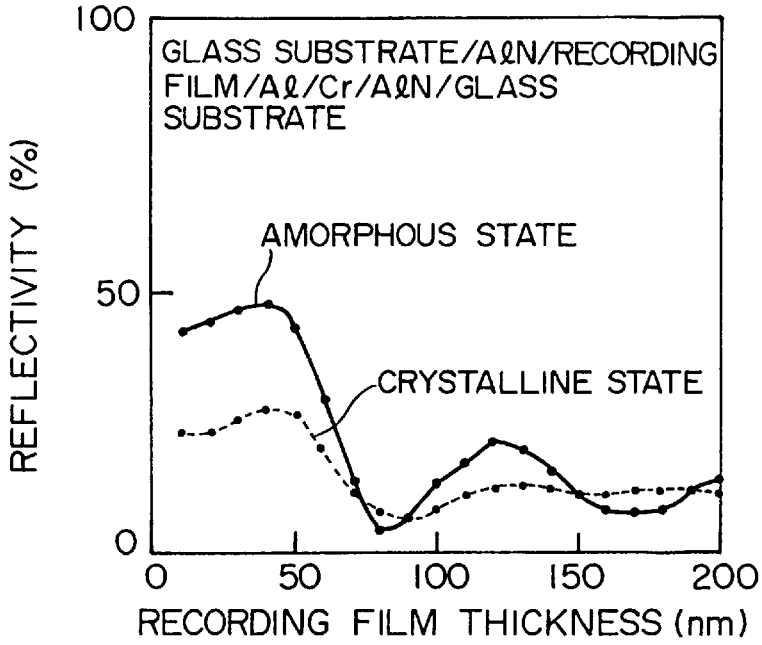
Figure 66B:
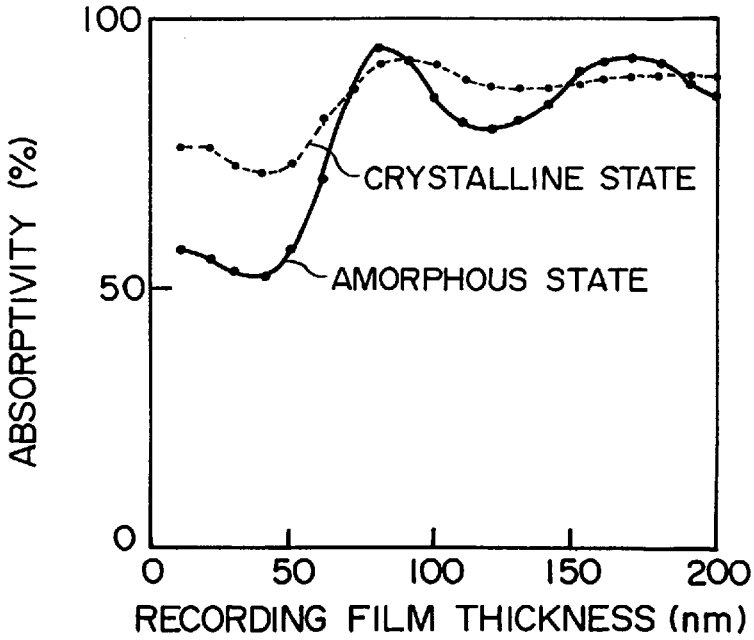

FIG. 66(a) and FIG. 66(b) show a case of a film constitution of glass substrate/AlN/recording film/AlN/Cr/AlN/glass substrate, in which Cr having a thickness of 100 nm was used for the metal reflection film 12, AlN having a thickness of 70 nm was used for the dielectric film 10, and the thickness of the recording film 9 was changed up to the maximum of 200 nm.

FIG. 66(a) shows changes of the reflectivities in the amorphous state and crystalline state. The thickness of the recording film 9 is between about 10 nm and 70 nm and between about 90 nm and 150 nm. In these thicknesses, the reflection difference can be substantially detected. Concerning the absorptivity, as shown in FIG. 66(b), the absorptivity difference can be substantially detected when the thickness of the recording film 9 is between about 10 nm and 70 nm and between about 90 nm and 140 nm.

Figure 67A:
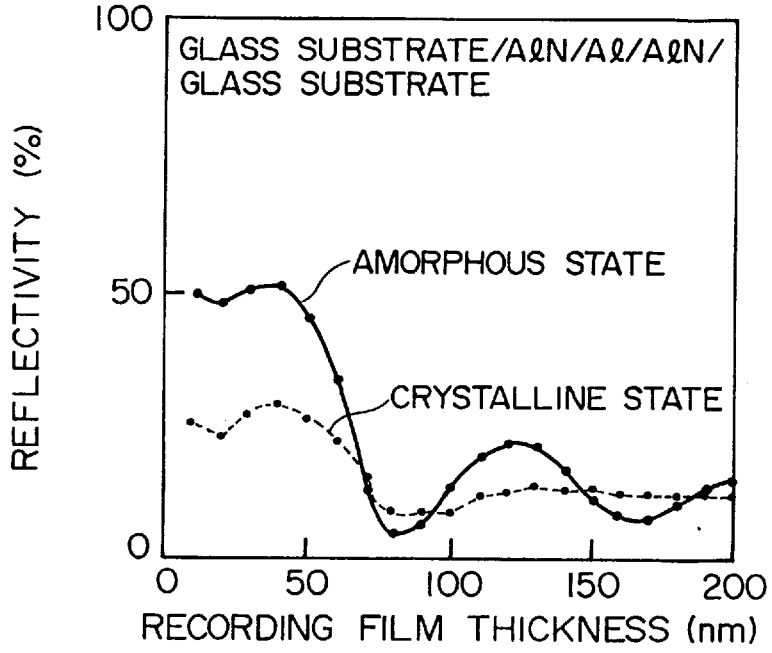
Figure 67B:
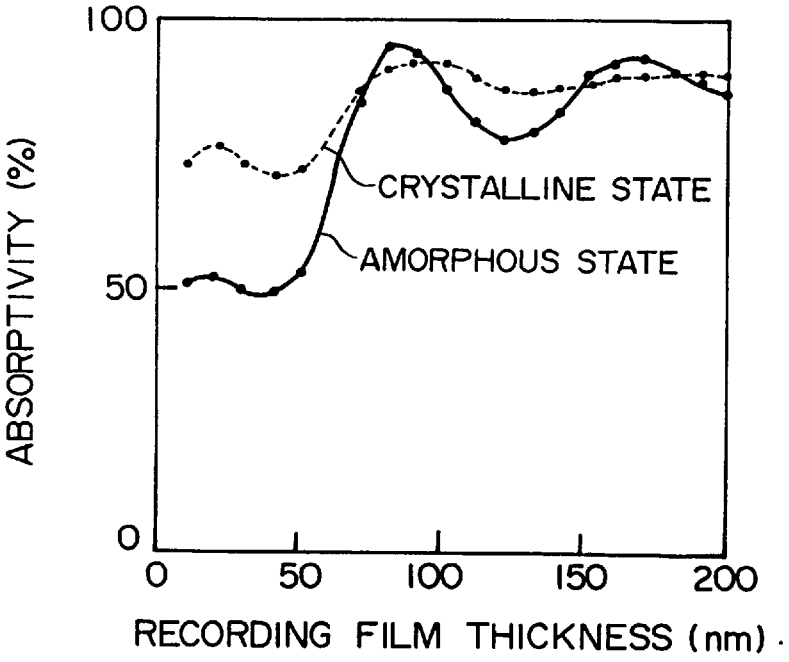

FIG. 67(a) and FIG. 67(b) show a case of a film constitution of glass substrate/AlN/recording film/AlN/Al/AlN/glass substrate, in which Al having a thickness of 100 nm was used for the metal reflection film 12, AlN having a thickness of 70 nm was used for the dielectric film 10, and the thickness of the recording film 9 was changed up to the maximum of 200 nm.

FIG. 67(a) shows changes of the reflectives in the amorphous state and crystalline state. The thickness of the recording film 9 is between about 10 nm and 70 nm and between about 100 nm and 140 nm. In these thicknesses, the reflection difference can be substantially detected. Concerning the absorptivity, as shown in FIG. 67(b), the absorptivity difference can be substantially detected when the thickness of the recording film 9 is between about 10 nm and 70 nm and between about 100 nm and 140 nm.

Figure 68A:
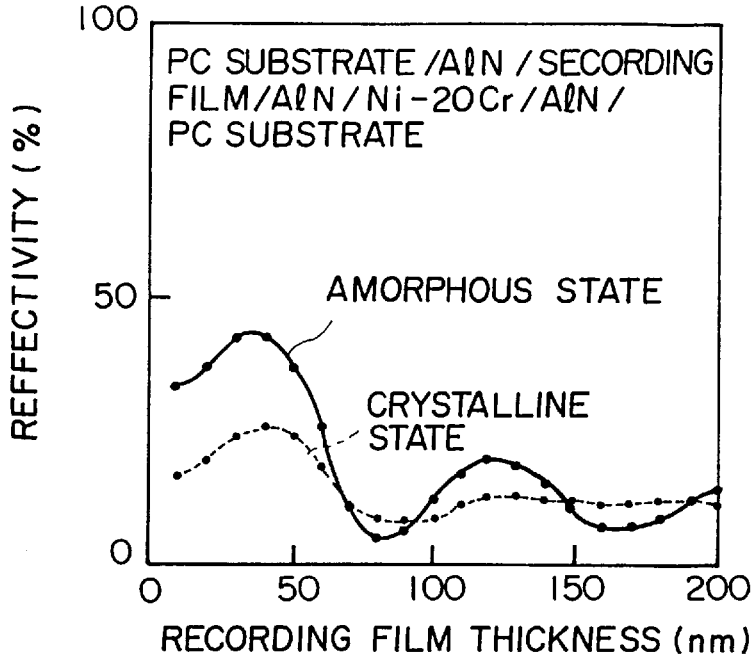
Figure 68B:
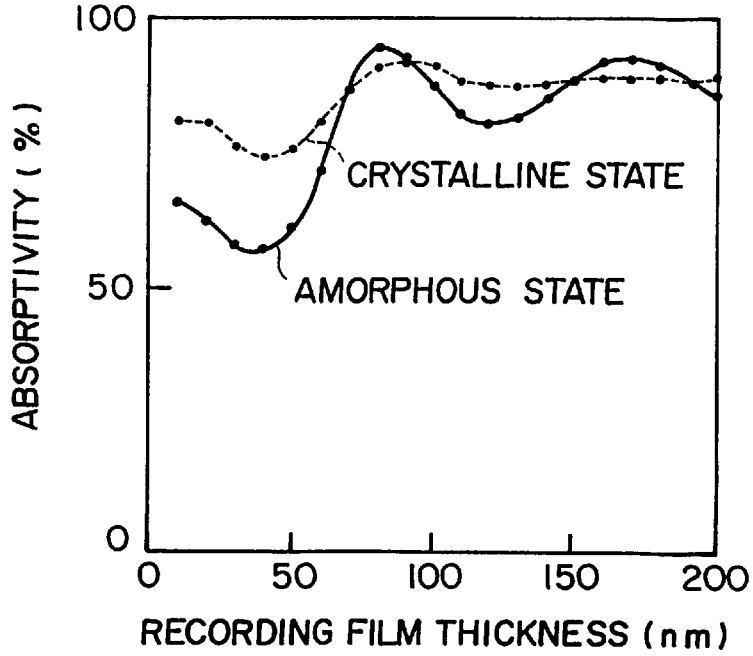

FIG. 68(a) and FIG. 68(b) show a case of a film constitution of PC substrate/AlN/recording film/AlN/Ni-20 Cr/AlN/PC substrate, in which Ni-20 Cr having a thickness of 100 nm was used for the metal reflection film 12, AlN having a thickness of 70 nm was used for the dielectric film 10, and the thickness of the recording film 9 was changed up to the maximum of 200 nm.

FIG. 68(a) shows changes of the reflectivities in the amorphous state and crystalline state. The thickness of the recording film 9 is between about 10 nm and 60 nm and between about 100 nm and 140 nm. In these thicknesses, the reflection difference can be substantially detected. Concerning the absorptivity, as shown in FIG. 68(b), the absorptivity difference can be substantially detected when the thickness of the recording film 9 is between about 10 nm and 70 nm and between about 100 nm and 140 nm.

Figure 69:
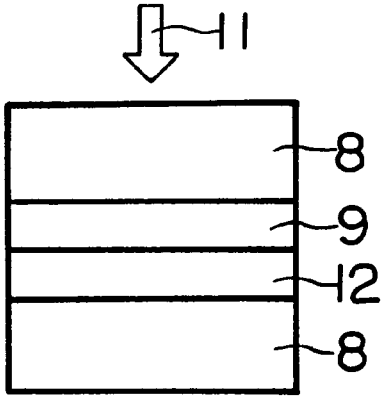

FIG. 69 shows a film constitution of glass substrate/recording film/Au/glass substrate, in which gold having a thickness of 10 nm was used for the metal reflection film 12 and the thickness of the recording film 9 was changed up to the maximum of 200 nm.

Figure 70A:
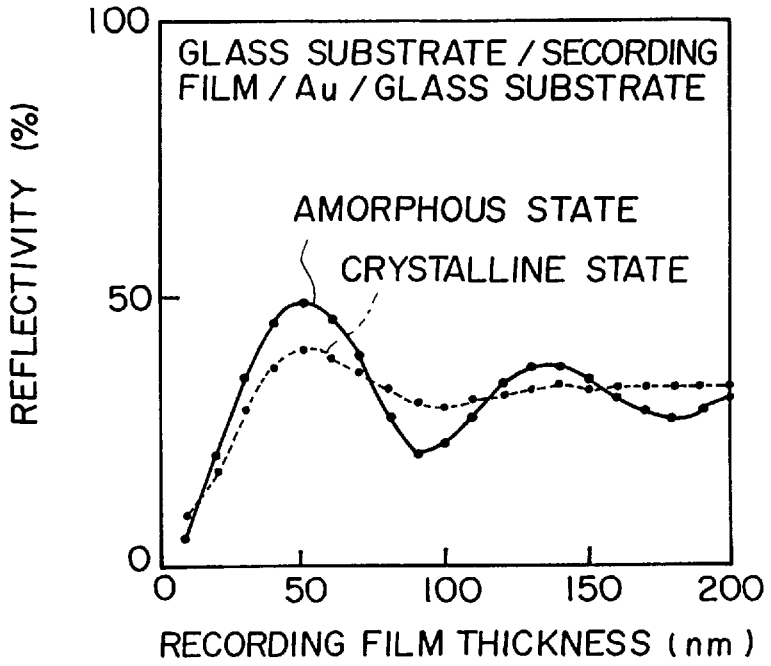
Figure 70B:
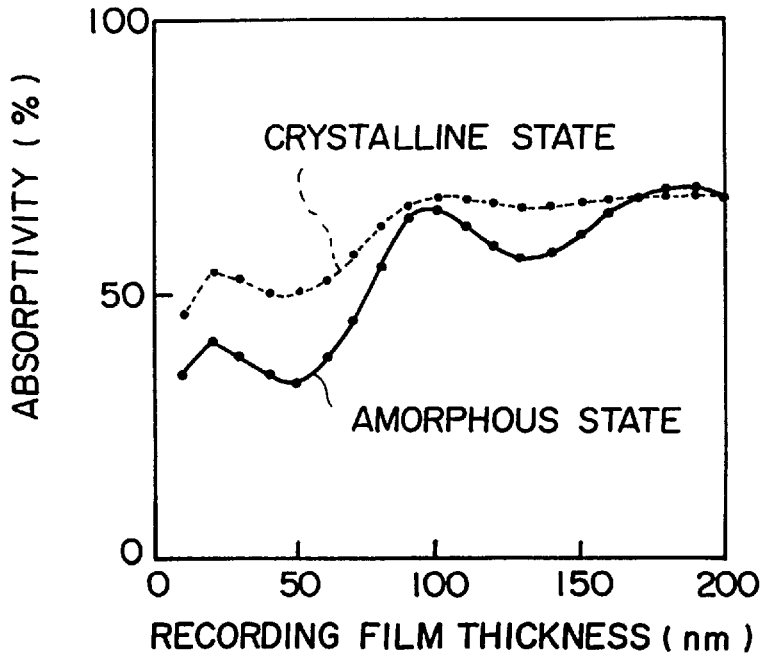

FIG. 70(a) shows changes of the reflectivities in the amorphous state and crystalline state. The thickness of the recording film 9 is between about 20 nm and 70 nm and between about 120 nm and 150 nm. In these thicknesses, the reflection difference can be substantially detected. Concerning the absorptivity, as shown in FIG. 70(b), the absorptivity difference can be substantially detected when the thickness of the recording film 9 is between about 10 nm and 160 nm.

Figure 71A:
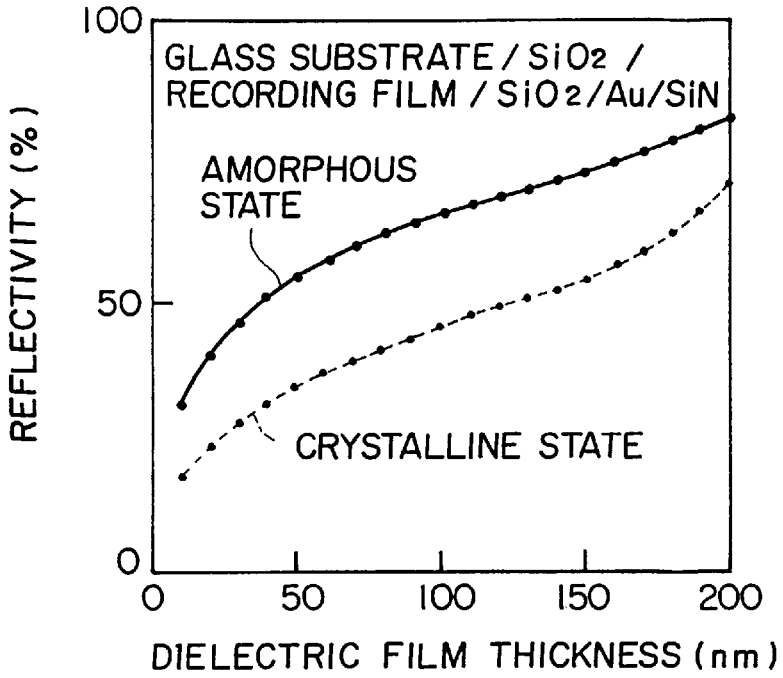
Figure 71B:
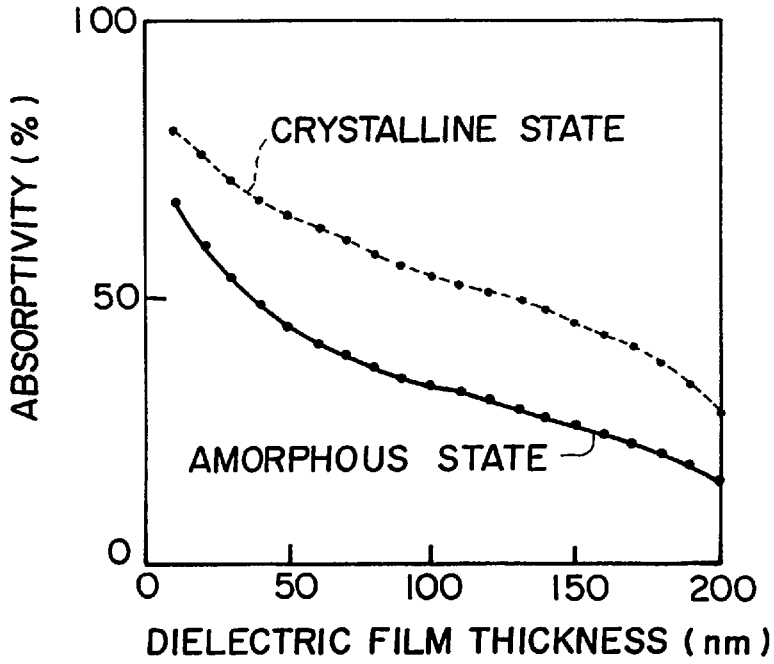

FIG. 71(a) and FIG. 71(b) show the reflectivity and absorptivity of a film using $In_{22}Sb_{37}Te_{41}$ (at %) of this invention and having a film constitution of glass substrate/dielectric film/recording film/dielectric film/metal reflection film/dielectric film when the dielectric film 10 positioned as a fourth layer from the glass substrate was changed up to 200 nm. Gold having a thickness of 100 nm was used for the metal reflection film 12, and $SiO_2$ having a thickness of 70 nm was used as the other dielectric films 10.

FIG. 71(a) shows changes of the reflectivities in the amorphous state and crystalline state, and the reflection difference can be substantially detected in all the range of the thickness of the dielectric film 10. Further, concerning the absorptivity, as shown in FIG. 71(b), the absorptivity difference can be substantially detected in all the range of the thickness of the dielectric film 10 as well.

Figure 72A:
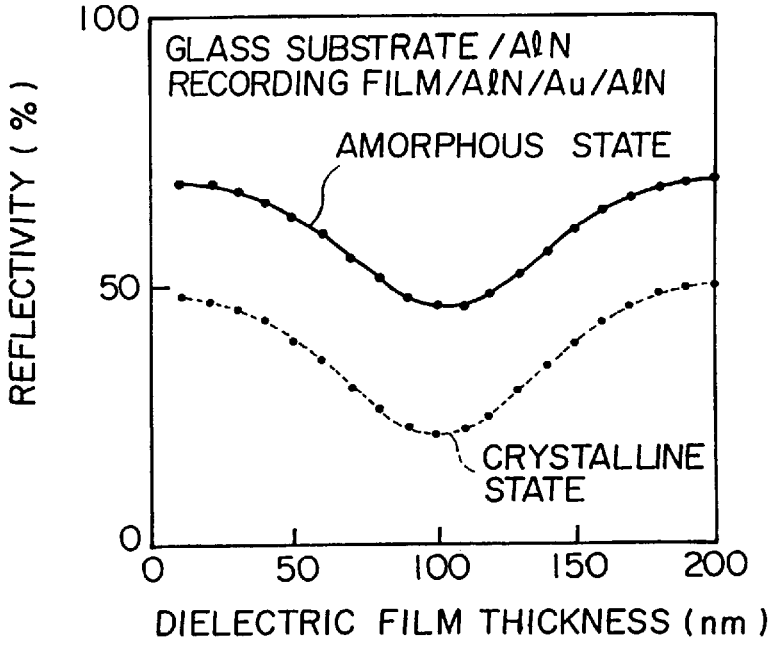
Figure 72B:
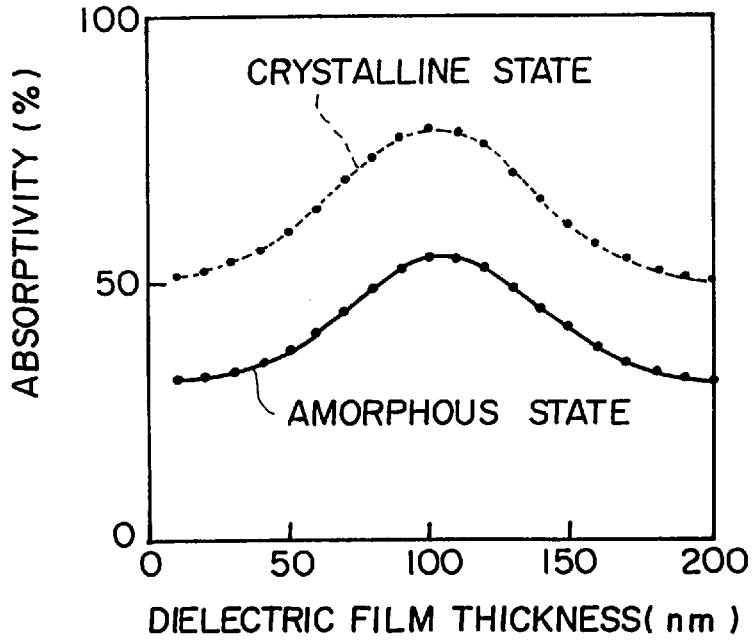

FIG. 72(a) and FIG. 72(b) show the reflectivity and absorptivity of a film using $I_{22}Sb_{37}Te_{41}$ (at %) of this invention and having a film constitution of glass substrate/dielectric film/recording film/dielectric film/metal reflection film/dielectric film when the dielectric film 10 positioned as a second layer from the glass substrate was changed up to 200 nm. Gold having a thickness of 100 nm was used for the metal reflection film 12, and AlN having a thickness of 70 nm was used as the other dielectric films 10.

FIG. 72(a) shows changes of the reflectivities in the amorphous state and crystalline state, and the reflection difference can be substantially detected in all the range of the thickness of the dielectric film 10. Further, concerning the absorptivity, as shown in FIG. 72(b), the absorptivity difference can be substantially detected in all the range of the thickness of the dielectric film 10 as well.

Figure 73A:
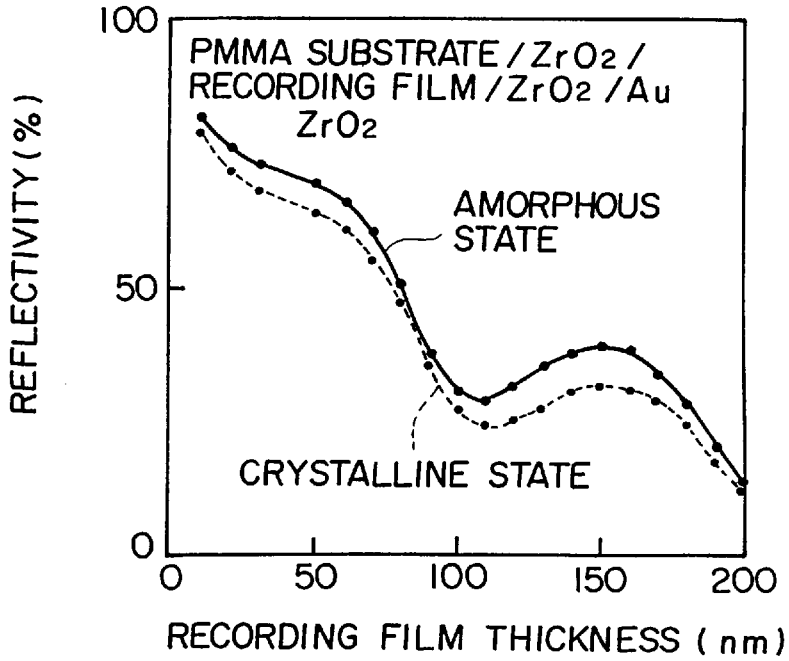
Figure 73B:
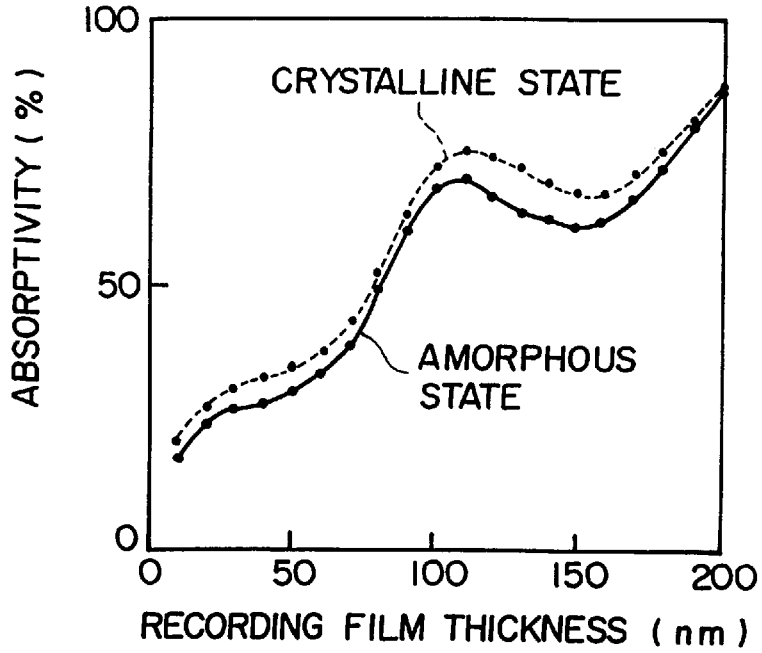

FIG. 73(a) and FIG. 73(b) show a case where $Se_{52}Ge_{27}Sn_{21}$ (at %) was used as a recording material. The film constitution was PMMA substrate/dielectric film/recording film/dielectric film/metal reflection film/dielectric film, Gold having a thickness of 100 nm was used for the metal reflection film 12, $ZrO_2$ having a thickness of 70 nm was used as the dielectric films 10, and the thickness of the recording film 9 was changed up to the maximum of 200 nm.

FIG. 73(a) shows changes of the reflectivities in the amorphous state and crystalline state, and the reflection difference can be substantially detected when the thickness of the recording film 9 is between about 10 nm and 80 nm and between about 100 nm and 180 nm. Further, concerning the absorptivity, as shown in FIG. 73(b), the absorptivity difference can be substantially detected when the thickness of the recording film 9 is between about 10 nm and 80 nm and between about 100 nm and 180 nm.

Figure 74A:
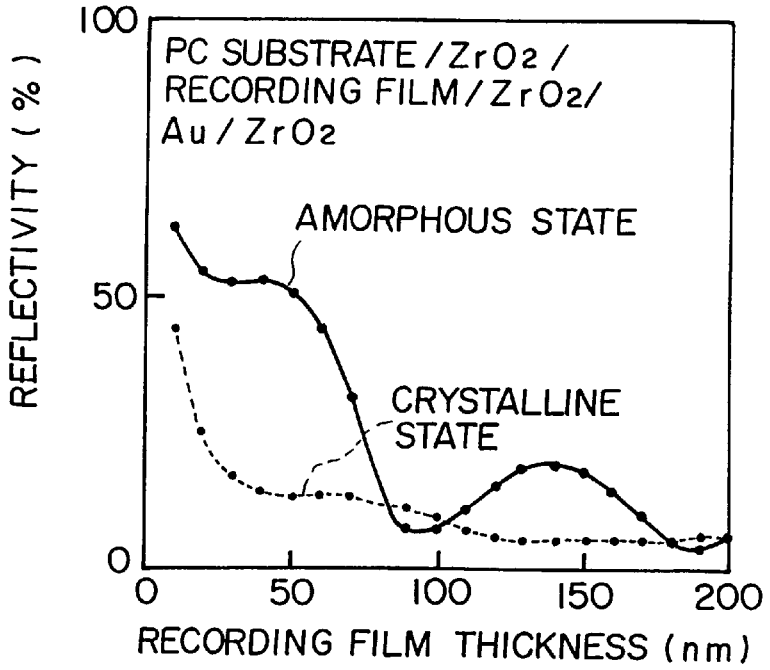
Figure 74B:
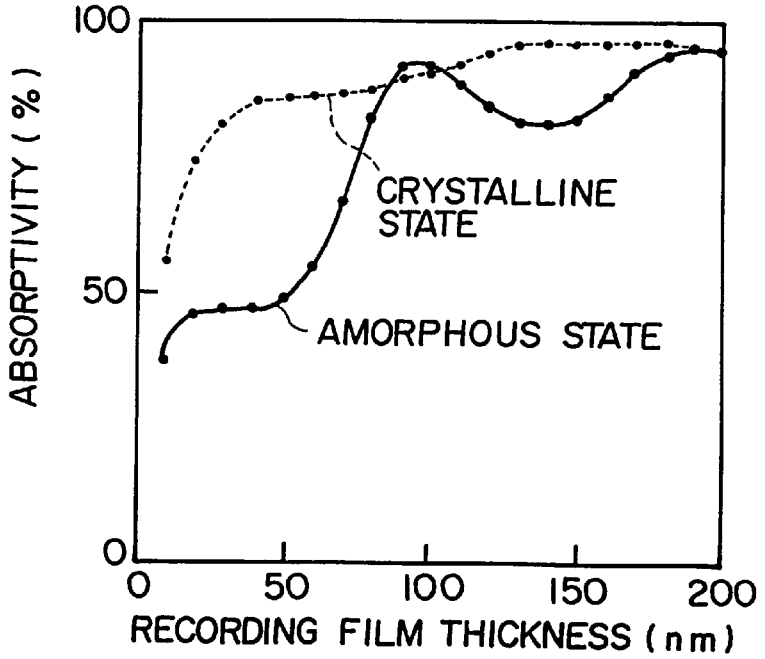

FIG. 74(a) and FIG. 74(b) show a case where $Sb_{56}Se_{40}Zn_4$ (at %) was used as a recording material. The film constitution was PC substrate/dielectric film/recording film/dielectric film/metal reflection film/dielectric film, Gold having a thickness of 100 nm was used for the metal reflection film 12, $ZrO_2$ having a thickness of 70 nm was used as the dielectric films 10, and the thickness of the recording film 9 was changed up to the maximum of 200 nm.

FIG. 74(a) shows changes of the reflectivities in the amorphous state and crystalline state, and the reflection difference can be substantially detected when the thickness of the recording film 9 is between about 10 nm and 80 nm and between about 110 nm and 120 nm. Further, concerning the absorptivity, as shown in FIG. 74(b), the absorptivity difference can be substantially detected when the thickness of the recording film 9 is between about 10 nm and 80 nm and between about 100 nm and 180 nm.

Figure 75A:
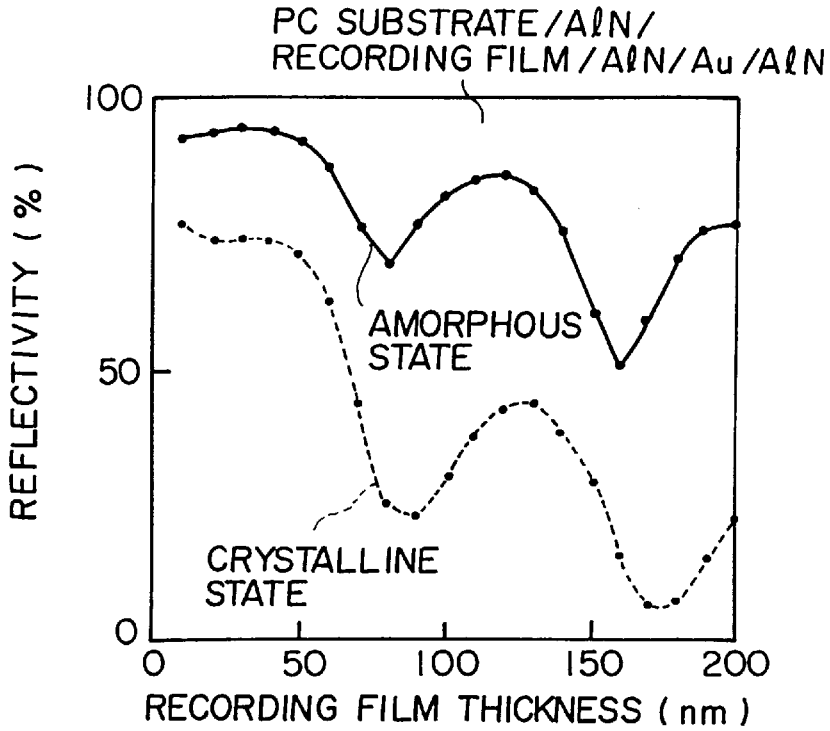
Figure 75B:
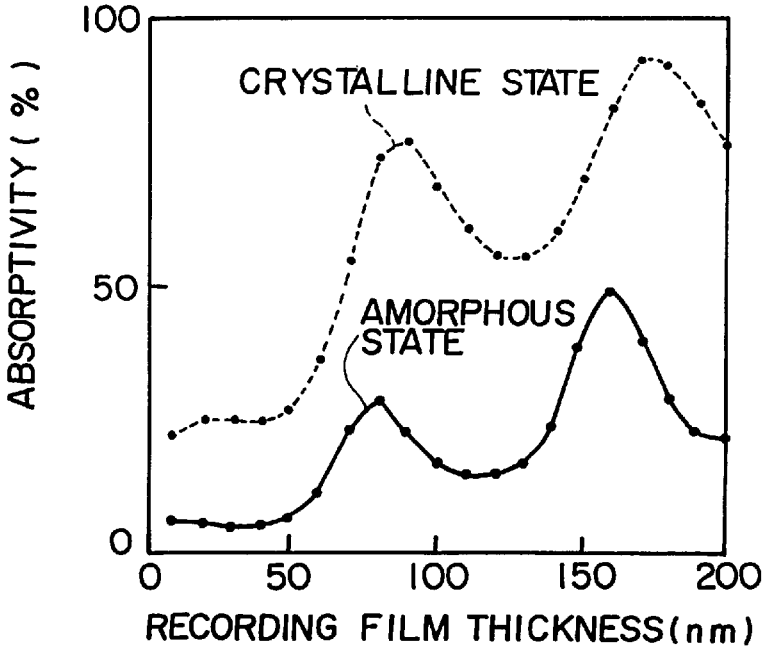

FIG. 75(a) and FIG. 75(b) show a case where $Sb_{34}Se_{58}Sn_9$ (at %) was used as a recording material. The film constitution was PC substrate/dielectric film/recording film/dielectric film/metal reflection film/dielectric film, Gold having a thickness of 100 nm was used for the metal reflection film 12, AlN having a thickness of 70 nm was used as the dielectric films 10, and the thickness of the recording film 9 was changed up to the maximum of 200 nm.

FIG. 75(a) shows changes of the reflectivities in the amorphous state and crystalline state, and the reflection difference can be substantially detected in all the range of the thickness of the recording film 9 Further, concerning the absorptivity, as shown in FIG. 75(b), the absorptivity difference can be substantially detected in all the range of the thickness of the recording film 9 as well.

Figure 76A:
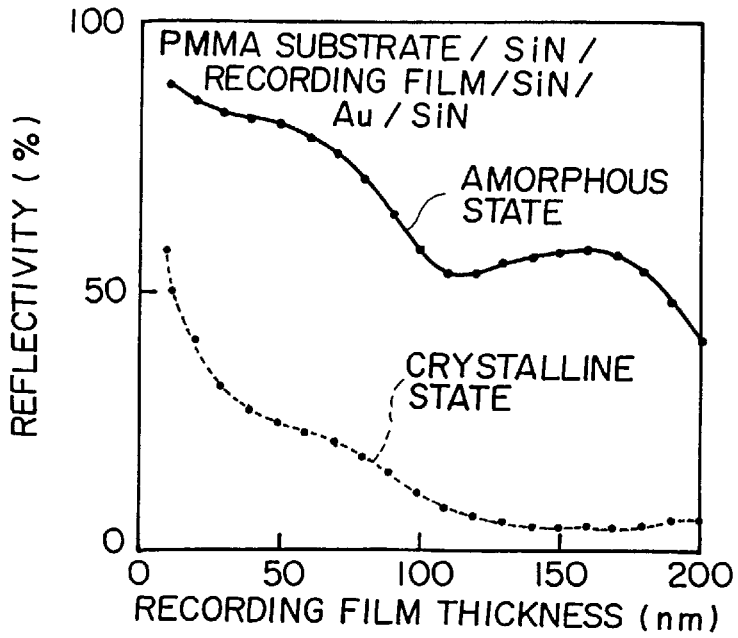
Figure 76B:
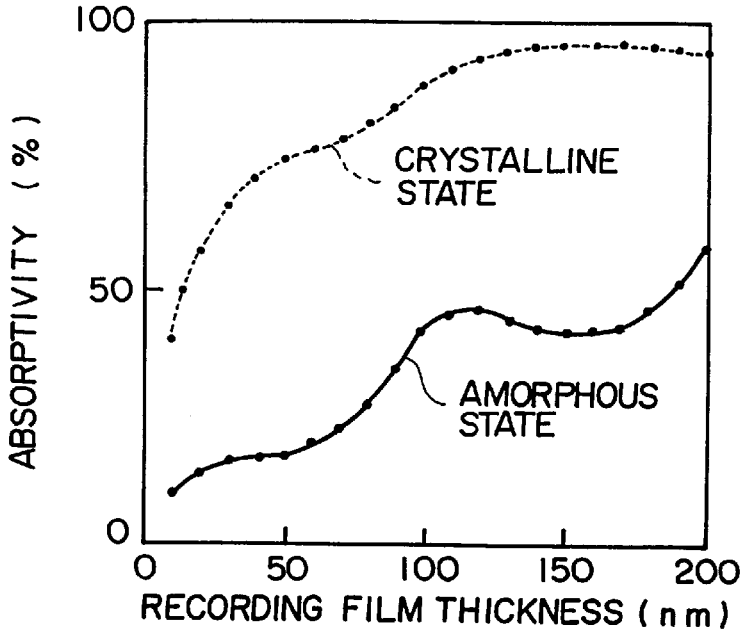

FIG. 76(a) and FIG. 76(b) show a case where $Sb_{64}Se_{29}Zn_{27}$ (at %) was used as a recording material. The film constitution was PMMA substrate/dielectric film/recording film/dielectric film/metal reflection film/dielectric film, gold having a thickness of 100 nm was used for the metal reflection film 12, SiN having a thickness of 70 nm was used as the dielectric films 10, and the thickness of the recording film 9 was changed up to the maximum of 200 nm.

FIG. 76(a) shows changes of the reflectivities in the amorphous state and crystalline state, and the reflection difference can be substantially detected in all the range of the thickness of the recording film 9 Further, concerning the absorptivity, as shown in FIG. 76(b), the absorptivity difference can be substantially detected in all the range of the thickness of the recording film 9 as well.

Figure 77A:
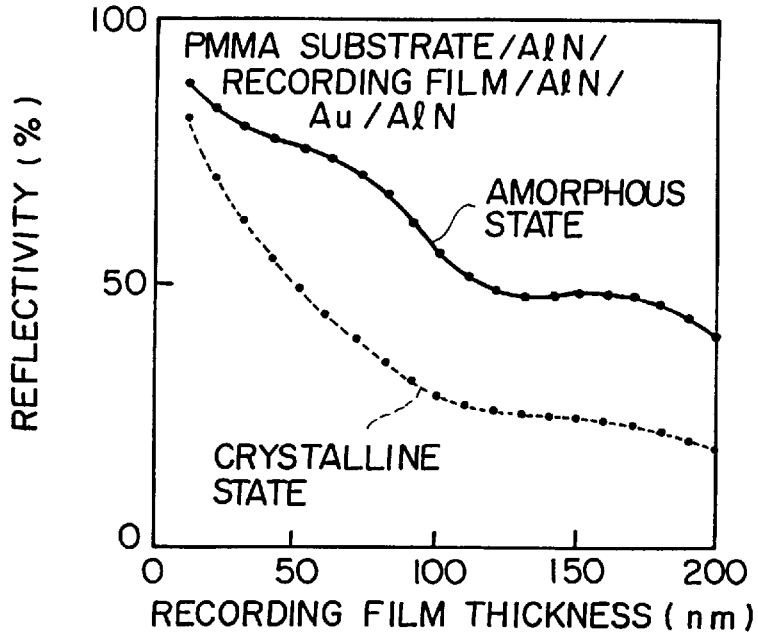
Figure 77B:
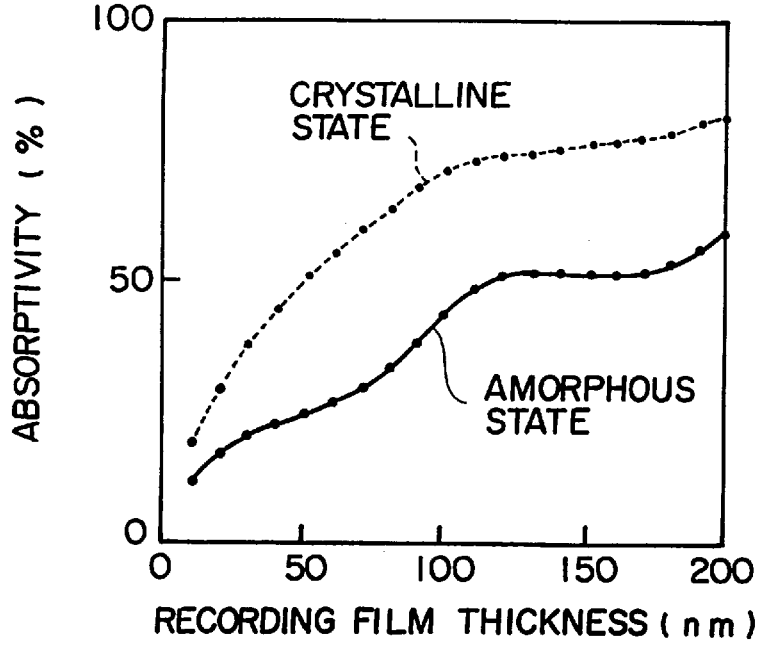

FIG. 77(a) and FIG. 77(b) show a case where $Te_{64}Sb_6Sn_{30}$ (at %) was used as a recording material. The film constitution was PMMA substrate/dielectric film/recording film/dielectric film/metal reflection film/dielectric film, Gold having a thickness of 100 nm was used for the metal reflection film 12, AlN having a thickness of 70 nm was used as the dielectric films 10, and the thickness of the recording film 9 was changed up to the maximum of 200 nm.

FIG. 77(a) shows changes of the reflectivities in the amorphous state and crystalline state, and the reflection difference can be substantially detected in all the range of the thickness of the recording film 9 meeting the present claim 1. Further, concerning the absorptivity, as shown in FIG. 77(b), the absorptivity difference can be substantially detected in all the range of the thickness of the recording film 9 as well.

Figure 78A:
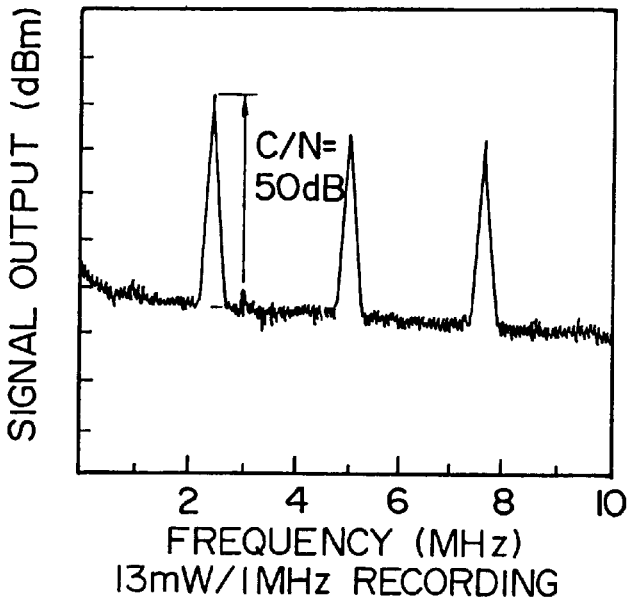
FIG. 78(a) and FIG. 78(b) are diagrams of recorded signal spectrum curves.
Figure 78B:
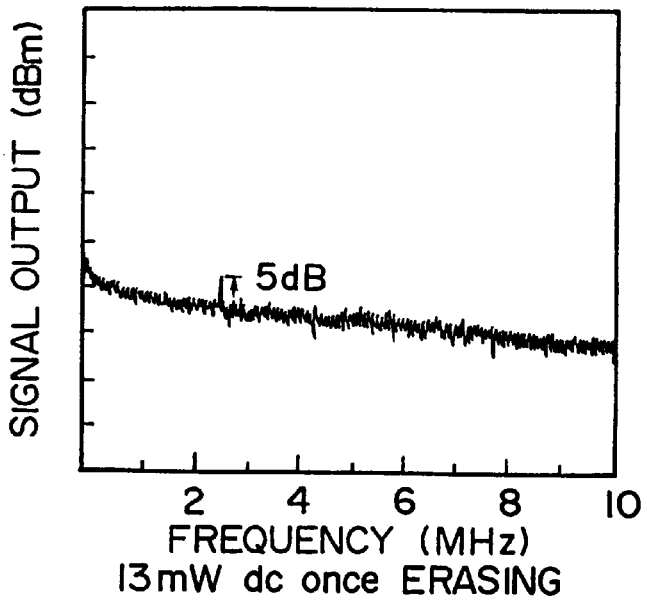

FIG. 78(a) and FIG. 78(b) show an embodiment of recording and erasing with regard to rewritable disks using optical recording media. The disks were prepared according to a high frequency sputtering method which comprises depositing 70 nm to 80 nm thick AlN for an optical interference film on 5.25 inch glass substrates having a laser guide groove for laser beam tracking of the continuous-servo tracking technique, 30 nm to 50 nm thick $In_{22}Sb_{37}Te_{41}$ for a recording film thereon, 70 to 80 nm thick AlN thereon, 100 nm thick Au for an optical reflection film thereon, and 100 nm thick AlN for a protective film thereon. These disks were turned at a 1,800 to 2,400 rounds/minute and irradiated with a direct current laser having a power, on the film surface, of 15 mW to reduce the reflectivity from about 50% to about 20%, whereby a recording track portion was formed. At first, a recording was carried out by the irradiation on the above track with a 13 mW laser pulse modulated to a frequency of 2 MHz, when the ratio of the 2 MHz carrier signal strength to the noise strength (C/N) was 50 dB on a spectrum analyzer shown in FIG. 78(a). Then, the above recorded track was irradiated with a direct current beam having the same power of 13 mW as that in the recording, to show that the recorded signal was erased down to 5 dB on a spectrum analyzer shown in FIG. 78(b). In this erasion, the erasability is −45 dB, which is above the practical-use level although the irradiation power was the same. As stated above, it has been demonstrated that this invention gives high erasing performance even in a recording and erasing method unthinkable with regard to conventional optical recording media. Further, even when resin substrates such as PMMA, PC, etc., were used, the results were exactly identical to the above embodiment. Furthermore, even when substrates of another tracking system, sampled-servo system, were used, the obtained results were exactly identical as the above embodiment.

FIG. 79(a) and FIG. 79(b) show an embodiment of the single beam overwrite with regard to rewritable optical disks using the optical recording medium of this invention. The disk constitution was the same as that of the above embodiment. FIG. 79(a) shows a power modulation mode of a round laser spot beam (spot diameter: about 1.5 $\mu$m) used for the overwriting. As a recording power $P_1$ which can heat a recording film to a temperature of not less than $T_{cool}$ and as a bias power $P_2$ which can heat the recording film to a temperature of between not less than the melting point and not more than $T_{cool}$, the ratios of $P_1/P_2$=12.5 mW/9.5 mW and 16 mW/12 mW were selected. The disks were turned at 1,800 to 2,400 rounds/minute, and continuously irradiated with a 15 mW direct current beam to reduce the disk reflectivity from about 50% to about 20%, whereby recording track portion was formed. Then, sine wave signals having a modulated frequency of 2 MHz were recorded by irradiation of a laser having the above power, and thereafter, 3 MHz sine wave signals were recorded by overwriting the 2 MHz signals. As shown in FIG. 79(a) and FIG. 79(b), the spectrum analyzer showed that the 2 MHz signals recorded in a C/N equivalent to 50 dB were erased to an equivalence of 2 dB by the overwrite-recorded 3 MHz signals, and at the same time it was shown that the 3 MHz signals were overwrite-recorded in a C/N equivalent to 50 dB. In a process reverse thereto, similar results were obtained. It has been demonstrated that this invention can give erasing performance in the single beam overwrite, found in no prior art, that the erasability is −45 dB or more. Further, the number of repeatable times for the above overwrite was examined. As shown in FIG. 80(a) and FIG. 80(b), the overwrite of 2 MHz and 3 MHz sine wave signals with both of the laser powers could be repeated more than $10^5$ times while the erasability was −35 dB or more.

Figure 81A:
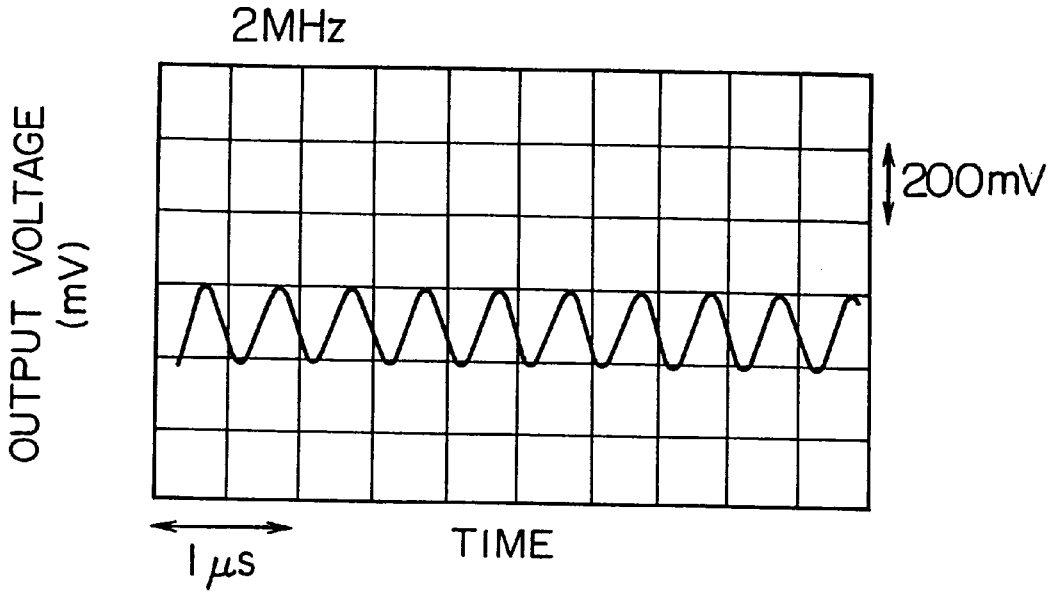
FIG. 81(a) and FIG. 81(b) are characteristic diagrams of overwrite signal wave forms.
Figure 81B:
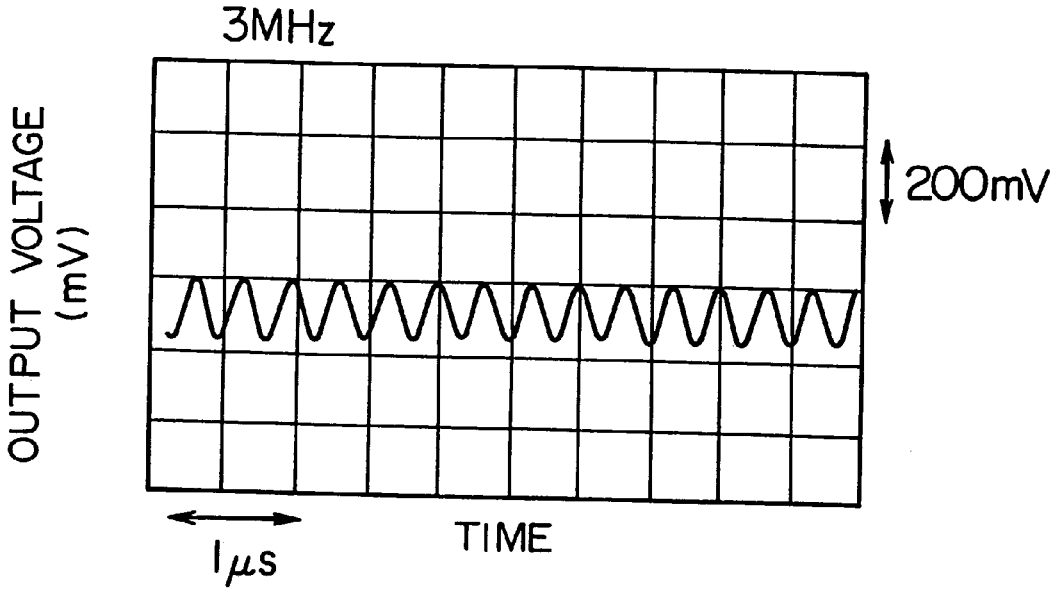

FIG. 81(a) and FIG. 81(b) show 2 MHz sine wave signals on an oscilloscope screen. Any deformation of waveforms and change of frequency due to incomplete erasion wave recognized in any of the signals, and the signals were completely erased in both the cases. It has been demonstrated that the optical recording media of this invention make it possible to perform the single beam overwrite free from incomplete erasion even with a practical-use laser power of 15 mW or less. And when resin substrates such as PMMA, PC, etc., were used as the substrate, it was also possible to obtain results identical with those of the above embodiment. Further, in the case of using disks according to another tracking system, sampled-servo tracking technique, the optical recording media of this invention were also able to give the same results as those of the above embodiment.

The recording films described in Table 2 constitute the optical recording media which have a larger reflectivity, n, in the amorphous state than in the crystalline state and actually satisfy the changes therein are different from those in the conventional materials described in Table 1. As specified in the present claims 1 to 5, the recording films comprises a compound of simple substances of elements such as antimony, zinc, tin, germanium, etc., with of selenium, tellurium, etc. As the simple substance of elements, indium, lead, silver, copper, gold, etc., are also effective to control the refractive index of the recording film.

TABLE 2

| Recording film | Amorphous state | | Crystalline state | |
|---|---|---|---|---|
| Composition(at %) | n | k | n | k |
| $In_{22}Sb_{33}Te_{45}$ | 4.952 | 0.857 | 4.678 | 1.743 |
| $In_{22}Sb_{37}Te_{41}$ | 4.968 | 0.882 | 4.590 | 1.688 |
| $In_{20}Sb_{37}Te_{43}$ | 4.952 | 0.861 | 4.621 | 1.752 |
| $In_{32}Sb_{40}Te_{28}$ | 3.045 | 0.657 | 2.801 | 1.452 |
| $Sb_{56}Se_{40}Zn_4$ | 4.234 | 0.694 | 3.029 | 1.414 |
| $Sb_{44}Se_{29}Zn_{27}$ | 3.492 | 0.125 | 3.014 | 0.892 |
| $Sb_{34}Se_{48}Sn_8$ | 5.068 | 0.070 | 4.638 | 0.352 |
| $Se_{52}Ge_{27}Sn_{21}$ | 3.761 | 0.282 | 3.619 | 0.329 |
| $Te_{64}Sb_6Sn_{30}$ | 3.147 | 0.163 | 2.424 | 0.359 |
| $Se_{66}Sb_{24}Ge_{10}$ | 4.240 | 0.070 | 3.216 | 0.487 |

Table 3 shows the recordability and erasability of optical disks having the recording films described in Table 2. The disks were prepared according to the high frequency sputtering method which comprises depositing 70 nm to 80 nm thick AlN, for an optical interference film, on a 5.25 inch glass substrate having a laser guide groove for laser beam tracking of continuous servo technique, 330 nm to 50 nm thick recording material selected from the recording films described in Table 2 thereon, 100 nm thick Au for an optical reflection film thereon and 100 nm thick AlN for a protective film thereon. The recording power and erasing power were 15 mW or less. All the resultant optical disks gave a C/N of about 50 dB and were of high sensitivity, and further, these optical disks were able to give a high erasability of −35 dB or more in both the direct current and overwrite erasing methods.

TABLE 3

| Recording | C/N | dc erasibility | Single beam overwrite C/N | | Single beam overwrite, erasability | | Number of overwrite repetition |
|---|---|---|---|---|---|---|---|
| film (at %) | (dB) | (dB) | 2 MHz | 3 MHz | 2 MHz | 3 MHz | ⅔ MHz |
| $In_{22}Sb_{33}Te_{45}$ | 55 | −48 | 53 | 55 | −49 | −48 | $>10_5$ |
| $In_{22}Sb_{37}Te_{41}$ | 52 | −45 | 50 | 52 | −46 | −48 | |
| $In_{20}Sb_{37}Te_{43}$ | 55 | −48 | 50 | 53 | −45 | −46 | |
| $In_{32}Sb_{40}Zn_{28}$ | 50 | −45 | 48 | 49 | −40 | −42 | $>10_3$ |
| $Sb_{56}Se_{40}Zn_4$ | 46 | −40 | 40 | 42 | −35 | −38 | $\sim10_4$ |
| $Sb_{44}Se_{29}Sn_{27}$ | 50 | −45 | 48 | 48 | −40 | −42 | $\sim10_4$ |
| $Sb_{34}Se_{58}Sn_8$ | 50 | −45 | 50 | 52 | −39 | −40 | $\sim10_4$ |
| $Se_{52}Ge_{27}Sn_{21}$ | 50 | −40 | 49 | 50 | −40 | −42 | $\sim10_5$ |

TABLE 3-continued

| Recording film (at %) | C/N (dB) | dc erasibility (dB) | Single beam overwrite C/N 2 MHz | Single beam overwrite C/N 3 MHz | Single beam overwrite, erasability 2 MHz | Single beam overwrite, erasability 3 MHz | Number of overwrite repetition ⅔ MHz |
|---|---|---|---|---|---|---|---|
| $Te_{64}Sb_6Sn_{30}$ | 46 | −38 | 48 | 48 | −41 | −42 | ~100 |
| $Se_{66}Sb_{24}Ge_{10}$ | 55 | −46 | 49 | 50 | −40 | −45 | $>10_4$ |

Figure 82A:
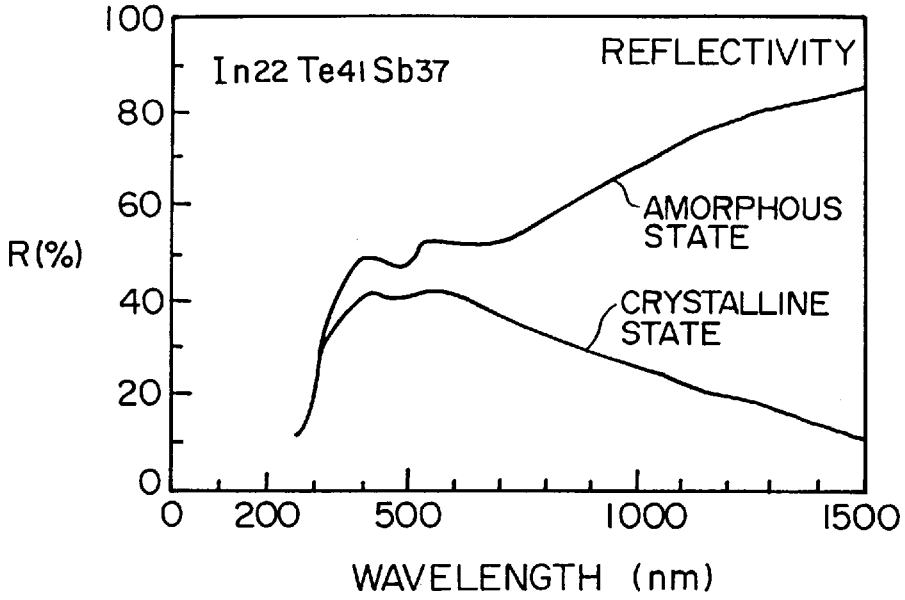
FIG. 82(a) and FIG. 82(b) are spectral characteristic diagrams of $In_{22}Sb_{38}Te_{41}$.
Figure 82B:
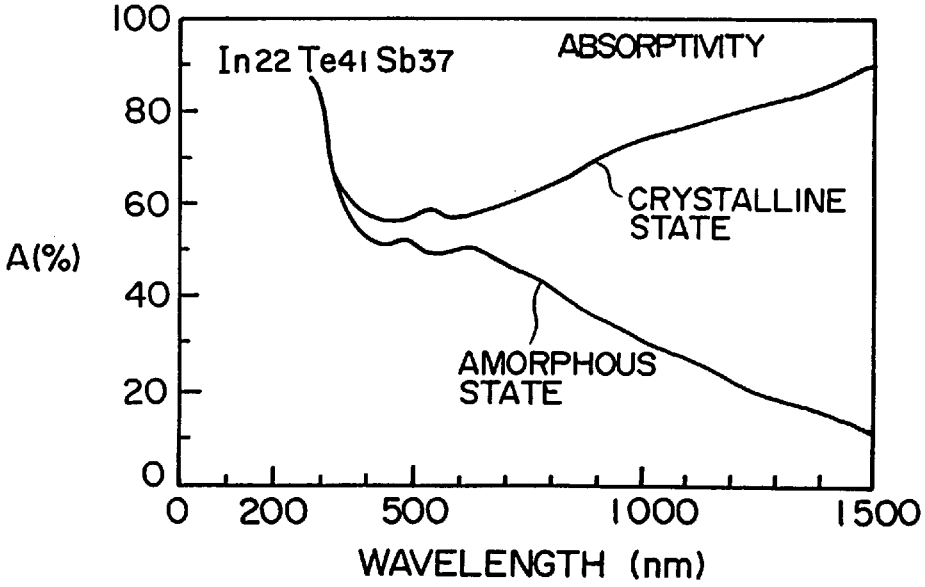

The discussion above has all demonstrated the effectiveness of the optical recording media of this invention when a laser diode is used for recording, reproducing and erasing in said media. As shown in FIG. 82(a) and FIG. 82(b), in the case of optical recording media having an $In_{22}Sb_{37}Te_{41}$ recording film, their reflectivity in the amorphous state is larger than that in the crystalline state while the wavelength is between 300 nm and 1,500 nm, and at the same time, their absorptivity in the amorphous state is smaller than that in the crystalline state. Thus, these media satisfy the present claims. In fact, when an argon ion laser having a wavelength of 500 nm was used for the recording and erasing in the optical recording media, the recording media gave high-sensitivity recording and high erasability, and there is no special limitation to be imposed on the wavelength for use.

The effectiveness of this invention has been demonstrated above. Further, the following embodiment will demonstrate a cross-talk-reduction effect obtainable only by using the optical recording media of this invention. In optical recording media satisfying the reflectivity and absorptivity in the as-deposited state and the reflectivity and absorptivity in the recorded and erased states, a track having a lower reflectivity (often equivalent to the reflectivity in the erased state) than that in the as-deposited state is first formed, and signals are recorded on the track. Then, on the media, there are two separate portions of which both the reflectivity and absorptivity are different, one portion is the track portion having a lower reflectivity (or a higher absorptivity), and the other portion (outside the track and corresponding to a groove of a disk for the continuous servo technique) is that which has a higher reflectivity (or a lower absorptivity) and remains in the as-deposited state. Meanwhile, when signals are optically recorded, it is preferable to minimize the intertrack distance as much as possible for high-density recording. However, if the intertrack distance is minimized extremely, a cross-talk phenomenon takes place in which the recorded signals are overlapping an adjacent track, and the cross-talk causes a noise. Practically, therefore, the cross-talk increase in the minimizing of the intertrack distance determines the recording density on the optical recording media. In the optical recording media of this invention, the outside-the-track portion having a smaller reflectivity and being in the as-deposited state is positioned in contact with the track portion. The outside-the-track portion is less influenced thermally by a laser power used for the recording and erasing on the track portion, since its attainable temperature is low. The cross-talk to an adjacent track is reduced especially by this thermal block. In the optical recording media of this invention, it has been found that when the intertrack distance is 0.5 $\mu$m, the cross-talk is as small as −40 dB or less, which value is very small as compared with conventional ones. In the conventional optical recording media, the relationship in the reflectivities or absorptivities is reverse to that in this invention, and the outside-the-track portion is therefore likely to be thermally influenced. The above effect can be produced only by the optical recording media of this invention, and it is made possible to perform the recording in an unconventionally higher density.

Figure 83:
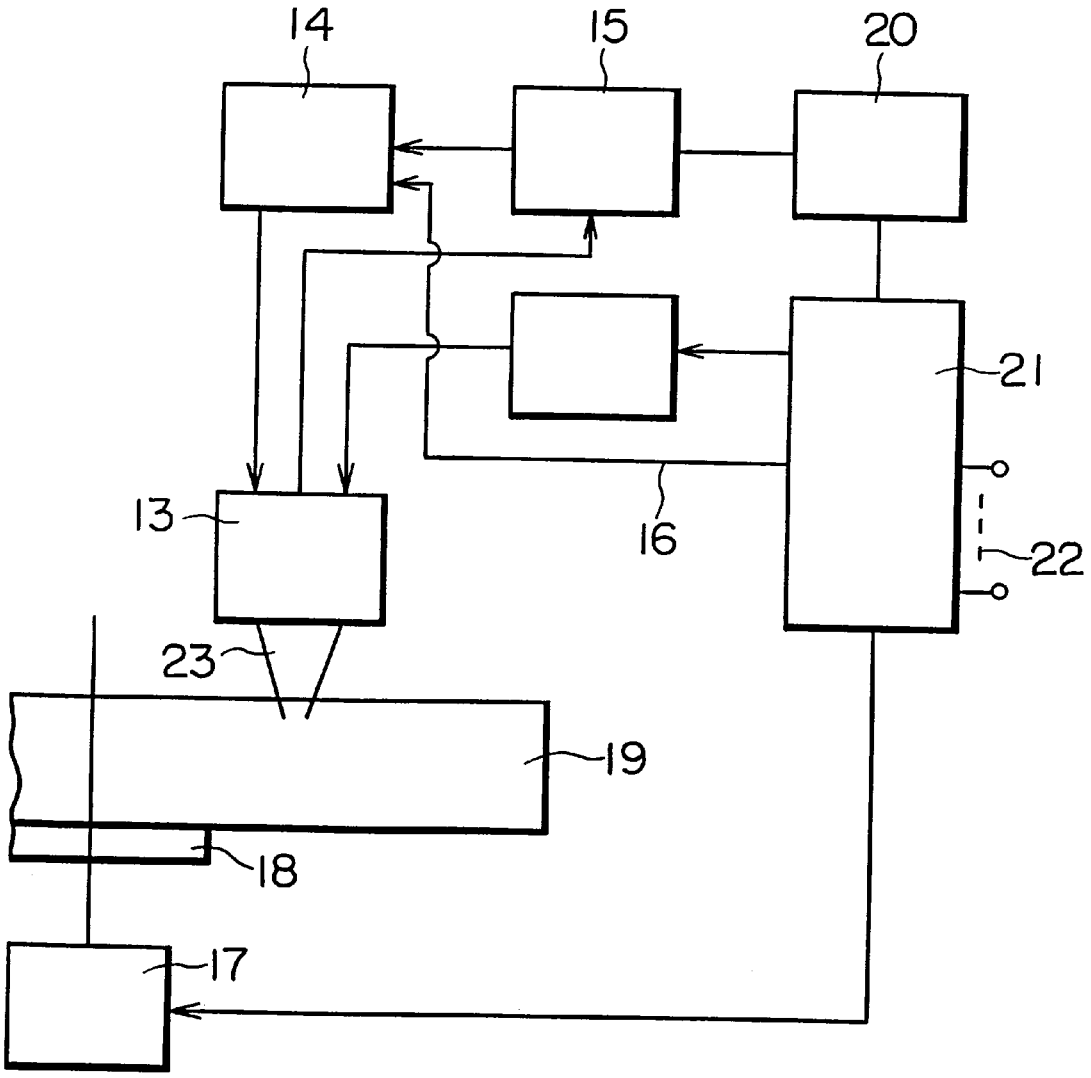
FIG. 83 is a constitutional schematic view of an optical information recording and reproducing unit.

FIG. 83 is a block diagram of a unit showing a process for optical information recording and reproducing as one embodiment of this invention.

The unit comprises an optical pickup 13, an optical pickup position control circuit 14, a received signal processing circuit 15, a laser diode actuating circuit 16, a disk-turning motor 17, a turn table 18, an optical disk 19 with a tracking guide, a melting point discrimination processing portion 20 for the recording film of an optical disk, a system control circuit 21, and a set of external input-output terminals 22.

The optical disk has a constitution in which a 70 nm thick AlN film is sputtering-formed on a glass substrate, a 50 nm thin film of In-Sb-Te type as a recording film is sputtering-formed thereon, a 70 nm thick AlN film is again sputtering-formed thereon, a 100 nm thick Au film is further sputtering-formed thereon, a 100 nm thick AlN film as a protective film is formed thereon, and a 10 $\mu$m thick UV-hardening resin film as a protective film is finally spin-coated thereon.

The above optical disk 19 is placed on the turn table 18, and the motor 17 turns the turn table 18 to turn the optical disk 19. The turning is switched on or off through the external input-output terminals 21 via the system control circuit 21.

The optical disk 19 is irradiated with a laser beam 23 from the optical pickup 13. A reflected beam portion of the laser beam 23 returns to the optical pickup 13 to extract an optical pickup height signal and deflection signal on the track through the received signal processing circuit 15. With these signals, the optical pickup position control circuit 14 controls the focusing and tracking of the optical pickup 13 on the disk 19. The focusing and tracking are switched on or off through the external input-output terminals 22 via the system control circuit 21.

Further, the optical pickup 13 has a constitution such that the system control circuit 21 sets a laser irradiation power as required in keeping with the passage of time through the laser diode actuating circuit 16 whereby the overwrite is possible by using one beam.

A laser irradiation power necessary to heat the optical disk 19 to a temperature of its melting point or more is written in a control track provided in the inner or outer circumference of the optical disk 19, and at the time of overwriting, the melting point discrimination processing portion 20 sets the recording point irradiation power and erasing point irradiation power at a power necessary to heat to the melting point or more.

The melting point discrimination processing portion 20 can read the above written data to overwrite at a temperature of the melting point or more, or a power $P_M$ for heating to the melting point may be determined on the basis of reflectivity changes obtained while effecting a laser irradiation by using a dummy track as follows.

By the functions of this invention in a higher attainable temperature area-rederived effect, an effect on promotion of crystal nuclei growth, cross-talk reducing effect, etc., in a process of erasing the recorded parts of the recording film of the optical recording medium which has a larger reflectivity in the recorded state than in the erased state or a smaller absorptivity in the recorded state than in the erased state, this invention provides recording media having high erasing performance and high density redordability which the conventional ones do not have and information recording and reproducing units.

In addition, the foregoing discussion all relates to a type of recording media for recording in the amorphous state and erasing in the crystalline state. However, the same concept as that of the above type is also applicable to the reverse type for recording in the crystalline state and erasing in the amorphous type. Thus, this invention is applicable to both of these two types.

What is claimed is:

1. An optical recording medium using an amorphous-crystalline phase change for recording and erasing of information, the medium comprising a substrate, a recording film, a dielectric film and a metal reflection film, the recording film comprising a composition of $In_xSb_yTe_z$ defined by a triangular area in a ternary diagram bounded by the points x, y, z of 22, 33, 45; 20, 37, 43; and 32, 40, 28 (in atomic %) and wherein the reflectivity of the recording film at the amorphous state is larger than that at the crystalline state at a wavelength of laser employed for recording and erasing.

2. An optical recording medium according to claim 1, wherein the dielectric film is one of $Si_2N_3$, AlN, $SiO_2$, $ZrO_2$, ZnS, $Ta_2O_5$, TiN, $Cr_2O_3$, GeN, $TiO_2$ and SiC films or one of their nonstoichiometric composition films.

3. An optical recording medium according to claim 1, wherein the metal reflection film is one of Ni-Cr alloy, Au and Al films.

4. An optical recording medium according to claim 1, wherein the wavelength of laser employed for recording and erasing is in the vicinity of 800 or 830 nm.

5. An optical recording medium using an amorphous-crystalline phase change for recording and erasing of information, the medium comprising a substrate, a recording film, a dielectric film and a metal reflection film, the recording film comprising one of $In_{22}Sb_{33}Te_{45}$, $In_{22}Sb_{37}Te_{41}$, $In_{20}Sb_{37}Te_{43}$, and $In_{32}Sb_{40}Te_{28}$ and wherein the reflectivity of the recording film at the amorphous state is larger than that of the crystalline state at a wavelength of laser employed for recording and erasing.

*6. An optical recording medium using an amorphous-crystalline phase change for recording and erasing of information, the medium comprising a substrate, a recording film, a dielectric film and a metal reflection film, the recording film comprising a composition of $In_xSb_yTe_z$ defined by a triangular area in a ternary diagram bounded by the points x y, z of 22, 33, 45; 20, 37, 43; and 32, 40, 28 (in atomic %) and*

*wherein the absorptivity of the recording film at the amorphous state is smaller than that at the crystalline state at a wavelength of laser employed for recording and erasing.*

*7. An optical recording medium according to claim 6, wherein the dielectric film is one of $Si_2N_3$, AlN, $SiO_2$, $ZrO_2$, ZnS, $Ta_2O_5$, TiN, $Cr_2O_3$, GeN, $TiO_2$ and SiC films or one of their nonstoichiometric composition films.*

*8. An optical recording medium according to claim 6, wherein the metal reflection film is one of Ni-Cr alloy, Au and Al films.*

*9. An optical recording medium according to claim 6, wherein the wavelength of laser employed for recording and erasing is in the vicinity of 800 or 830 nm.*

*10. An optical recording medium using an amorphous-crystalline phase change for recording and erasing of information, the medium comprising a substrate, a recording film, a dielectric film and a metal reflection film, the recording film comprising one of $In_{22}Sb_{33}Te_{45}$, $In_{22}Sb_{37}Te_{41}$, $In_{20}Sb_{37}Te_{43}$, and $In_{32}Sb_{40}Te_{28}$ and*

*wherein the absorptivity of the recording film at the amorphous state is smaller than that of the crystalline state at a wavelength of laser employed for recording and erasing.*

*11. An optical recording medium according to claim 10, wherein the dielectric film is one of $Si_2N_3$, AlN, $SiO_2$, $ZrO_2$, ZnS, $Ta_2O_5$, TiN, $Cr_2O_3$, GeN, $TiO_2$ and SiC films or one of their nonstoichiometric composition films.*

*12. An optical recording medium according to claim 10, wherein the metal reflection film is one of Ni-Cr alloy, Au and Al films.*

* * * * *